United States Patent
Kasper

(10) Patent No.: US 6,715,002 B2
(45) Date of Patent: *Mar. 30, 2004

(54) WATERMARK FOR ADDITIONAL DATA BURST INTO BUFFER MEMORY

(75) Inventor: Christian D. Kasper, Carrollton, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 138 days.

This patent is subject to a terminal disclaimer.

(21) Appl. No.: 10/005,509

(22) Filed: Dec. 4, 2001

(65) Prior Publication Data

US 2002/0133647 A1 Sep. 19, 2002

Related U.S. Application Data

(63) Continuation of application No. 09/163,772, filed on Sep. 30, 1998, now Pat. No. 6,356,962.

(51) Int. Cl.$^7$ .......................... G06F 13/20; G06F 13/28
(52) U.S. Cl. ........................ 710/29; 710/33; 710/35; 711/100; 370/229
(58) Field of Search .............................. 710/29, 33, 35; 370/229; 711/100

(56) References Cited

U.S. PATENT DOCUMENTS

| | | | |
|---|---|---|---|
| 4,953,157 A | 8/1990 | Franklin et al. ............... 370/60 |
| 5,136,582 A | 8/1992 | Firoozmand ............... 370/85.1 |
| 5,299,313 A | 3/1994 | Petersen et al. ............ 395/200 |
| 5,500,939 A | * 3/1996 | Kurihara ..................... 345/537 |
| 5,784,649 A | * 7/1998 | Begur et al. .................. 710/52 |
| 5,809,514 A | * 9/1998 | Nasserbakht et al. .......... 711/3 |
| 5,953,020 A | 9/1999 | Wang et al. ................. 345/513 |
| 6,029,221 A | 2/2000 | Wu et al. .................... 710/129 |
| 6,084,856 A | 7/2000 | Simmons et al. ........... 370/235 |
| 6,118,761 A | 9/2000 | Kalkunte et al. ........... 370/229 |
| 6,125,421 A | * 9/2000 | Roy .............................. 711/5 |
| 6,134,609 A | * 10/2000 | Klein .......................... 710/52 |
| 6,192,028 B1 | 2/2001 | Simmons et al. ........... 370/229 |

* cited by examiner

Primary Examiner—Rehana Perveen
(74) Attorney, Agent, or Firm—Lisa K. Jorgenson; Christopher F. Regan

(57) ABSTRACT

A method and network device are disclosed using a look-ahead watermark in a FIFO memory. In accordance with the present invention, a watermark interrupt is generated from a FIFO memory when data in the FIFO memory has crossed a watermark threshold. A data burst is transferred through a direct memory access unit to the FIFO memory. A look-ahead watermark flag is checked at the FIFO memory to determine if sufficient memory space exists inside the FIFO memory for an additional data burst, which is transferred through the direct memory access unit to the FIFO memory when the look-ahead watermark flag indicates that sufficient memory space is available.

31 Claims, 53 Drawing Sheets

| RELATIVE ADDRESS | BYTE 3 | BYTE 2 | BYTE 1 | BYTE 0 |
|---|---|---|---|---|
| PAB + 0 | PORT 0 Tx TOP-OF-RING DESCRIPTOR POINTER ||||
| PAB + 4 | PORT 1 Tx TOP-OF-RING DESCRIPTOR POINTER ||||
| PAB + 8 | PORT 2 Tx TOP-OF-RING DESCRIPTOR POINTER ||||
| PAB + 12 | PORT 3 Tx TOP-OF-RING DESCRIPTOR POINTER ||||
| PAB + 16 | PORT 0 Rx TOP-OF-RING DESCRIPTOR POINTER ||||
| PAB + 20 | PORT 1 Rx TOP-OF-RING DESCRIPTOR POINTER ||||
| PAB + 24 | PORT 2 Rx TOP-OF-RING DESCRIPTOR POINTER ||||
| PAB + 28 | PORT 3 Rx TOP-OF-RING DESCRIPTOR POINTER ||||
| PAB + 32 | PRESCALE TIMER RELOAD VALUE || STAT TIMER RELOAD VALUE | TIMER ENABLES |
| PAB + 36 | PORT 3 Tx POLL TIMER RELOAD VALUE | PORT 2 Tx POLL TIMER RELOAD VALUE | PORT 1 Tx POLL TIMER RELOAD VALUE | PORT 0 Tx POLL TIMER RELOAD VALUE |
| PAB + 40 | PORT 3 Tx BURST SIZE | PORT 2 Tx BURST SIZE | PORT 1 Tx BURST SIZE | PORT 0 Tx BURST SIZE |
| PAB + 44 | PORT 3 Rx BURST SIZE | PORT 2 Rx BURST SIZE | PORT 1 Rx BURST SIZE | PORT 0 Rx BURST SIZE |
| PAB + 48 | RESERVED | RESERVED | UCLK PERIOD (NANOSECONDS) | STATISTICS BURST SIZE |
| PAB + 52 | PORT 1 N1 || PORT 0 N1 ||
| PAB + 56 | PORT 3 N1 || PORT 2 N1 ||
| PAB + 60 | PORT #0 BUFFER SIZE || Tx RING SIZE | Rx RING SIZE |
| PAB + 64 | PORT #1 BUFFER SIZE || Tx RING SIZE | Rx RING SIZE |
| PAB + 68 | PORT #2 BUFFER SIZE || Tx RING SIZE | Rx RING SIZE |
| PAB + 72 | PORT #3 BUFFER SIZE || Tx RING SIZE | Rx RING SIZE |
| PAB + 76 | RESERVED ||||
| PAB + 80 | RESERVED ||||
| PAB + 84 | RESERVED ||||
| PAB + 88 | RESERVED ||||
| PAB + 92 | RESERVED ||||
| PAB + 96 | RESERVED ||||
| PAB + 100 | RESERVED ||||
| PAB + 104 | RESERVED ||||
| PAB + 108 | RESERVED ||||
| PAB + 112 | RESERVED ||||
| PAB + 116 | RESERVED ||||
| PAB + 120 | RESERVED ||||
| PAB + 124 | RESERVED ||||

FIG. 7

| PORT 0 RELATIVE ADDRESS | BYTE 3 | BYTE 2 | BYTE 1 | BYTE 0 | PORT |
|---|---|---|---|---|---|
| PAB + 128 | BAD FRAMES RECEIVED ||||  PORT #0 |
| PAB + 132 | ABORTED FRAMES ||||  |
| PAB + 136 | FRAMES EXCEEDING N1 RECEIVED ||||  |
| PAB + 140 | RESERVED ||||  |
| PAB + 144 | RESERVED ||||  |
| PAB + 148 | BAD FRAMES RECEIVED ||||  PORT #1 |
| PAB + 152 | ABORTED FRAMES ||||  |
| PAB + 156 | FRAMES EXCEEDING N1 RECEIVED ||||  |
| PAB + 160 | RESERVED ||||  |
| PAB + 164 | RESERVED ||||  |
| PAB + 168 | BAD FRAMES RECEIVED ||||  PORT #2 |
| PAB + 172 | ABORTED FRAMES ||||  |
| PAB + 176 | FRAMES EXCEEDING N1 RECEIVED ||||  |
| PAB + 180 | RESERVED ||||  |
| PAB + 184 | RESERVED ||||  |
| PAB + 188 | BAD FRAMES RECEIVED ||||  PORT #3 |
| PAB + 192 | ABORTED FRAMES ||||  |
| PAB + 196 | FRAMES EXCEEDING N1 RECEIVED ||||  |
| PAB + 200 | RESERVED ||||  |
| PAB + 204 | RESERVED ||||  |

*FIG. 8*

[0x28] PCR - PRIMITIVE COMMAND REGISTER

| DMA | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| BIT NAME | PPA | PPRIM[6:0] | | | | | | | PPARM[7:0] | | | | | | | | HPA | HPRIM[6:0] | | | | | | | HPARM[7:0] | | | | | | | |
| RESET VALUE | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| HOST ACCESS | READ CLEAR | READ-ONLY | | | | | | | | | | | | | | | WRITE SET | READ/WRITE | | | | | | | | | | | | | | |
| CPC ACCESS | WRITE SET | READ/WRITE | | | | | | | | | | | | | | | READ CLEAR | READ-ONLY | | | | | | | | | | | | | | |

| BIT # | FIELD | NAME | DESCRIPTION |
|---|---|---|---|
| 31 | PPA | PROVIDER PRIMITIVE AVAILABLE | (1=AVAILABLE; 0=NO PRIMITIVE) SET BY THE DEVICE WHEN THE PCR REGISTER IS WRITTEN BY THE FIRMWARE. THE SETTING OF THIS BIT WILL ALSO CAUSE THE PINT BIT OF THE MIR TO BE SET AUTOMATICALLY. THIS BIT IS CLEARED BY THE DMA WHEN THE HOST READS THIS REGISTER. |
| 30:24 | PPRIM | PROVIDER PRIMITIVE COMMAND | (7-BIT BINARY VALUE) THIS FIELD IS AN OUTGOING (FIRMWARE TO HOST) PRIMITIVE COMMAND. THE MEANING IS STRICTLY DETERMINED BY THE FIRMWARE. |
| 23:16 | PPARM | PROVIDER PRIMITIVE PARAMETER | (8-BIT BINARY VALUE) THIS IS A FIRMWARE DEFINED PARAMETER FIELD CORRESPONDING TO THE PROVIDER PRIMITIVE COMMAND. |
| 15 | HPA | HOST PRIMITIVE AVAILABLE | (1=AVAILABLE; 0=NO PRIMITIVE) SET BY THE DEVICE WHEN THE PCR REGISTER IS WRITTEN BY THE HOST. THE SETTING OF THIS BIT CAN RESULT IN A CPC INTERRUPT IF ENABLED. THIS BIT IS CLEARED BY THE DMA WHEN THE FIRMWARE READS THIS REGISTER. |
| 14:8 | HPRIM | HOST PRIMITIVE COMMAND | (7-BIT BINARY VALUE) THIS FIELD IS AN INCOMING (HOST TO FIRMWARE) PRIMITIVE COMMAND. THE MEANING IS STRICTLY DETERMINED BY THE FIRMWARE. |
| 7:0 | HPARM | HOST PRIMITIVE PARAMETER | (8-BIT BINARY VALUE) THIS IS A FIRMWARE DEFINED PARAMETER FIELD CORRESPONDING TO THE HOST PRIMITIVE COMMAND. |

FIG. 8A

[0x2A] MIR - MASTER INTERRUPT REGISTER

| DMA | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| BIT NAME | PINT | SPURINT | SDRIFT3 | ECN3 | FAN3 | SHL3 | TINT3 | RINT3 | MERR | PPLOST | SDRIFT2 | ECN2 | FAN2 | SHL2 | TINT2 | RINT2 | SERR | HPLOST | SDRIFT1 | ECN1 | FAN1 | SHL1 | TINT1 | RINT1 | WERR | SPARE | SDRIFT0 | ECN0 | FAN0 | SHL0 | TINT0 | RINT0 |
| RESET VALUE | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| HOST ACCESS | \*READ -CLEAR (NO WRITE) ||||||||||||||||||||||||||||||||
| CPC ACCESS | READ-ZEROS | READ -ZEROS/ WRITE-ONES ||||||| READ-ZEROS | READ -ZEROS/ WRITE-ONES ||||||| READ-ZEROS | READ -ZEROS/ WRITE-ONES ||||||| READ-ZEROS | READ -ZEROS/ WRITE-ONES |||||||

| BIT # | FIELD | NAME | DESCRIPTION |
|---|---|---|---|
| 31 | PINT | PRIMITIVE INTERRUPT | (1=EVENT; 0=NO EVENT) SET BY THE DEVICE WHEN THE FIRMWARE WRITES A NEW PROVIDER PRIMITIVE INTO THE PRIMITIVE COMMAND REGISTER (UPPER HALF). |
| 23 | MERR | MEMORY ERROR | (1=EVENT; 0=NO EVENT) SET BY THE DEVICE WHEN AN RTIME READY TIMEOUT HAS OCCURRED AS DEFINED AND ESTABLISHED IN THE SYSTEM MODE REGISTER (SMR). |
| 15 | SERR | SYSTEM ERROR | (1=EVENT; 0=NO EVENT) SET BY THE DEVICE WHEN AN STIME SYSTEM TIMEOUT HAS OCCURRED AS DEFINED AND ESTABLISHED IN THE SYSTEM MODE REGISTER (SMR). |
| 7 | WERR | CONFIGURATION WRITE ERROR | (1=EVENT; 0=NO EVENT) SET BY THE DEVICE WHEN THE HOST HAS ATTEMPTED TO WRITE TO A REGISTER LOCATION WHICH IS INACCESSIBLE BY THE HOST. THIS BIT WILL NEVER BE SET WHEN HOST ACCESS IS UNLOCKED VIA THE KEY FIELD OF THE LOCK REGISTER. |
| 30 | SPURINT | SPURIOUS CPC INTERRUPT | (1=EVENT; 0=NO EVENT) SET BY THE CPC FIRMWARE INDICATING THE RECEPTION OF AN INVALID INTERNAL CPC INTERRUPT. THIS IS A DEVICE HARDWARE FAULT AND SHOULD NEVER OCCUR. |
| 22 | PPLOST | PROVIDER PRIMITIVE LOST | (1=EVENT; 0=NO EVENT) SET BY THE DEVICE WHEN THE FIRMWARE WRITES A NEW PROVIDER PRIMITIVE OVER ONE THAT HAS NOT YET BEEN READ BY THE HOST. THIS CONDITION IS DETECTED BY TESTING THE PPA BIT OF THE PRIMITIVE COMMAND REGISTER (PCR). |
| 14 | HPLOST | HOST PRIMITIVE LOST | (1=EVENT; 0=NO EVENT) SET BY THE DEVICE WHEN THE HOST WRITES A NEW HOST PRIMITIVE OVER ONE THAT HAS NOT YET BEEN READ BY THE FIRMWARE. THIS CONDITION IS DETECTED BY TESTING THE HPA BIT OF THE PRIMITIVE COMMAND REGISTER (PCR). |
| 6 | SPARE | | |
| 29,21 13,5 | SDRIFT | PORT n STATISTIC DRIFT | (1=EVENT; 0=NO EVENT) SET BY THE CPC FIRMWARE WHEN CONDITIONS IN THE CORRESPONDING PORT HAVE BEEN REACHED WHERE STATISTICAL INFORMATION MIGHT BE LOST. THIS WILL ONLY HAPPEN WHEN RECEIVE CONGESTION IS OCCURRING SUCH THAT FRAMES ARE BEING LOST DUE TO LACK OF AVAILABLE SPACE IN THE PORT'S RECEIVE FIFO. |
| 28,20 12,4 | ECN | PORT n EARLY CONGESTION NOTIFICATION | (1=EVENT; 0=NO EVENT) SET BY THE CPC FIRMWARE FOR ADVANCED HOST NOTIFICATION OF CONGESTION IN THE CORRESPONDING PORT'S RECEIVER. CONGESTION OCCURS WHEN A UNIT IS FORCED TO DROP A RECEIVED FRAME DUE TO LACK OF AVAILABLE SPACE IN THE Rx FIFO. |
| 27,19,11,3 | FAN | FRAME ADDRESS NOTIFICATION | (1=EVENT; 0=NO EVENT) SET BY THE DEVICE TO NOTIFY THE HOST THAT THE ADDRESS FIELDS ARE PRESENT IN THE FRAME BUFFER. |
| 26,18 10,2 | SHL | PORT n STATISTIC HALF-LIFE | (1=EVENT; 0=NO EVENT) SET BY THE CPC FIRMWARE WHEN ONE OR MORE OF THE CORRESPONDING PORT'S STATISTICS HAS PASSED THE HALF-FULL MARK – DEFINED AS THE MOST-SIGNIFICANT-BIT OF A STATISTIC CHANGING POLARITY (0-TO-1 OR 1-TO-0) DUE TO THE LAST UPDATE. |
| 25,17 9,1 | TINT | PORT n TRANSMIT INTERRUPT | (1=EVENT; 0=NO EVENT) SET BY THE DEVICE WHENEVER THE TRANSMISSION OF ONE OR MORE FRAMES HAS BEEN COMPLETED. FOR A SUCCESSFULLY TRANSMITTED FRAME THIS INTERRUPT SIGNALS THAT THE FRAME HAS CLEARED THE CHIP |
| 24,16 8,0 | RINT | PORT n RECEIVE INTERRUPT | (1=EVENT; 0=NO EVENT) SET BY THE DEVICE WHENEVER A RECEIVE FRAME HAS BEEN COMPLETELY TRANSFERRED FROM THE CORRESPONDING PORT TO THE HOST SYSTEM. THIS MEANS A FRAME HAS BEEN TRANSFERRED TO SYSTEM MEMORY. IF THE RECEPTION OF BAD FRAMES (RBUFF-0 IN THE SMR REGISTER) HAS BEEN DISABLED THEN NO RINT WILL BE GENERATED IN THE EVENT OF BAD FRAMES. |

*FIG. 8B*

INTERNET IP HEADER (20 BYTES)

| VER/HEADER | TYPE OF SERVICE | 16-BIT TOTAL LENGTH (IN BYTES) |
|---|---|---|
| 16-BIT IDENTIFICATION | | 3-BIT FLAGS/13-BIT FRAGMENT OFFSET |
| TTL | 8-BIT PROTOCOL | 16-BIT HEADER CHECKSUM |
| 32-BIT SOURCE IP ADDRESS | | |
| 32-BIT DESTINATION IP ADDRESS | | |
| (OPTIONS - IF ANY) | | |

*FIG. 11*

TCP HEADER (20 BYTES)

| 16-BIT SOURCE PORT | 16-BIT DESTINATION PORT |
|---|---|
| 32-BIT SEQUENCE NUMBER ||
| 32-BIT ACKNOWLEDGMENT NUMBER ||
| URG/ACK/PSH/RST/SYN/FIN | 16-BIT WINDOW SIZE |
| 16-BIT TCP CHECKSUM | 16-BIT URGENT POINTER |

*FIG. 12*

FIFO CASES OVERFLOW ON SECOND PACKET INTO RECEIVE FIFO

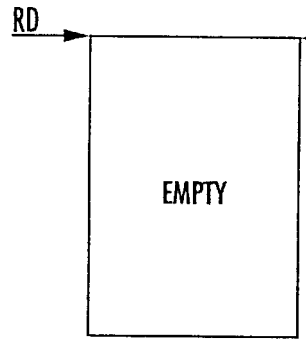

FIG. 27A

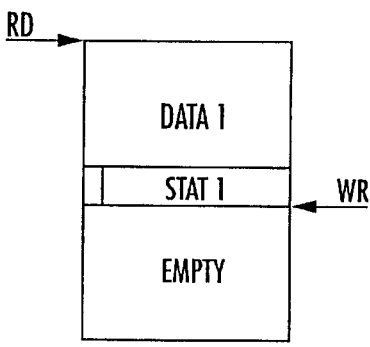

FIG. 27B

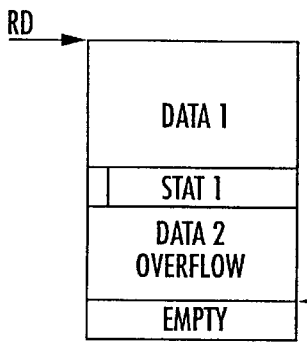

FIG. 27C

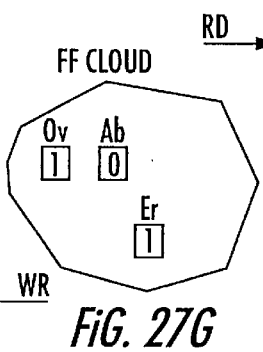

FIG. 27G

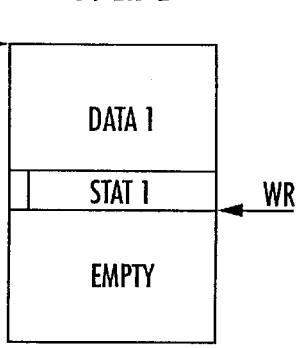

FIG. 27D

WRITE POINTER RESET TO BEGINNING OF PACKET 2 FROZEN UNTIL EOP OCCURS AT WHICH TIME ERROR STATUS FOR OVERFLOW PACKET IS ENTERED.

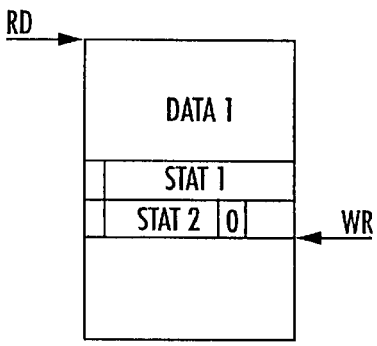

FIG. 27E

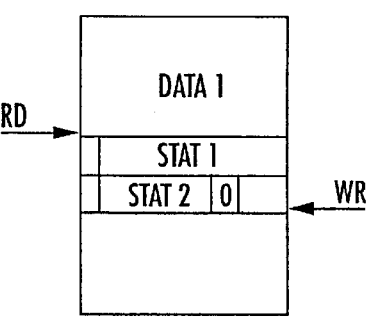

READ OF STAT 1 BY DMA COPIES IT INTO RECEIVE STATUS REGISTER AT HOST ADDRESS.
NO REQUESTS TO DMA FOR ANOTHER DATA TRANSFER WILL OCCUR UNTIL CPC READS STATUS. THIS PREVENTS OVERWRITING OF STATUS REGISTER BY OVERFLOW STATUS.

FIG. 27F

RECEIVE MESSAGE DESCRIPTOR 0

FiG. 47

| RMD 0 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| BIT NAME | OWN | EOR | ENP | \multicolumn{11}{l}{BSIZE [12:2]} | RERR | ROFLO | \multicolumn{13}{l}{MSIZE [12:0]} |

| BIT # | FIELD | NAME | DESCRIPTION |
|---|---|---|---|
| 31 | OWN | DESCRIPTOR OWNERSHIP | (1=DEVICE; 0=HOST) ESTABLISHES OWNERSHIP OF THE RECEIVE MESSAGE DESCRIPTOR AND ITS ASSOCIATED DATA BUFFER. THE OWN BIT IS USED AS A HANDSHAKE BETWEEN AND THE HOST. NO PART OF THE RECEIVE MESSAGE DESCRIPTOR OR THE CONTENTS IF ITS ASSOCIATED BUFFER SHOULD BE ALTERED ONCE OWNERSHIP HAS BEEN RELINQUISHED. |
| 30 | EOR | END OF RING | (1=END OF RING; 0=NOT END-OF-RING) DENOTES THE LAST RECEIVE MESSAGE DESCRIPTOR IN THE DESCRIPTOR RING. CAUSES DEVICE TO RETURN TO THE TOP OF THE RING AFTER USING THIS DESCRIPTOR. IN OTHER WORDS, THE NEXT DESCRIPTOR USED BY DEVICE WILL BE THE FIRST ENTRY IN THE RING. |
| 29 | ENP | END OF FRAME | (1=END OF FRAME; 0=CHAIN) INDICATES THE ASSOCIATED RECEIVE DATA BUFFER CONTAINS THE END OF A RECEIVED FRAME. ENP OF ZERO IMPLIES BUFFER "CHAINING" WHERE THE RECEIVED FRAME SPANS TWO OR MORE, ADJACENT DESCRIPTORS. |
| 28:18 | BSIZE | BUFFER SIZE | (10-BIT UNSIGNED INTEGER) INDICATES THE NUMBER OF BYTES AVAILABLE IN THE ASSOCIATED RECEIVE DATA BUFFER (UP TO 8K BYTES). NOTE THAT BUFFERS ARE ALLOCATED IN 4-BYTE (1-WORD) INCREMENTS SINCE THE BSIZE FIELD IS DEFINED AS BITS 12 TO 2. THE BSIZE FIELD IS POSITIONED IN THE UPPER HALF-WORD TO FACILITATE THIS DEFINITION. A BSIZE OF ZERO DEFAULTS TO A BUFFER SIZE OF ONE WORD. THE ACTUAL NUMBER OF BYTES AVAILABLE IN A BUFFER ARE DETERMINED BY THE BSIZE FIELD AND THE STARTING ADDRESS OF THE BUFFER (RBADR). RECEIVE DATA BUFFERS ARE PERMITTED TO START ON ANY BYTE ADDRESS BUT ARE ALWAYS ASSUMED BY DEVICE TO END ON A WORD-ALIGNED BOUNDARY. IN OTHER WORDS, THE LAST ADDRESS OF EVERY RECEIVE BUFFER IS A COMPLETE, 4-BYTE WORD. |
| 17 | RERR | Rx ERROR SUMMARY | (1=ERROR; 0=NORMAL) LOGICAL OR SUMMARY OF THE ERROR STATUS BITS REPORTED IN THE RECEIVE STATUS WORD WRITTEN BY DEVICE INTO THE FIRST FULL WORD FOLLOWING THE END OF THE FRAME IN THE BUFFER. RERR SUMMARIZES: CNTOVL, FCS, RABRT, ROFLO. ALLOWS A SINGLE-BIT TEST FOR RECEIVE FRAME-RELATED ERRORS. |
| 16 | ROFLO | Rx FIFO OVERFLOW ERROR | (1=ERROR; 0=NORMAL) INDICATES A DROPPED PACKET DUE TO INSUFFICIENT SPACE AVAILABLE IN THE RECEIVE FIFO. WHEN OVERFLOW OCCURS THE HDLC UNIT CONTINUES TO MONITOR THE INCOMING PACKET FOR STATISTICAL PURPOSES, AND DROPS THE ENTIRE PACKET (OR AT LEAST THE PORTION NOT YET READ FROM THE FIFO). THE RESULTING STATUS WORD IS WRITTEN INTO THE FIFO ALONG WITH THE END-OF-PACKET TAG. OVERFLOW IS CAUSED BY INADEQUATE SERVICING (READING) OF THE FIFO. IF THIS BIT IS SET MSIZE MAY NOT INDICATE THE ACTUAL AMOUNT OF DATA IN THE BUFFER. |
| 15:0 | MSIZE | MESSAGE SIZE | (15-BIT UNSIGNED INTEGER) INDICATES THE NUMBER OF OCTETS OCCUPIED BY PART OR ALL OF A RECEIVED FRAME IN THE ASSOCIATED BUFFER. MSIZE DOES NOT INCLUDE THE FOUR OCTETS OF THE RECEIVE STATUS WORD WRITTEN BY DEVICE INTO THE FIRST FULL WORD FOLLOWING THE END OF THE FRAME IN THE BUFFER. THE MSIZE FIELD IS EXPECTED TO BE ALL ZEROS WHEN THE HOST GIVES OWNERSHIP OF THE DESCRIPTOR TO DEVICE. SINCE NO ATTEMPT IS MADE BY DEVICE TO CHECK THIS, ANY NON-ZERO VALUE GIVEN WILL RESULT IN AN ERRONEOUS MSIZE RETURNED. |

RECEIVE MESSAGE DESCRIPTOR 1

| RMD 1 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| BIT NAME | RBADR[31:0] ||||||||||||||||||||||||||||||||

| BIT # | FIELD | NAME | DESCRIPTION |
|---|---|---|---|
| 31:0 | RBADR | RECEIVE BUFFER STARTING ADDRESS | (32-BIT UNSIGNED INTEGER) ACTS AS A POINTER TO THE FIRST ADDRESS LOCATION OF THE ASSOCIATED RECEIVE DATA BUFFER. RECEIVE DATA BUFFERS ARE USED BY DEVICE TO STORE INCOMING FRAMES. NO MORE THAN ONE FRAME IS STORED IN A GIVEN BUFFER. A SINGLE FRAME MAY SPAN MULTIPLE BUFFERS WHEN ITS SIZE EXCEEDS THE BUFFER SIZE. RBADR IS A BYTE ADDRESS IN A 32-BIT DATA WORD SYSTEM IMPLYING THAT RECEIVE BUFFERS ARE NOT REQUIRED TO BEGIN ON WORD-ALIGNED BOUNDARIES. THE RULE IMPOSED BY DEVICE IS THAT RECEIVE BUFFERS MAY START WITH ANY BYTE ALIGNMENT, BUT ALWAYS END ON WORD-ALIGNED BOUNDARIES. THE FOLLOWING TABLE OUTLINES THE BYTE ALIGNMENT INDICATED BY THE LEAST TWO SIGNIFICANT RBADR BITS.<br><br>RBADR [1:0]  VALID BYTES  ALIGNMENT<br>00           4            ALIGNED (FULL WORD)<br>01           3            NON-ALIGNED<br>10           2            NON-ALIGNED<br>11           1            NON-ALIGNED |

FIG. 48

TRANSMIT MESSAGE DESCRIPTOR 0

| TMD 0 | 31 | 30 | 29 | 28 | 27 | 26 25 24 23 22 21 20 19 18 17 | 16 | 15 14 13 12 11 10 9 8 7 6 5 4 3 2 1 0 |
|---|---|---|---|---|---|---|---|---|
| BIT NAME | OWN | EOR | ENP | NOCRC | TOFLO | RESERVED | UFLO | MSIZE [12:0] |

| BIT # | FIELD | NAME | DESCRIPTION |
|---|---|---|---|
| 31 | OWN | DESCRIPTOR OWNERSHIP | (1=DEVICE; 0=HOST) SET BY THE HOST, CLEARED BY DEVICE. ESTABLISHES OWNERSHIP OF THE TRANSMIT MESSAGE DESCRIPTOR AND ITS ASSOCIATED DATA BUFFER. THE OWN BIT IS USED AS A HANDSHAKE BETWEEN DEVICE AND THE HOST. NO PART OF THE TRANSMIT MESSAGE DESCRIPTOR OR THE CONTENTS OF ITS ASSOCIATED BUFFER SHOULD BE ALTERED ONCE OWNERSHIP HAS BEEN RELINQUISHED. |
| 30 | EOR | END OF RING | (1=END-OF-RING; 0=NOT END-OF-RING) CONFIGURED BY THE HOST TO MARK THE DESCRIPTOR AS THE LAST ENTRY IN THE RING. DENOTES THE LAST TRANSMIT MESSAGE DESCRIPTOR IN THE DESCRIPTOR RING. CAUSES DEVICE TO RETURN TO THE TOP OF THE RING AFTER USING THIS DESCRIPTOR. IN OTHER WORDS, THE NEXT DESCRIPTOR USED BY DEVICE WILL BE THE FIRST ENTRY IN THE RING. |
| 29 | ENP | END OF FRAME | (1=END-OF-FRAME; 0=NOT END-OF-FRAME) SET BY THE HOST TO INDICATE THAT THE ASSOCIATED TRANSMIT DATA BUFFER CONTAINS THE END OF A TRANSMIT FRAME. ENP OF ZERO IMPLIES BUFFER "CHAINING" WHERE THE FRAME TO BE TRANSMITTED SPANS TWO OR MORE, ADJACENT DESCRIPTORS. |
| 28A | NOCRC | NO CRC APPENDED | (1=NOT APPENDED; 0=APPENDED) CONFIGURED BY THE HOST TO CONTROL Tx CRC GENERATION ON A PER-FRAME BASIS. PREVENTS FRAME CHECK SEQUENCE (CRC) FROM BEING GENERATED AND APPENDED AUTOMATICALLY BY THE UNIT. NOCRC IS ONLY USED BY DEVICE WHEN THE END OF FRAME (ENP) BIT IS SET. |
| 27 | TOFLO | Tx FIFO OVERFLOW ERROR | (1=ERROR; 0=NORMAL) SET BY HDLC WHEN FIFO Tx IS IN OVERFLOW. PROBABLY DUE TO WATERMARK < BURST SIZE. THIS MEANS AN ATTEMPT HAS BEEN MADE TO WRITE MORE THAN THE AVAILABLE SPACE IN THE FIFO Tx. THE ONLY WAY TO EXIT FROM THIS CONDITION IS TO SET TxFLUSH OR RESET. |
| 26:17 | RESERVED | | MUST BE ZERO. |
| 16 | UFLO | Tx FIFO UNDERFLOW ERROR | (1=ERROR; 0=NORMAL) SET BY DEVICE WHEN THE TRANSMIT FIFO IS EMPTIED DURING A TRANSMISSION BEFORE ENCOUNTERING THE END-OF-FRAME. UNDERFLOW IS CAUSED BY INADEQUATE SERVICING (WRITING) OF THE FIFO. |
| 15:0 | MSIZE | MESSAGE SIZE | (13-BIT UNSIGNED INTEGER) SET BY THE HOST TO INDICATE THE NUMBER OF OCTETS OF A TRANSMIT FRAME CONTAINED IN THE ASSOCIATED TRANSMIT DATA BUFFER. |

FIG. 49

TRANSMIT MESSAGE DESCRIPTOR 1

| TMD 1 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| BIT NAME | TBADR [31:0] |||||||||||||||||||||||||||||||||

| BIT # | FIELD | NAME | DESCRIPTION |
|---|---|---|---|
| 31:0 | TBADR | TRANSMIT BUFFER STARTING ADDRESS | (32-BIT UNSIGNED INTEGER) ACTS AS A POINTER TO THE FIRST ADDRESS LOCATION OF THE ASSOCIATED TRANSMIT DATA BUFFER. TRANSMIT DATA BUFFERS ARE USED BY DEVICE AS THE SOURCE FOR OUTGOING FRAMES. NO MORE THAN ONE FRAME SHOULD BE STORED IN A GIVEN BUFFER. A SINGLE FRAME MAY SPAN MULTIPLE BUFFERS WHEN ITS SIZE EXCEEDS THE BUFFER SIZE. TBADR IS A BYTE ADDRESS IN A 32-BIT DATA WORD SYSTEM IMPLYING THAT TRANSMIT BUFFERS ARE NOT REQUIRED TO BEGIN ON A WORD-ALIGNED BOUNDARIES. THE FOLLOWING TABLE OUTLINES THE BYTE ALIGNMENT INDICATED BY THE LEAST TWO SIGNIFICANT TBADR BITS.<br><br>TBADR [1:0]  VALID BYTES  ALIGNMENT<br>00               4              ALIGNED (FULL WORD)<br>01               3              NON-ALIGNED<br>10               2              NON-ALIGNED<br>11               1              NON-ALIGNED |

FIG. 50

WATERMARK FOR ADDITIONAL DATA BURST INTO BUFFER MEMORY

This application is a continuation of Ser. No. 09/163,772 filed on Sep. 30, 1998 now U.S. Pat. No. 6,356,962.

FIELD OF THE INVENTION

This invention relates to a method and network device of controlling data flow as part of data-based networks, and more particularly, to the controlling of data arranged as into and out of a FIFO memory to increase the bus and memory resource utilization.

BACKGROUND OF THE INVENTION

Data networks have become increasingly important in day-to-day activities and business applications. Most of these networks are a packet-switched network, such as the Internet, which uses a Transmission Control Protocol (TCP) and an Internet Protocol (IP), frequently referred to as TCP/IP. The Transmission Control Protocol manages the reliable reception and transmission of network traffic, while the Internet Protocol is responsible for routing to ensure that packets are sent to a correct destination.

In a typical network, a mesh of transmission links are provided, as well as switching nodes and end nodes. End nodes typically ensure that any packet is received and transmitted on the correct outgoing link to reach its destination. The switching nodes are typically referred to as packet switches, or routers, or intermediate systems. The sources and destinations in data traffic (the end nodes) can be referred to as hosts and end systems. These hosts and end systems typically are the personal computers, work stations and other terminals.

To help move information between computers, the open system interconnection (OSI) model has been developed. Each problem of moving information between computers is represented by a layer in the model, and thus, establishes a framework for standards. Two systems communicate only between layers in a protocol stack. However, it is desirable to communicate with a pure layer in the other system, and to achieve such results, information is exchanged by means of protocol data units (PDUs), also known as packets. The PDUs include headers that contain control information, such as addresses, as well as data. At a source, each layer adds its own header, as is well known to those skilled in the art. The seven layers, starting at the physical layer, include: (1) physical; (2) data link; (3) network; (4) transport; (5) session; (6) presentation; and (7) application layers.

The network systems typically use routers that can determine optimum paths, by using routing algorithms. The routers also switch packets arriving at an input port to an output port based on the routing path for each packet. The routing algorithms (or routing protocols) are used to initialize and maintain routing tables that consist of entries that point to a next router to send a packet with a given destination address. Typically, fixed costs are assigned to each link in the network and the cost reflects link bandwidth and/or costs. The least cost paths can be determined by a router after it exchanges network topology and link cost information with other routers.

The two lower layers, the physical and data link layers, are typically governed by a standard for local area networks developed by the IEEE 802 Committee. The data link layer is typically divided into two sublayers, the logical link control (LLC) sublayer, which defines functions such as framing, flow control, error control and addressing. The LLC protocol is a modification of the HDLC protocol. A medium access control (MAC) sublayer controls transmission access to a common medium.

High-level data link control (HDLC) is a communications control procedure for checking the accuracy of data transfer operations between remote devices, in which data is transferred in units known as frames, and in which procedures exist for checking the sequence of frames, and for detecting errors due to bits being lost or inverted during transfer operations. There are also functions which control the set-up and termination of the data link. In HDLC, the bit synchronous data communication across a transmission link is controlled. HDLC is included in the ITU packet-switching interface standard known as X.25.

Programmable HDLC protocol controllers are commonly used in these systems. An HDLC controller is a computer peripheral-interface device which supports the International Standards Organization (ISO) high-level-data-link-control (HDLC). It reduces the central processing unit or microprocessor unit (MPU) software by supporting a frame-level instruction set and by hardware implementation of the low-level tasks associated with frame assembly-disassembly and data integrity.

Most communication protocols are bit-oriented, code-dependent, and ideal for full duplex communication. Some common applications include terminal-to-terminal, terminal-to-MPU, MPU-to-MPU, satellite communication, packet switching, and other high-speed data links.

A communication controller relieves a central MPU of many of the tasks associated with constructing and receiving frames. A frame (sometimes referred to as a packet) is a single communication element which can be used for both link-control and data-transfer purposes.

Most controllers include a direct memory access (DMA) device or function which provides access to an external shared memory resource. The controller allows either DMA or non-DMA data transfers. The controller accepts a command from the MPU, executes the command, and provides an interrupt and result back to the MPU.

Typically, many routers or HDLC controllers or other similar controllers include separate FIFO memory structures to provide independent transmit and receive buffering. A standard or classic method of FIFO flow-control is an interrupt-mediated system based upon watermark settings in the FIFO. For example, when the receive watermark is toggled by incoming data off the network, an interrupt signal is issued to the embedded microprocessor core. The DMA is then instructed by the frameware or the state machine to read a predefined quantity of data from the receive FIFO. In this way, frames are received from the network without overflowing the receive FIFO memory.

Conversely, when the standard transmit FIFO watermark is satisfied, the transmit FIFO memory and its associated logic control circuits initiate an interrupt signal indicating that sufficient space exists within the FIFO memory for it to receive a data burst from the direct memory access unit (DMA). The service time for either receive or transmit interrupt is delayed based upon a function of their respective interrupt priority assignments (low, medium, high) and their relative position in the microprocessor interrupt stack.

Once the interrupt has initiated the burst request of the DMA, it generally exits to allow any central processing unit to serve the next process. The number of system clocks required to generated this DMA command can be relatively high. A typical controller of this type spends most of its processor time deciding which command it needs to build, building it, and then submitting the command to the DMA command stack for execution.

Because the write rate into the transmit FIFO is generally much faster than the output rate of the FIFO to the network because of various factors, such as contending for a host bus and other similar reasons, most network devices depend entirely on their standard watermark settings for indications when a DMA burst is required. Although this does have some advantages, it also has disadvantages.

For example, performance could be wasted if either the burst is small or the watermark is too large. If the network device supports multiple channels, it may also be time-slicing between the various channels and suffering additional overhead because of interrupt servicing. Both receive and transmit FIFOs are susceptible to packet corruption. If the DMA fails to read data out of the receive FIFO faster than its input rate, it risks an overflow error and the loss of one or more packets. Similarly, if the DMA is unable to write a complete packet into the transmit FIFO to keep up with the output rate, it runs the risk of an under-flow error. If the firmware within a processor writes too much information into the FIFO, a transmit overflow results. Additionally, different overhead expenses could be required for different commands. It is evident that the mechanisms are not sufficiently tightly coupled enough between firmware and FIFO to make good use of the FIFO.

SUMMARY OF THE INVENTION

It is therefore an object of the present invention to enable FIFO filling without incurring the same overhead expenses as required for a previous watermark interrupt command.

It is still another object of the present invention to provide a method and apparatus, including a network device, for transmitting data into a FIFO memory, which allows additional bursts of data without overflow.

The present invention is now advantageous because the invention provides a look-ahead watermark that functions as a synchronizing signal in a FIFO memory structure to indicate that sufficient storage exists to receive one or more additional write bursts. Transmission of frames can be expedited because it effectively increases bus and memory resource utilization while reducing the processor context switching.

The look-ahead watermark implies that the FIFO can accommodate an additional DMA burst of the indicated quantity. The DMA burst size is not required to be the same size as the look-ahead watermark mediated burst. The look-ahead watermark functions more as a "capacity-indicator" than as a conventional transmit watermark mechanism. In another respect, the look-ahead watermark is "top-down" capacity indicator versus a standard "bottom-up" watermark.

The look-ahead watermark provides a "window" into the FIFO memory. Once an initial command to a DMA has been issued, the firmware that is part of a CPU (e.g., communications processor) can check a DMA flag, which indicates that the burst has successfully completed. The firmware then can examine the look-ahead watermark flag to determine if sufficient space exists inside the FIFO for an additional write burst. The look-ahead watermark also has the additional benefit that allows a second command to be constructed and submitted without incurring the same overhead expenses as required for the first command. It is always the same "type" of command, so no additional firmware resolution logic is required.

In accordance with the present invention, a method of controlling flow of network based data arranged in frames, and a network device is disclosed and claimed. The method comprises the steps of generating a watermark interrupt from a FIFO memory when the data in the FIFO memory has crossed a watermark threshold. A data burst is transferred through the direct memory access unit to the FIFO memory. The data burst is verified as complete by checking a direct memory access flag indicative that the data burst is complete. A look-ahead watermark flag is checked in FIFO memory to determine if sufficient memory space exists inside the FIFO memory for an additional data burst. If the watermark so indicates, then an additional data burst is transferred through the direct memory access unit to the FIFO memory when the watermark flag at the FIFO memory indicates that sufficient memory space exists inside the FIFO memory for an additional data burst.

Data is also transferred via instructions from firmware contained within a communications processor for verifying that the data burst is correct. Additionally, a start-of-packet interrupt can be generated by the direct memory access unit to a communications processor before transferring the data. The data burst size can be reported to a FIFO control logic unit to allow response to different changes in data throughput and burst rate. The data burst size can also be stored within a storage unit for the FIFO control logic unit.

In still another aspect of the present invention, a network device includes a FIFO memory unit having an interrupt circuit for generating a watermark interrupt indicative that data in the FIFO memory unit has reached a watermark value. A direct memory access unit receives the watermark interrupt from the FIFO memory unit and transfers data to the FIFO memory unit after receiving the watermark interrupt. The FIFO memory unit also includes means for generating a look-ahead watermark flag indicative that sufficient memory space exists inside the transmit FIFO memory for an additional data burst from the direct memory access unit. A system for transmitting data using a look-ahead watermark is also disclosed.

BRIEF DESCRIPTION OF THE DRAWINGS

Other objects, features and advantages of the present invention will become apparent from the detailed description of the invention which follows, when considered in light of the accompanying drawings in which:

FIG. 7 shows details of the administration block and system memory used in the present invention.

FIG. 8 shows a block diagram and chart of the administration block, statistics images and system memory of the present invention.

FIG. 8A is a table showing various bit values and descriptions for a primitive command register of the direct memory access unit used in the present invention.

FIG. 8B is a table showing various bit values and descriptions for a master interrupt register of the direct memory access unit used in the present invention.

FIG. 11 is a block diagram showing an Internet IP header.

FIG. 12 is a block diagram showing a TCP header.

FIGS. 27A–G illustrate a high level block diagram of how the first-in/first-out memory overflows on a second packet into a receive FIFO memory and the various read and write status pointers.

FIGS. 47–50 are tables showing the various fields of the receive and transmit message descriptors.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
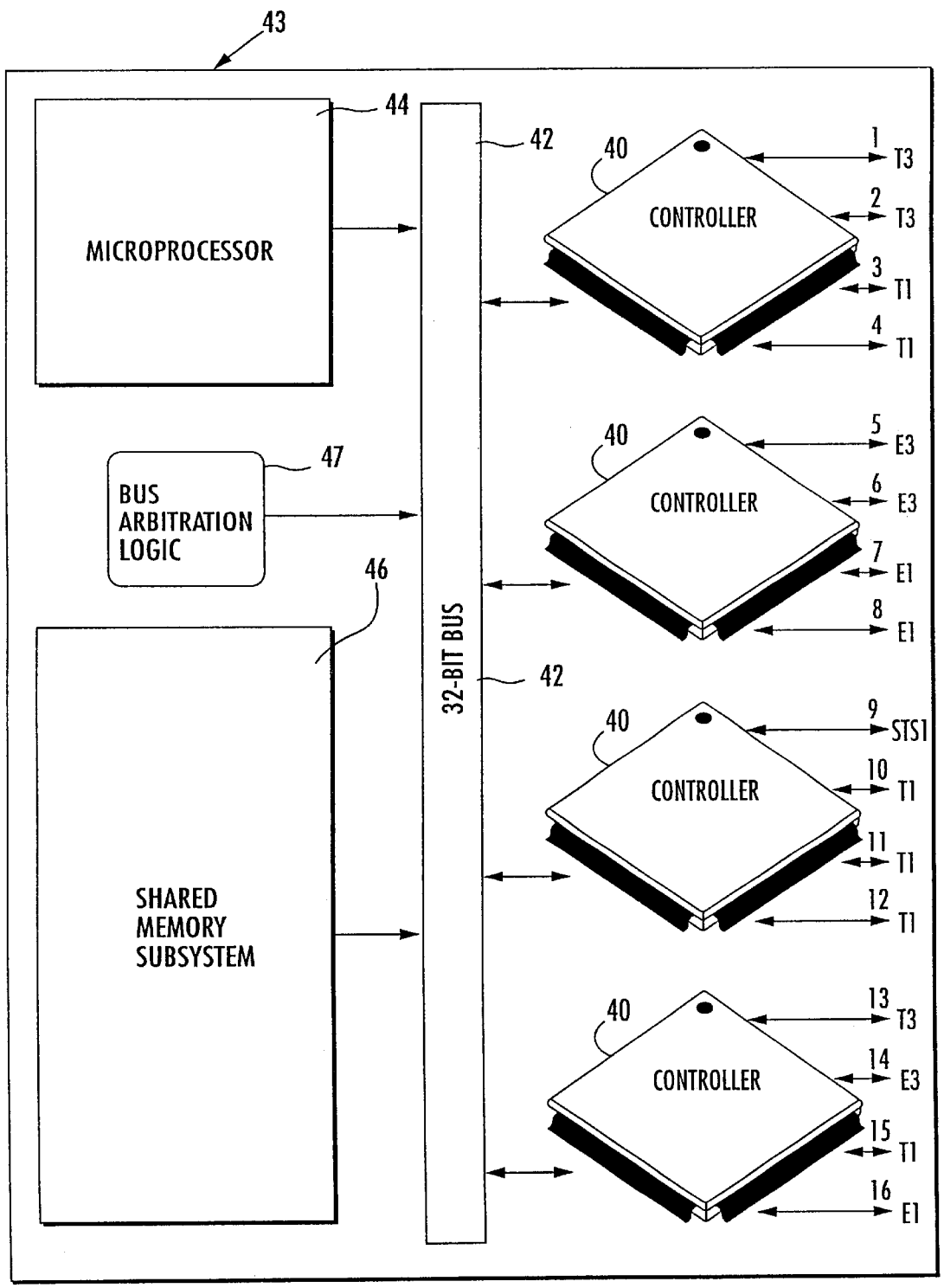
FIG. 1 is a high level block diagram of four network devices, shown as network controllers of the present invention, which connect into a 32-bit system bus and showing the host system microprocessor, bus arbitration logic unit and shared memory subsystem.
Figure 2:
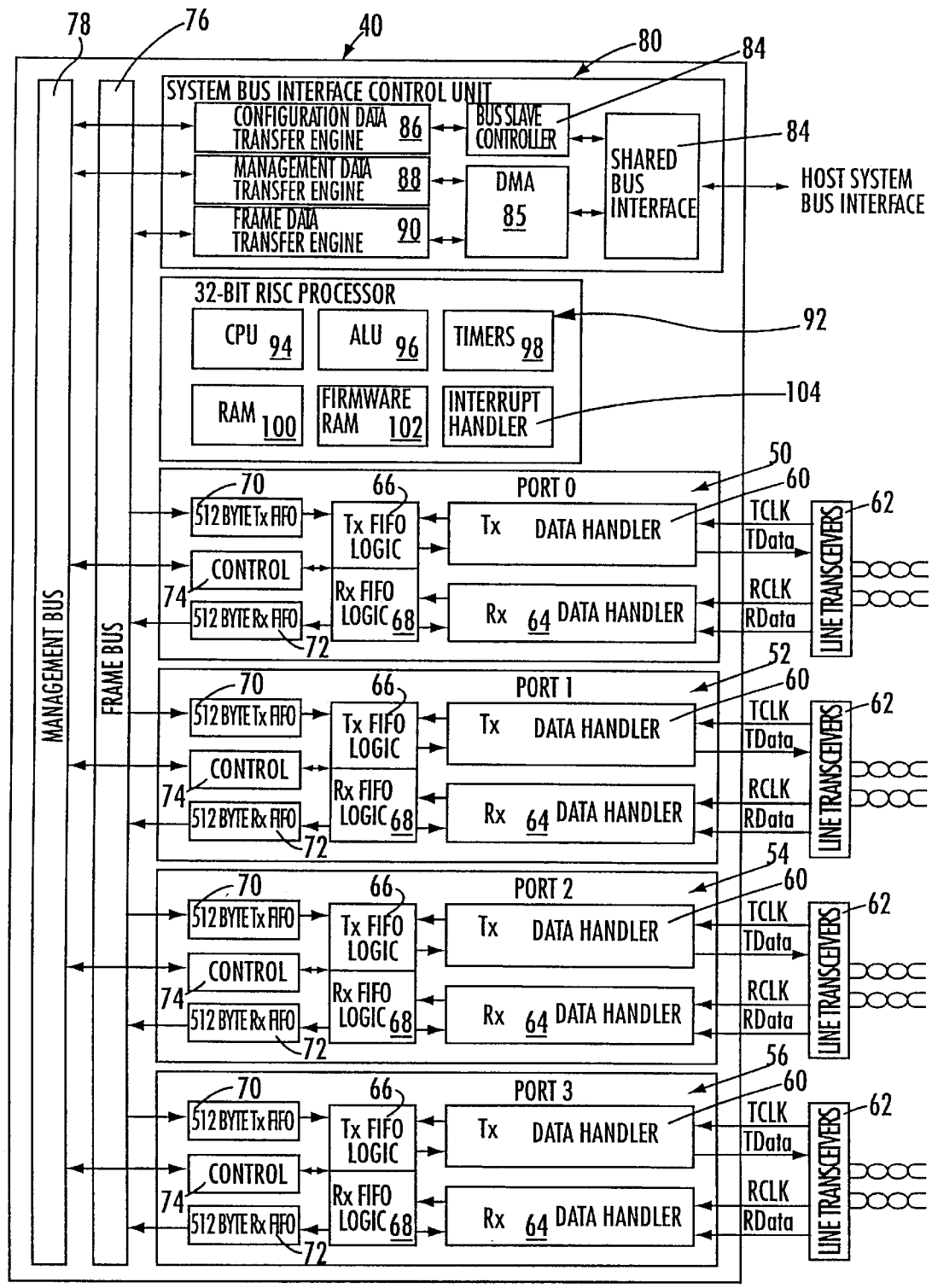
FIG. 2 is a high level block diagram of a network controller of the present invention and showing four ports, a communications processor and a system bus interface control unit.
Figure 3:
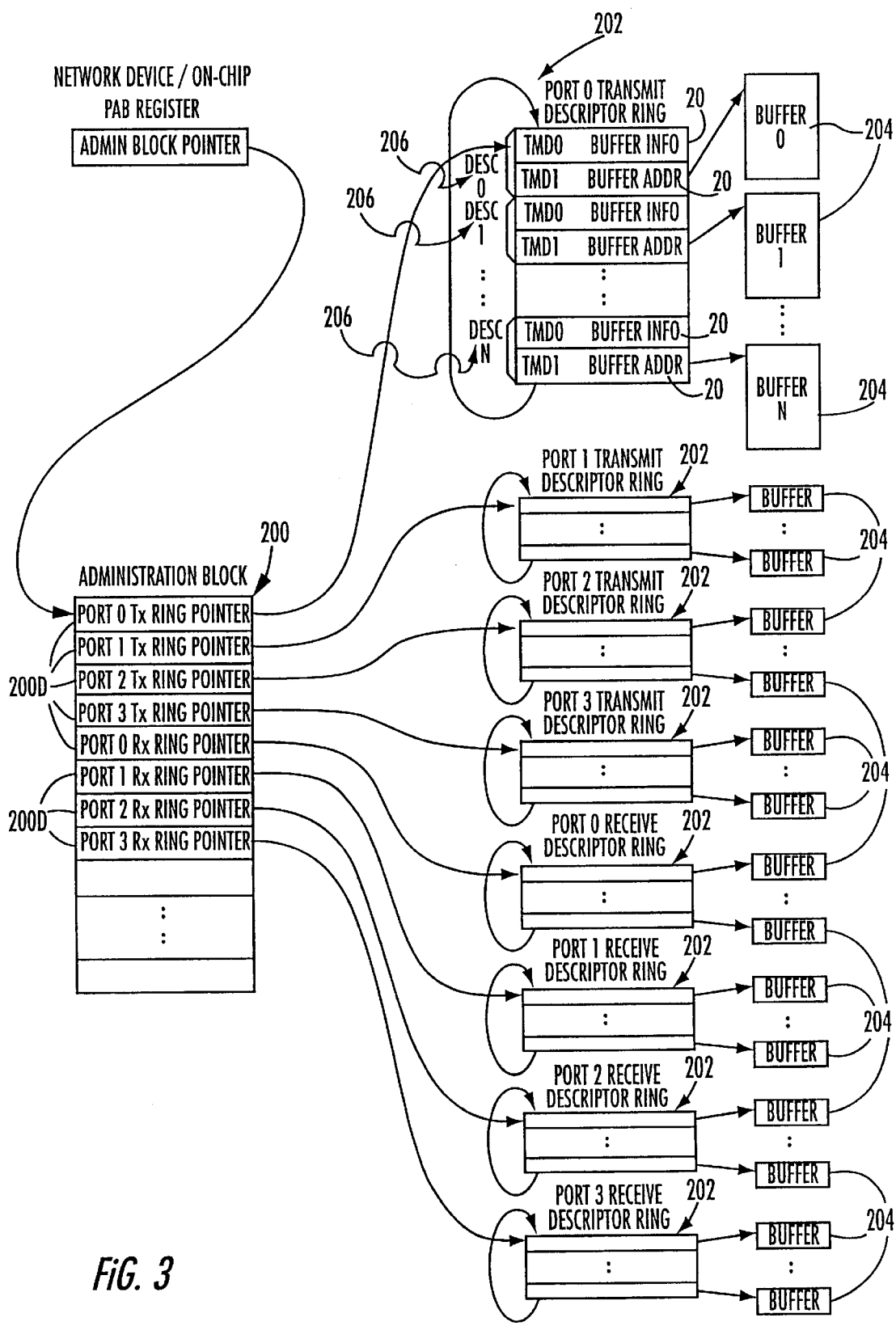
FIG. 3 is a high level block diagram of the buffer management and system memory used by an apparatus and the network controller of the present invention and showing the various descriptor rings.

Referring now to FIGS. 1–3, and more particularly to FIGS. 1 and 2, there is illustrated a high level diagram of a network controller and host system that are exemplary of the present invention. The network controller is an HDLC controller in one specific embodiment of the invention.

The present invention can be used in a number of different networks, including a conventional network making use of network controllers. For example, the invention could be used in many local area networks where computers are connected by a cable that runs from interface card to interface card. A wiring hub could provide a central point for cables attached to each network interface card. Hubs could connect connectors such as coaxial, fiber optic and twisted pair wire. One type of configuration could use unshielded twisted pair wire known as ten base T because it uses 10 megabits per second (NBPS) signaling speed, direct current, or base band, signaling and twisted pair wire.

The network could typically include routers, such as those that examine destination addresses contained in Net Ware IPX protocol. The routers would strip off the Internet packet, ring frame or other information and could send an IPX packet and any of its encapsulated data across a link. Any bridges could examine the address of each Internet packet and sent it across the circuit.

FIG. 1 illustrates a typical high level system diagram, which is illustrative of the general method, apparatus and system of the present invention. As illustrated, four network controllers 40, also known as network devices, connect into a 32-bit system bus 42, which is connected to host system 43. A host microprocessor 44 connects to the system bus 42, as does the shared memory subsystem 46. Each controller 40 has four ports, 50, 52, 54 and 56, that connect to respective high-level data link control layers, full duplex protocol lines 58.

Each network controller 40 is a high performance, four port, high speed network controller designed for use in next generation bridge and router equipment, as well as any equipment requiring HDLC operation at T3 speeds. Each network controller is preferably manufactured as a single chip.

As shown in FIG. 2, on the network side, the network controller 40 contains four ports as noted before, numbered 0 to 3, 50, 52, 54 and 56, each with separate transmit and receive FIFOs allowing half or full duplex operation. Each port 50–56 has a transmit data handler 60 that receives transmit clock signals (TCLK) and forwards data signals (T Data) to line transceivers 62. The receive data handler 64 also receives clock signals (RCLK) and sends data to and from the line transceivers 62. The ports also each include the illustrated transmit and receive First-In/First-Out (FIFO) logic circuits 66,68; the 512 byte transmit FIFO 70, control circuit 74, and the 512 byte receive FIFO 72. The 512 byte FIFOs 70,72 connect to the frame bus 76 and the control circuit 74 connects to the management bus 78. The FIFO logic circuits 66,68, and data handler 60,64 and the control 74 work as appropriate transmit and receive circuitry for the transmit and receive (Tx), (Rx) 512 byte FIFOs.

On the system side, the controller 40 has a high speed (from 25 to 33 MHZ), 32-bit system bus interface control unit (SBI) 80 which uses single cycle word transfers to minimize the controller's system bus usage and maximize its performance. The direct memory access unit (DMA) operation enables the device to become a bus master, and can use an efficient buffer management algorithm for store-and-forward applications. The system bus interface control unit 80 includes the shared bus interface circuitry 82, bus slave controller 84, DMA bus master controller, also DMA controller, or direct memory access unit 85, the configuration data transfer engine 86, management data transfer engine 88 (which both communicate to the management bus 78), and frame data transfer engine 90, which communicates to the frame bus 76.

Although not directly accessible by the user, the network controller also contains an embedded 32-bit RISC processor called the Communications Processor Core or simply communications processor (CPC) 92. The CPC handles such activities as gathering the per port statistics, DMA mode buffer management and data transfers, chip self-test and host/chip primitive command/response exchanges. The CPC 92 contains a CPU 94, ALU 96, timers 98, RAM 100, firmware ROM 102, and interrupt handler 104.

Internal buses tie all of the controller's subsystems together to support management and frame data transfers in an efficient manner. Separate buses, as well as the management bus 78 and frame bus 76, are used for respective management data and frame data to increase parallelism and thereby increase performance. The controller 40 is formed on a chip by means known to those skilled in the art.

Designed for store-and-forward applications, the network controller 40 uses an on-chip DMA engine and an efficient buffer management algorithm to transfer frames between system memory and the eight on-chip 512 byte FIFOs 70,74 via the 32-bit data or frame bus 42. In this operation, the controller 40 negotiates to become a bus master, takes ownership of the system bus, and then directly moves frame and administration data between the chip and system memory 46. The host processor 44 can directly access the controller's on-chip configuration/status registers by using the same bus operating in a bus slave mode.

The communications processor 92 uses a Harvard-type architecture with separate program and data buses, which support concurrent data transactions. A four stage pipelined control unit is used to effectively execute one instruction per clock cycle, as typical. To provide the high performance required by this architecture, the internal SRAM 100 used by the communications processor could have three ports, and is typically referred to as a Tri-Port RAM (TPR). The use of this architecture could allow a read from one register (or TPR), an ALU operation, and a write to a different register or TPR location, to all occur within the same clock cycle with one instruction.

A firmware program which controls the operation of the controller (including buffer management and data transfers, chip self-test and host/chip primitive command/response exchanges, and statistics gathering) is contained in the ROM 102, which could be an on-chip 8K ROM.

The network controller 40 uses a phase locked loop (PLL) to generate an internal system clock from the externally provided system clock. This PLL generated system clock is delayed in time so as to minimize the signal to system clock delays which can impact performance. Consequently, the controller system clock must be 25 or 33 MHZ.

For purposes of understanding, a broad overview of operation is given, while referring to FIGS. 1–8, followed by greater details of operation with reference to subsequent drawings. Once the controller has been initialized and the ports are up and running, a typical frame reception proceeds as follows. The binary 01111110 pattern of the opening flag of the frame is detected by the HDLC port receiver circuitry, which includes the Rx FIFO logic 68, Rx data handler 64 and line transceivers 62. This serial, digital data stream flows to the HDLC port's receiver circuitry where a search for the start-of-frame (a non-flag pattern) is performed to establish the octet alignment and beginning of the frame. Frame check sequence (FCS) calculation begins on the first octet after the actual frame.

A serial to 32-bit parallel word conversion is performed by the receiver circuitry and the data words are stored in the receiver (Rx) FIFO 74. Assuming the Rx FIFO 74 was empty at the start of this scenario, receive data continues to fill the receive FIFO 74 until the number of words therein is greater than the programmed watermark setting. As will be explained in greater detail below, at this point, an interrupt is issued to the firmware 102 running on the on-chip RISC 92 requesting a data transfer for the receive FIFO 74. This interrupt is internal to the network controller 40 and is not visible to the host system 44.

Upon receipt of the interrupt, the firmware 102 checks its on-chip copy of a current receive descriptor (fetched previously) for the requesting port. If it does not have ownership of a buffer, it will direct the on-chip DMA to refetch the appropriate descriptor for examination. The controller 40 will repeatedly fetch the descriptor until one of two events occur: (1) it is given ownership of the buffer, or (2) the receive FIFO overflows (the frame is lost in this case). Once buffer ownership is granted, the firmware responds to the interrupt by directing the DMA to transfer a burst-size of frame data words from the receive (Rx) FIFO 74 to a receive buffer in system memory. Upon transfer of the first burst of the received frame to system memory, a FAN (Frame Address Notification) interrupt may then be generated to the host via a Master Interrupt Register (MIR).

A cycle of receive FIFO 74 filling (by the network controller receiver circuitry), receiver-to-firmware interrupts, and FIFO emptying (by the DMA) continues until the end of the frame is encountered by the receiver circuitry. At this point, the frame check sequence (FCS) of the frame is checked by the receiver circuitry and a receive status word is generated and appended behind the frame in the receive FIFO 74. Receiver-to-firmware interrupts continue until the remainder of the frame and the receive status word have been transferred to the receive buffer in system memory, as explained below. The firmware uses the on-chip DMA 85 to update ownership, message size, error flags, etc. in the receive descriptor and then issues a "Frame Received" interrupt (RINT) to the host via the Master Interrupt Register (MIR) (FIG. 8B) indicating a completed reception.

A typical frame transmission takes place as follows. All frames are transmitted by the network controller 40 from transmit frame data buffers 204 assigned to entries in a transmit descriptor ring 202 (FIG. 3). When the system is ready for the network controller 40 to transmit a frame, it relinquishes ownership of the associated transmit descriptor (s) and then does one of two things: (1) waits for the controller's transmit poll timer to expire causing the chip to poll the Tx descriptor in search of a buffer it owns, or (2) is issued a Transmit Demand (TDMD) via the System Mode Register (SMR) by the host. In either case, the firmware instructs the DMA to begin fetching burst-size amounts of frame data from the buffer and placing it in the appropriate port's transmit FIFO. This will continue until the FIFO is filled above the programmed watermark or until the end of the frame is encountered.

Once enough words to satisfy the programmed transmit start point are in the transmit FIFO 70, the transmitter circuitry, which includes the transmit data handler 60, transmit FIFO logic 66, and line transceivers 62 initiates the transmission. The transmitter circuitry performs a parallel to serial conversion sending a continuous serial data stream. Opening flag(s) are sent followed by the frame data and then the Cycle Redundancy Check (CRC) or FCS for the frame. Frame Check Sequence (FCS) calculation starts with the first octet of the frame. As the transmit FIFO 70 empties below a watermark setting, the transmitter circuitry issues a private interrupt to the on-chip firmware 102 requesting more data be copied from system memory.

A cycle of emptying (by the transmitter unit) and filled (by the DMA) continues until the end of frame (EOF) has been written into the FIFO. When the transmitter removes the last data of the frame from the transmit FIFO, it optionally appends the FCS it has calculated (FCS appending by controller can be controlled on a frame by frame basis). The transmitter closes the frame by sending a closing flag(s).

The embedded processor 92 inside the network controller 40 maintains 12 statistics in registers on-chip for the host system to use. These statistics are accessed by the host using a bus-slave configuration/status register operation. As an additional feature, the controller can be requested to use its on-chip DMA to place a full copy of the on-chip statistics in system memory as will be explained below.

The system bus interface unit (SBI) 80 performs three key functions in DMA mode: (1) DMA engine for HDLC frame data transfers (bus master); (2) microprocessor port for access to configuration/status registers (bus slave); (3) and source for preferably two interrupts pins (MINTR# and PEINTR#). Both bus master and bus slave operations utilize the same 32-bit data bus and share some of the same control signals. There would be separate pins to select a proper mode for bus slave operations (CBIG) and bus master operations (DBIG).

The system bus interface unit (SBI) 80 contains the multi-channel DMA unit 85 for performing block data transfers with system memory 46 via a shared bus 42 without the involvement of the host processor 44. The controller requests ownership of the system bus whenever it has need to access an administration block 200, a transmit or receive descriptor 206, or a transmit or receive frame data buffer 204, as will be explained below with reference to FIG. 3.

Each time the network controller 40 accesses one of these data structures, it negotiates for bus ownership, transfers data (this may be several words), and then relinquishes bus ownership. For a given bus ownership, only sequential addresses are accessed. The size of each bus transaction (the number of words transferred or "burst size") can vary and is programmable for frame data transfers and statistics dumps. Administration block 200 and descriptor transfer size is determined by the network controller 40 on an as-need basis, and can range from one to thirty-two consecutive words. The DMA unit 85 inside the system bus interface unit 80 provides the necessary timing for single cycle access in order to minimize system bus utilization by the controller.

Configuration/status register access to the network controller 40 could be done using the same 32-bit data bus that is used for DMA transfers. For this reason, register accesses cannot be performed when the controller is the bus master. Configuration/status ("config" for short) operation is designed to work with most popular microprocessors. All locations inside the network controller could be implemented as 32-bit registers. All configuration and status registers, along with all of the network statistics, could be accessed via this interface.

Figure 4:
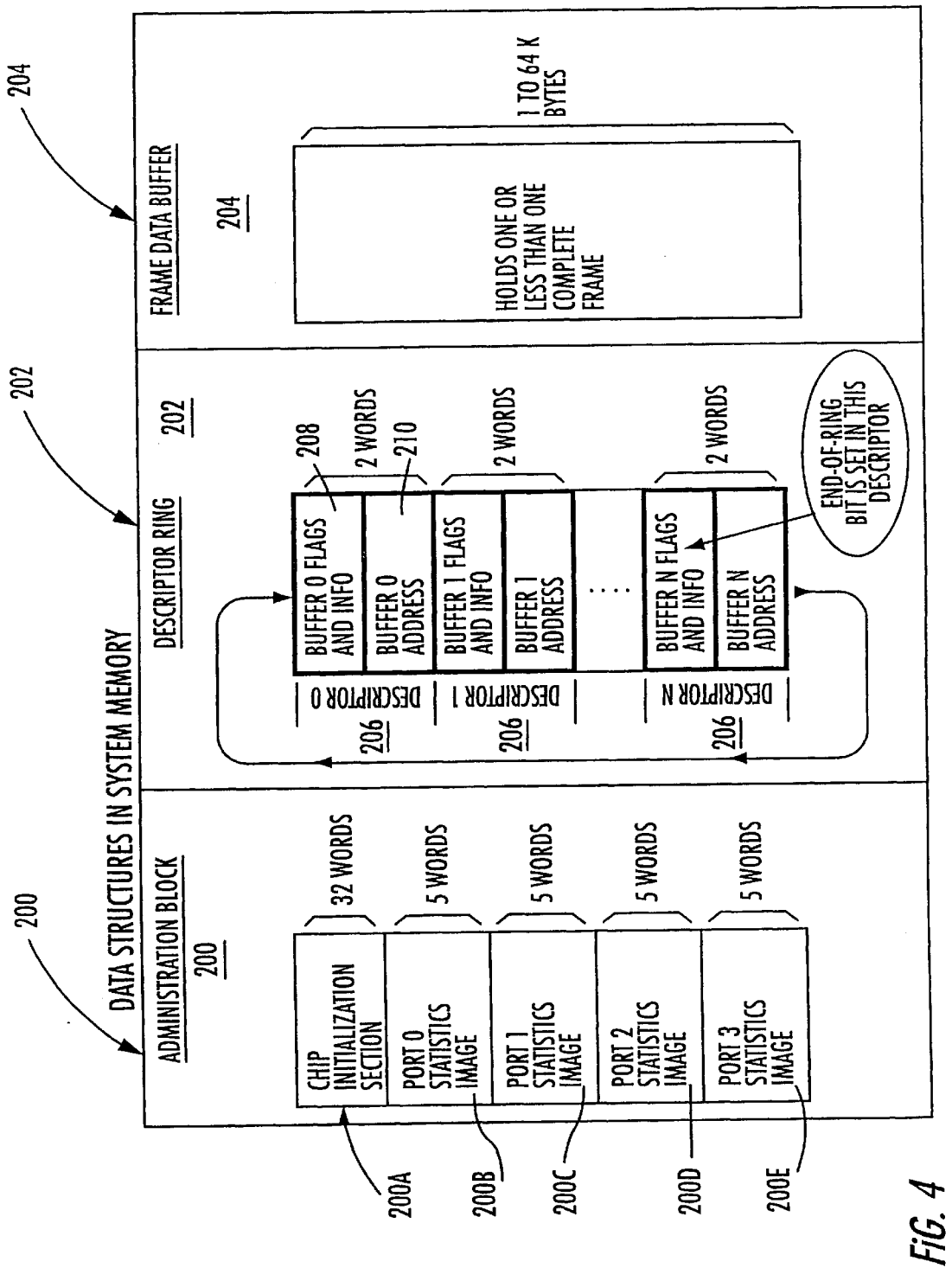
FIG. 4 is a high level block diagram of the data structure and system memory showing the administration block, descriptor ring and frame data buffer.

Referring now to FIG. 4, operation of the controller of the present invention involves three important system memory data structures: (1) administration block 200; (2) descriptor rings 202 with descriptors 206; and (3) frame data buffers 204. For any given application, one administration block 200, eight descriptor rings 202 (FIG. 3) and multiple frame data buffers 204 are used. There is one descriptor ring 202 for each FIFO 70,72 at each port as illustrated in FIG. 3. Before initializing the controller 40, the host 44 is expected to allocate and configure these data structures in system memory. The administration block 200 is used for chip initialization and as an exchange point for network statistics maintained by the controller.

Figure 5:
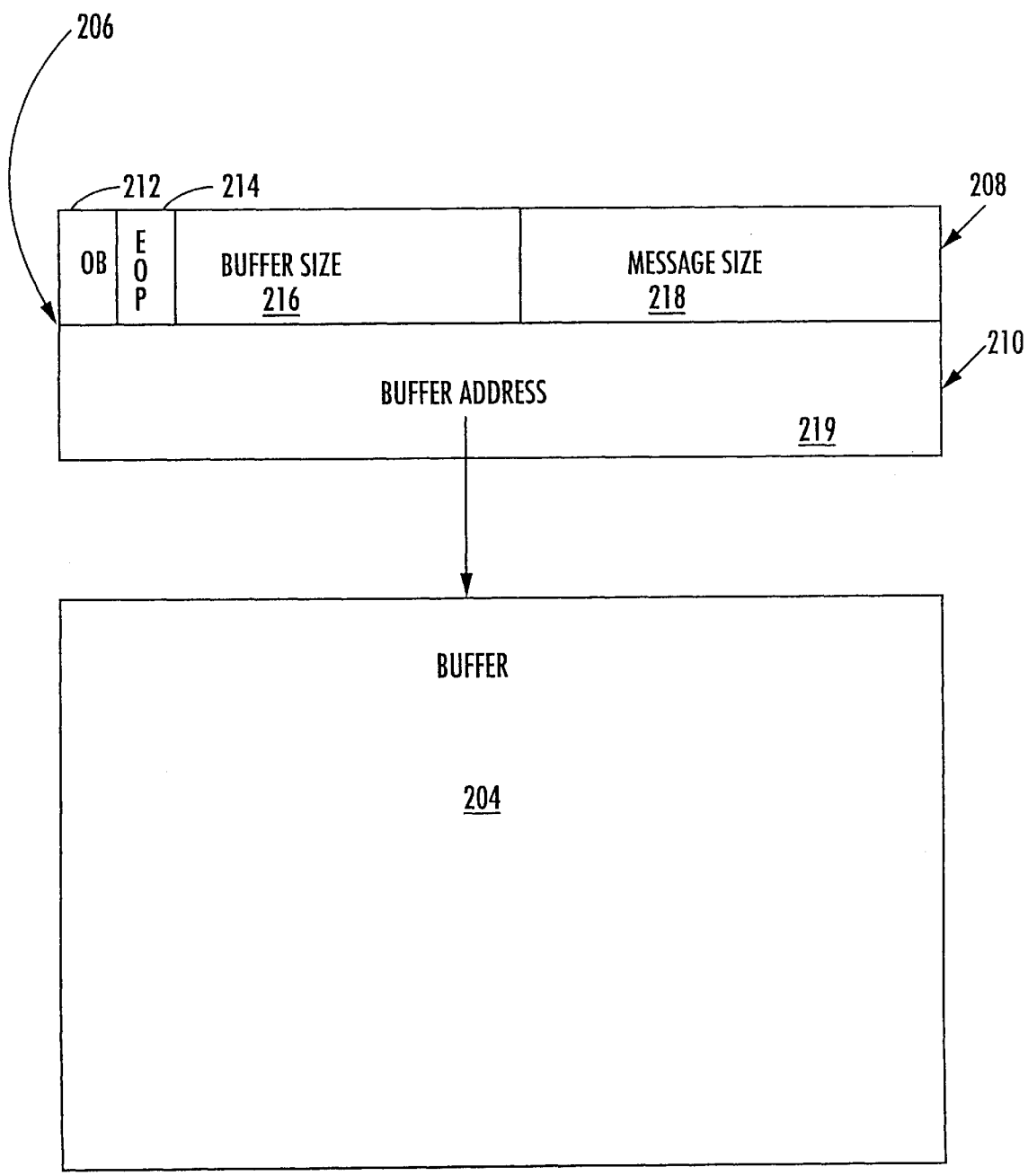
FIG. 5 is a high level block diagram of a descriptor and buffer.

Each descriptor ring 202 is a circular queue with entries or descriptors 206 containing pointers and information for frame data buffers 204 as is known to those skilled in the art. Examples of devices and systems showing the use of descriptors and descriptor rings are disclosed in U.S. Pat. Nos. 5,299,313 and 5,136,582, the disclosures which are hereby incorporated by reference. Each descriptor ring 202 is dedicated to a specific FIFO 70,72 within the controller 40 and each two-word descriptor entry 206 within a ring is associated with one specific frame data buffer 204 in system memory (FIG. 5). Data buffers are defined as blocks of memory (typically ranging from 512 to 2,048 bytes) containing frames for transmission or providing space for frame reception.

As part of the initialization of the controller 40, the host must set aside a section of system memory. This memory is used to hold buffer management pointers, configuration information and per port network statistics. Since the administration block 200 can be updated periodically with statistics and can be referenced by the controller 42, it must remain an active allocation of memory throughout the operation of the device.

The administration block 200 (also called initialization block) consists of 512, contiguous bytes, and is word-aligned in memory. FIG. 7 illustrates greater details of the administration block 200 and its details. The first 15 words 200a of the administration block contain information used for chip initialization. The controller always refers to an on-chip copy of this section unless instructed to fetch part or all from shared system memory 46 again. The initialization section 200a of the administration block 200 contains system memory pointers to the eight descriptor rings 202, and set up information for six on-chip timers and nine DMA bus master burst sizes (maximum number of words transferred for various types of data per bus ownership).

The next contiguous four words 200b can be used by the host 43 to define the geometry of the descriptor rings 202 and associated frame data buffer dimensions in external shared memory 46, as will be explained below. The controller 40 can automatically construct the (transmit) TX and (receive) RX descriptor rings 202 (FIG. 3).

The remaining words 200c of the administration block 200 provide space for the controller 40 to copy images of its on-chip HDLC frame statistics into shared system memory 46 when instructed to do so by the appropriate primitive. These periodic statistics snapshots are for the system to use. Allocation of these words of the administration block 200 is not required if the statistics dump feature is not used.

Figure 45:
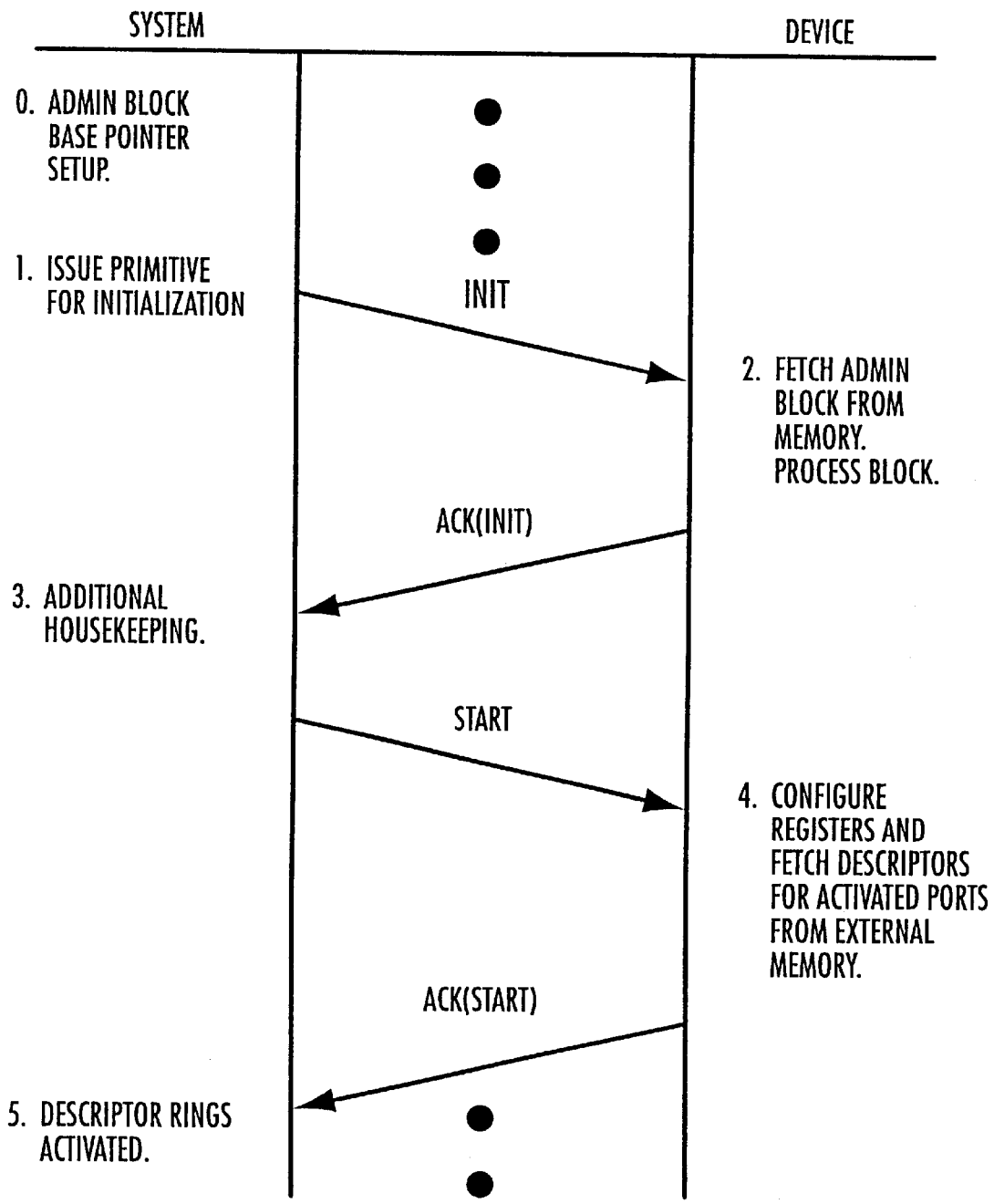
FIG. 45 is a chart showing the primitive signaling between the host system and network device, e.g., the network controller, of the present invention.
Figure 46:
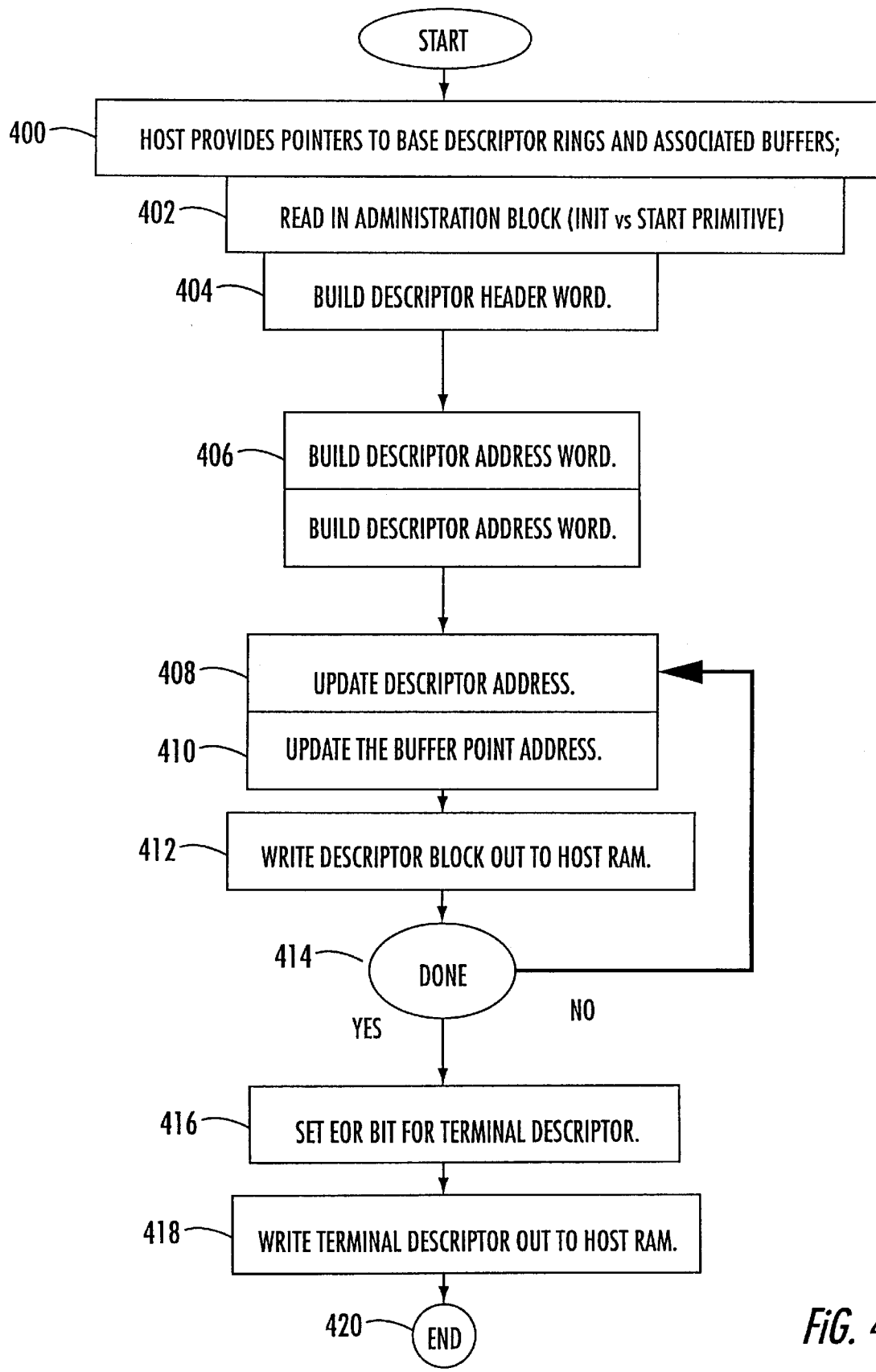
FIG. 46 is a flow chart describing the process of building descriptors within the network device.

After chip reset is complete, once a reset-in-progress pin has gone inactive, the initialization procedure can begin as shown in FIGS. 45 and 46, and explained in greater detail below with reference to Section V. First, the host sets up the admin block 200, descriptor rings 202 and frame data buffers 204 in system memory. Second, the host 44 writes the starting system address of the administration block 200 to a register inside the controller 40 called a "Pointer to the Administration Block" (PAB), and optionally enables primitive interrupts. Next, an interrupt (INT) primitive is issued by the host 44 to the network controller. This causes the controller to copy the first 32 words (FIG. 7) of the administration block 200 into the chip of the network controller for processing. The network controller then responds with an acknowledgment INIT COMPLETE or ACK (INIT) primitive interrupt to the host. At this point, the host 44 is free to housekeep or configure all of the controller's registers, establishing modes of operation for each HDLC port, enabling transmitters and receivers, and enabling and masking various interrupts. As further shown in FIG. 45, when finished, the host issues a START primitive to the network controller 40 to initiate normal operation. The START primitive causes the controller to prefetch the first two descriptors in each of the eight transmit and receive descriptor rings and prepare for frame transfers.

The first eight entries in the administration block 200 are system addresses which act as pointers to the top of each descriptor ring 202 (FIG. 3). Since the descriptors 206 must be word-aligned (or byte-aligned) in memory, these pointers should always be programmed with zeros in the least significant two address bits (the byte address). In other words, all descriptor ring pointers should be evenly divisible by four. Unpredictable operation will results from non-aligned descriptor ring pointer addresses. The network controller 40 refers to its copy of these pointers once the INIT primitive is completed, changing the pointers in system memory after the INIT has no effect unless another INIT is performed or a refresh descriptor ring primitive is issued.

As noted before, each transmit channel and each receive channel within each port 50,52,54 and 56 uses a dedicated descriptor ring 202 for a total of eight rings (one transmit ring and one receive ring per port) (FIGS. 3 and 4). A descriptor ring 202 (FIG. 4) is a circular queue comprising of several two-word entries called "descriptors 206". Each descriptor entry 206 describes one frame data buffer 204. The first word 208 of a descriptor 206 entry contains information about its frame data buffer 204 and the frame, or partial frame, that the frame data buffer contains (FIG. 5). The second word 210 of a descriptor 206 entry is a system address, a pointer to the top of its associated frame data buffer. Descriptor rings 202 can range in size from 1 to 8K entries. The network controller 40 is given a pointer to the top of each ring in the administration block 200 at initialization. Descriptor entries 206 are always accessed sequentially starting at the top of the ring. The last descriptor in a descriptor ring 202 contains a flag marking the end of the ring. The controller returns or wraps to the first entry in the ring whenever it encounters an end-of-ring flag.

An ownership bit (OB) 212 in the first word of each descriptor 206 indicates whether the host or the controller owns the associated frame data buffer. Ownership follows a specific protocol that must be adhered to by the controller and the host. The rule is simple: once ownership of a descriptor 206 has been relinquished to the other part, no part of the descriptor or its associated buffer may be altered. The host gives the controller ownership of empty buffers for frame reception and full frame data buffers for frame transmission. Conversely, the network controller passes ownership back to the host for transmit buffers it has used and receives buffers it has filled.

For frame reception on any given port, the host 44 is required to provide the controller 40 with ownership of contiguous descriptors pointing to empty frame data buffers 204. After the very first words of the frame have been transferred to memory 46, a Frame Address Notification (FAN) interrupt is issued (FIGS. 13–21 explained below in greater detail in Section I). Once a frame is fully received by the controller, ownership of its constituent descriptors is then reassigned. The host is signaled regarding this event via an RINT interrupt. The host 44 is obligated to read a master interrupt register (MIR) (FIG. 8B) in order to surmise the specific port issuing the signal. Once this is accomplished, the frame may then be dispatched in some fashion and ownership of the relevant descriptors returned to the controller.

In typical operation, the host 44 "follows" the network controller 40 around the descriptor ring 202 leaving "empty" buffer descriptors 206 in its wake for the network controller 40 to use. If the network controller 40 gets too far ahead of the host 44, it can wrap around the descriptor ring 202 and encounter descriptors 206 it does not own. Incoming frames may be lost if this occurs. The host is informed of any receive FIFO 70 overflows via an Early Congestion Notification (ECN) interrupt (FIGS. 26–43 explained in greater detail below with reference to Section III). The host may then react to alter its behavior in order to avoid additional lost frames.

For frame transmissions on a given port, the network controller 40 "follows" the host 44 around a transmit descriptor ring 202 leaving used buffer descriptors in its wake for the host to reclaim. The host only gives the controller 40 ownership of descriptors 206 when it has one or more frames ready for transmission. Once a frame is fully transmitted by the controller, ownership of its constituent descriptors 206 is passed back to the host 44 for reuse. The host 44 is signaled regarding this event via a TINT interrupt.

In some applications, the host 44 may elect to use frame data buffers 206 which are smaller in size than the frames received or transmitted. A single frame spans multiple buffers. This allows frames to be dissected (scattered on reception) or assembled (gathered on transmission) by the network controller 40. Multiple data buffers can hold the constituent pieces of a frame by "chaining" the associated descriptors 206 together. By definition, chained descriptors are consecutive entries in a descriptor ring with the end-of-frame (EOF) flag 214 set in the terminating descriptor of the chain. In other words, the buffer of a descriptor entry, which is owned but whose end-of-frame flag is not set, is considered to be part of a frame, not an entire frame.

During reception of a large frame, the network controller 40 chains descriptors 206 together one by one as it completely fills each frame data buffer 204. When the end of frame is received and transferred to system memory, the end-of-frame flag (EOF) is set in the terminal descriptor of the chain. During transmission, the network controller 40 is able to sequentially construct a single frame from the contents of chained buffers. Transmission of the frame terminates only when it encounters a buffer whose descriptor has set the end-of-frame flag.

Figure 44:
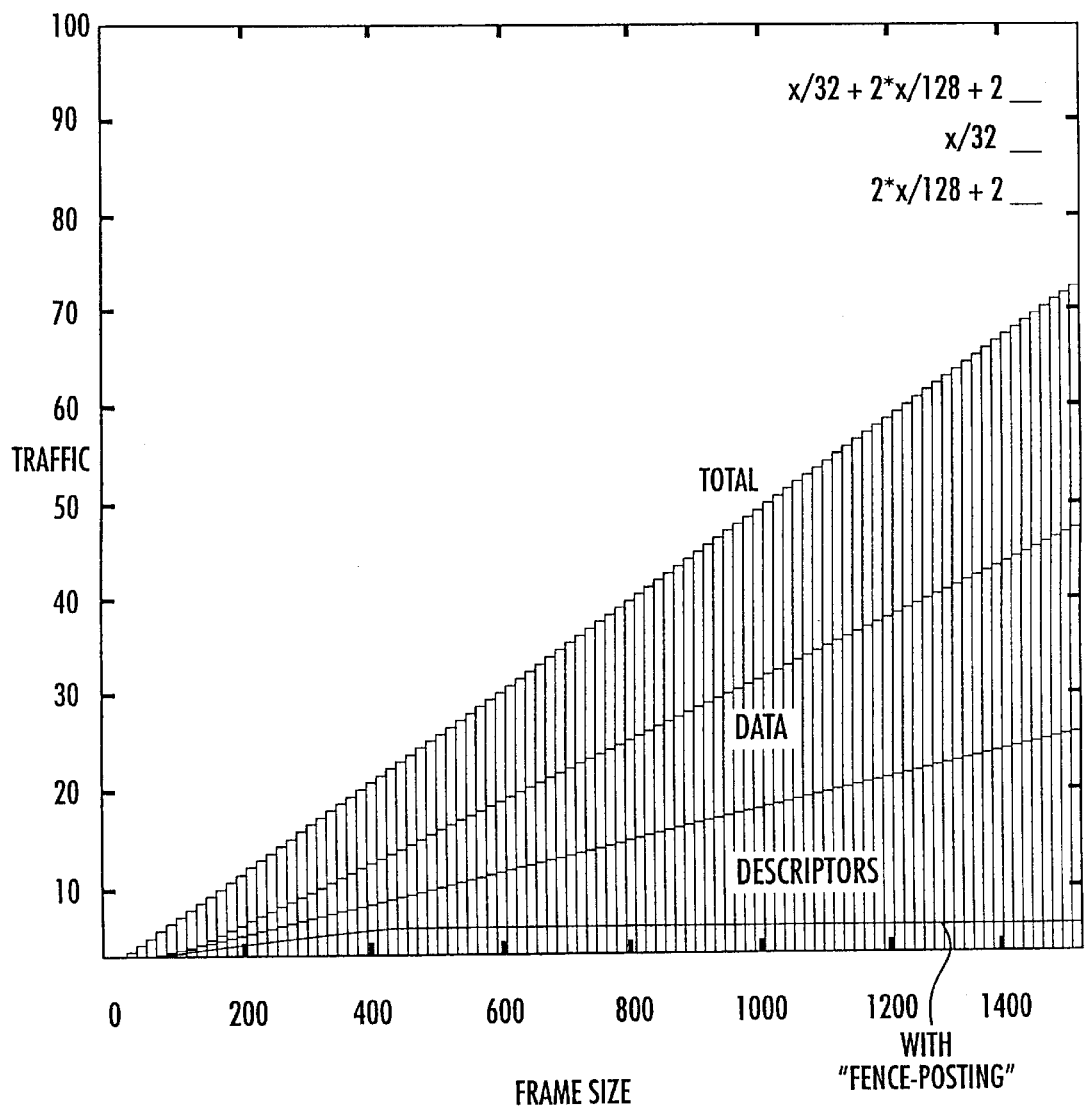
FIG. 44 is a graph showing in detail estimated traffic composition of the host bus with the use of regular descriptors and the "fence-posting," when only the first and last descriptors are updated.

The network controller 40 optimizes bus utilization whenever three or more frame data buffers are chained together by updating the first and last descriptor entries involved (FIG. 4). When the network controller 40 is finished with the buffers involved in a chained frame, it first returns ownership of the last descriptor and then it returns ownership of the first descriptor. These are the "fence posts" of the frame (FIG. 44 and Section IV below). The host 44 assumes ownership of all the intervening frame data buffers even though they are owned by the controller. Hence, whenever the host encounters a host-owned descriptor not marked by the end-of-frame flag, it should assume ownership of all successive descriptors up to and including the next host-owned descriptor with the end-of-frame flag set.

All of the flags and fields of the first and last descriptor in a "fence-posted" chain are updated by the controller 40 to provide accurate information about a frame once it has been fully transmitted or received. The first word 208 of the descriptor 206 also includes a buffer size 216 and message size 218. For receive frames, the message size 218 (MSIZE) field of the first descriptor in the chain is updated with the byte count of the entire frame, not simply the byte count of the associated frame data buffer (since this is equal to the buffer size). However, the message size field 218 of the terminal descriptor will contain only the actual number of bytes occupied by frame data in its associated buffer. This allows the host to easily locate the receive status word stored in the first complete word following the frame data in the buffer (note that the four bytes of the status word are not included in the count stored in the MSIZE fields).

No more than one frame should ever exist in a single frame data buffer 204. A single frame can span the frame data buffer 204 of multiple descriptors 206 if they are contiguous in the descriptor ring 202. This is called buffer chaining. The network controller 40 should always have ownership of several empty and contiguous receive buffers. The network controller 40 should only be given ownership of transmit buffers that contain frames ready for transmission.

Although not required, best performance is achieved when frame data buffers 204 are word aligned in memory and large enough that chaining is not needed.

In a typical store-and-forward application, the host maintains a "pool" of empty, unallocated frame data buffers 204 in system memory. Assignment of a frame data buffer 204 to a receive descriptor 206 effectively removes it from this pool. Once a frame data buffer 204 has been filled, it is reassigned or switched to one or more transmit descriptors. When transmission is finished, the frame data buffer 204 is returned to the pool for reuse and the cycle repeats.

The next two words in the administration block 200 after the descriptor ring pointers 200d contain timer reload and control information 200e. The controller uses a hardware prescale timer 220 (FIG. 6) and divider 222 to divide down the UCLK frequency 224. A prescale timer reload value 226 is used to adjust the output frequency of the prescale timer. Typically, a prescale reload value is selected to result in a 20 millisecond (50 Hz) prescale timer period through faster and slower periods are possible. The output of the prescale timer 226 is used as the base increment frequency for several secondary 8-bit timers 228 maintained inside the network controller 40. These secondary timers can be: statistics dump timer 230, ports 0–3 transmit descriptor poll timers (four) 232–238. Each of the five, 8-bit timers has an associated reload value which is established in the administration block 200. The following equation shows how to calculate prescale timer reload values.

$$\text{Prescale Reload} = 65.536 - \frac{T_{prescale}}{16 \times T_{UCLK}}$$

where $T_{prescale}$ is the desired prescale timer period and $T_{UCLK}$ is the system clock period.

TABLE 1

Typical Prescale Timer Reload Values

| $f_{UCLK}$ (MHZ) | $T_{UCLK}$ (ns) | Decimal Reload Value (20 ms) | 16-Bit Hex Reload Value (20 ms) |
|---|---|---|---|
| 33 | 30 | 23.869 | 0x5D3D |
| 25 | 40 | 34.286 | 0x7EE6 |

The next equation shows how to calculate secondary timer reload values:

$$\text{Secondary Reload} = 265 - \frac{T_{secondary}}{T_{prescale}}$$

where: $T_{secondary}$ is the desired secondary timer period and $T_{prescale}$ is the prescale timer period.

TABLE 2

Typical Secondary Timer Reload Values

| $T_{prescale}$ (ms) | $T_{Secondary}$ (seconds) | Decimal Reload Value | 8-Bit Hex Reload Value |
|---|---|---|---|
| 20 | 0.5 | 231 | 0xE7 |
| 20 | 1.0 | 206 | 0xCE |
| 20 | 2.0 | 156 | 0x9C |
| 20 | 5.0 | 6 | 0x06 |

Each of the secondary timers has a corresponding enable control bit contained in the timer enables field of the administration block (FIG. 7). A "one" enables the timer; a "zero" disables the timer. The following table shows the bit positions of each of the five secondary timer enables. The controller refers to its on-chip copy of the enables once INIT is completed. Changing the enables in system memory has no effect unless another INIT is performed or a TIMER_ENABLE primitive is issued (0x0F). The prescale timer is automatically disabled if none of the secondary timers are enabled.

TABLE 3

Administration Block Timer Enable Field
(1 = enabled; 0 = disabled)

| Bit: | 7 | 6 | 5 | 4 | 3 | 2 | 1 | 0 |
|---|---|---|---|---|---|---|---|---|
| Name: | Reserved | | | Stats Dump | Tx 3 Poll | Tx 2 Poll | Tx 1 Poll | Tx 0 Poll |

Figure 6:
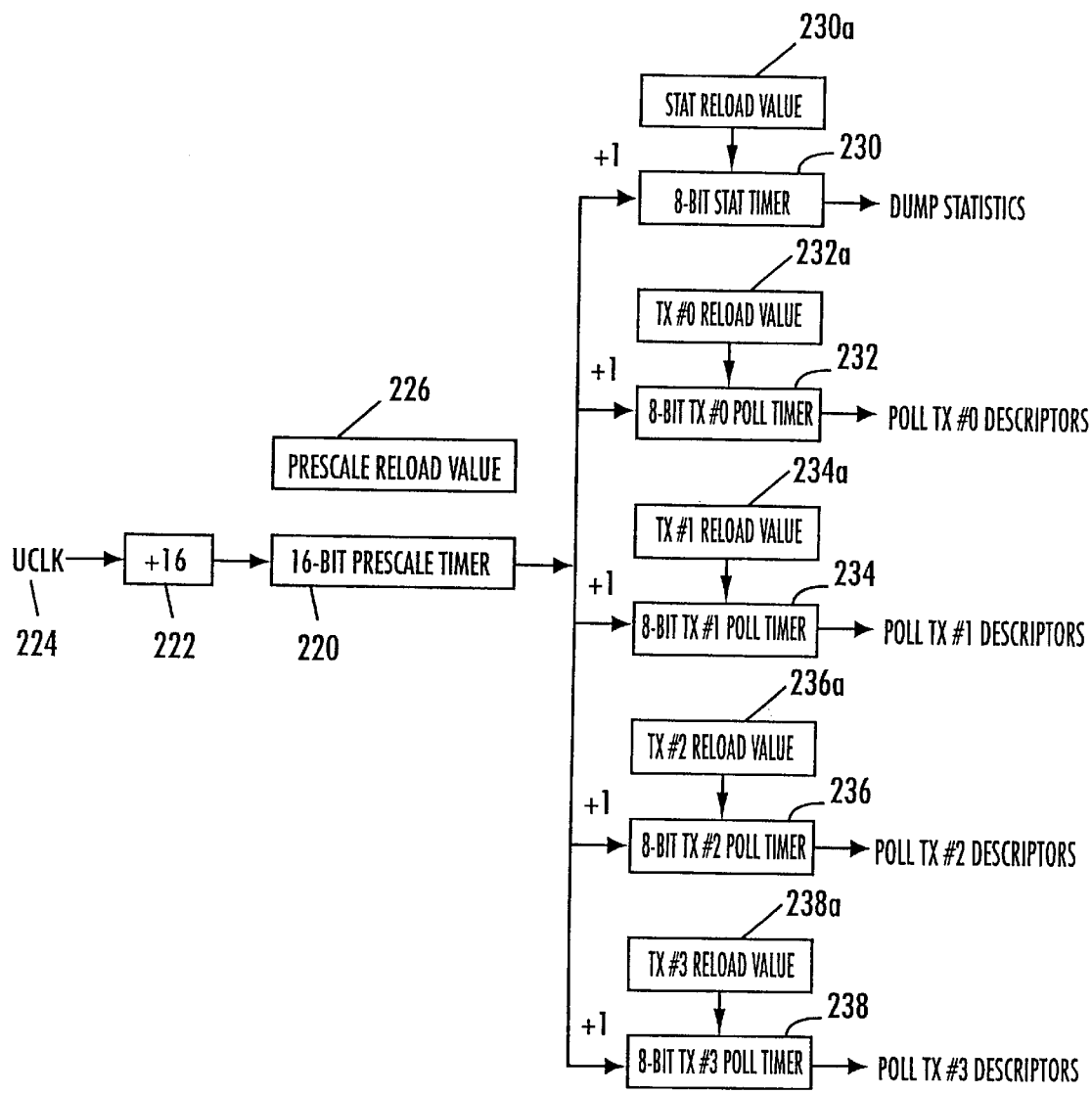
FIG. 6 is a high level block diagram of the timer operation of the network controller of the present invention.

The granularity of the prescale timer 220 permits a wide range of timer resolution. When selecting a prescale timer reload value 226, each prescale timer expiration consumes a small fraction of the controller's on-chip processing bandwidth. Selecting a very small prescale timer period (large reload value) can unintentionally hamper the controller's ability to service incoming and outgoing frames and thereby effecting the overall performance of the device. It is recommended that the prescale timer not be operated below a one millisecond period (FIG. 6).

When selecting secondary timer reload values for the transmit descriptor poll timers 232–238, two factors should be considered: (1) the half or full duplex operating mode of the port; and (2) the expected traffic on a given port, e.g., the percent of available bandwidth that is actually used. In general, the greater the traffic, the higher the poll frequency. Some systems may opt not to use transmit descriptor polling, and instead rely on the transmit demand (TD) bits in the system mode register (SMR) to initiate frame transmission.

The next two words 200f in the administration block 200, after the timing words 200e, relate to burst size (the four bytes located at PAB+40) (FIG. 7), and indicate the individual burst sizes for DMA transfer of data to the corresponding transmit ports. The next four bytes (PAB+44) determine the burst sizes for DMA transfer of frames from the corresponding receive ports. The DMA 85 will always transfer data in a burst size determined by the values set in these fields, until the remaining data to be transferred is less than the selected burst size. The controller refers to an on-chip copy of these values once the INIT primitive has been completed. Subsequent changes must be indicated via submission of the appropriate primitive command.

Setting the burst and frame buffer sizes equivalent will minimize the required number of bus transfers per frame and provide improved performance, if system constraints will permit large DMA bursts.

A system clock period 200g is located in byte #1 of PAB+48, should contain the value "0x28" if operating at 25 MHZ or "0x1E" if operating at the 33 MHZ system clock. The controller refers exclusively to the on-chip copy of this value once the INIT primitive has been completed, changing this value in system memory after INIT has no effect unless another INIT is performed.

"N1" is a 16-bit variable that is selectable by the host for the maximum frame size to be received. The N1 values for Ports #0 and #1 are located at PAB+52 200h and for Ports #2 and #3 are located at PAB+56 200i. The N1 value would typically be programmed by the host at initialization and could range anywhere between one byte to 64K bytes. Typically N1 is 2K bytes or less for most applications. Any received frame that exceeds N1 will cause the "Frames Larger Than N1" statistic to be incremented for that port. The controller 40 refers to an on-chip copy of these values once the INIT primitive is completed, changing these values in system memory after INIT has no effect unless another INIT is performed.

The network controller 40 will automatically build the specific transmit and/or receive descriptor rings 202 in shared memory 46, if the values of the "Transmit (TX) Ring Size" or "Receive (RX) Ring Size" fields (PAB+60 through PAB+72) 200b are nonzero. Otherwise, if these fields are zero, the controller firmware 102 will not build the associated descriptor rings, but rather, expects the host 44 to have already built these structures in shared memory 46.

A primitive command register (PCR) (FIG. 8A) provides a mechanism for the host's system software to issue commands/instructions to the network controller 40 internal firmware 102 for processing. Each and every host primitive issued (in the lower half of this register) is acknowledged by the firmware via a provider primitive (in the upper half of this register).

A primitive exchange protocol must be followed by both host and firmware for the primitive mechanism to work properly. The host must issue one and only one primitive at a time, waiting for the provider primitive acknowledgment before issuing another primitive. On the other side, the firmware will generate one and only one provider primitive for each host primitive issued.

A Master Interrupt Register (MIR) (FIG. 8B) records events for reporting to the host processor via a MINTR# pin. The register is roughly organized into one byte of interrupt events per HDLC port with some miscellaneous bits (i.e., PINT, SPURINT, MERR, PPLOST, SERR, HPLOST, WERR) distributed for byte positional consistency.

Other registers not described in detail, such as a Master Interrupt Mask Register (MIMR) and a Port Error Interrupt Mask Register (PEIMR), allow the host to select which corresponding MIR and PEIR interrupt events will actually generate an interrupt on various pins. These registers do not effect the setting of bits in the MIR and PEIR, they only mask the generation of host interrupts as a result of an interrupt bit being sent.

I. Frame Address Notification (FAN)

Referring now to FIGS. 9–21, there are illustrated further details and drawings showing the frame address notification (FAN) interrupt that allows a hybrid option between the classic store and forward (SF) architecture and the cut-through (C/T) architecture. In accordance with the present invention, the frame address notification (FAN) is an interrupt signaled to the host processor 44 when all relevant address fields for a received frame currently reside in shared memory 46. The frame may then be processed by an address and look-up engine with the appropriate algorithm and look-up table 46c (FIG. 20) and dispatched to the proper port and destination. This provides that the pipelining effect because routing is permitted to occur in parallel while the remainder of a frame could be incoming off the network wire.

Additionally, by the careful selection of the DMA 85 burst-size, any appropriate address field can be made available when the initial burst is read of the frame. The MAC-level headers, IP addresses, or even the TCP/UDP ports could be read into memory depending upon the size of the burst. This facilitates L2–L3 or L4 frame switching applications.

Figure 9:
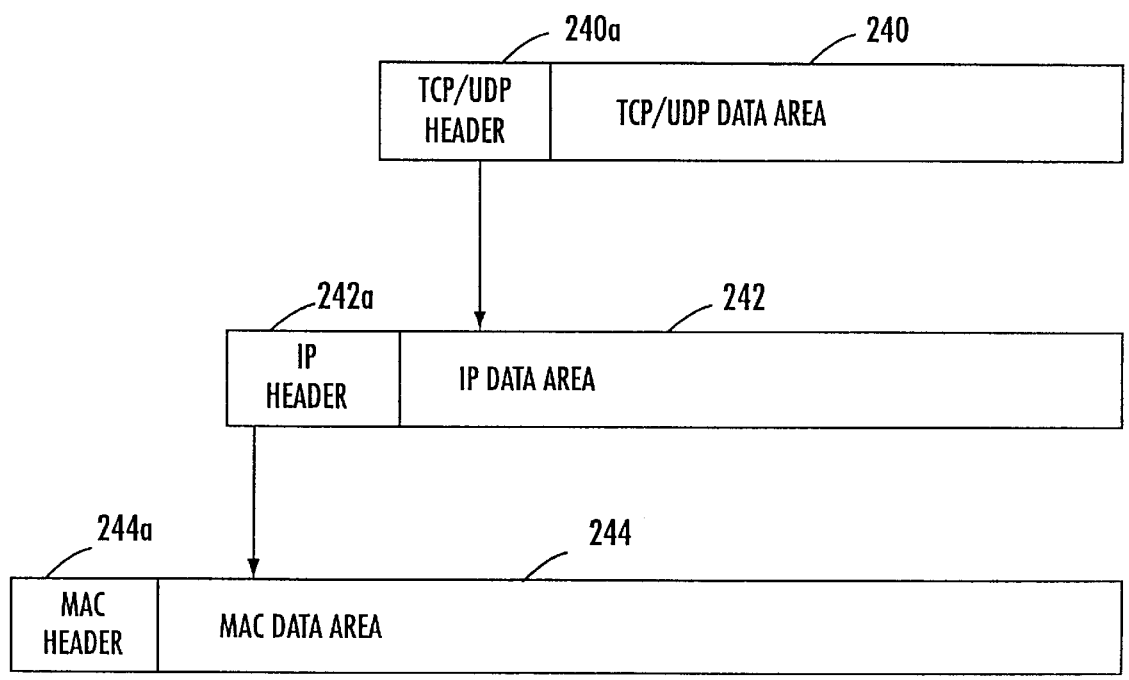
FIG. 9 is a block diagram showing the hierarchical configuration of various headers as an example of layering.

FIGS. 9, 10, 11 and 12 illustrate how the TCP/UDP header is encapsulated in an IP data area and the IP header contained in a MAC data area. FIG. 9 gives a good indication of layering. The TCP/UDP data area 240 and TCP/UDP header 240a, IP data area 242, header 242a, MAC data area 244 and MAC header 244a are illustrated.

Figure 10:
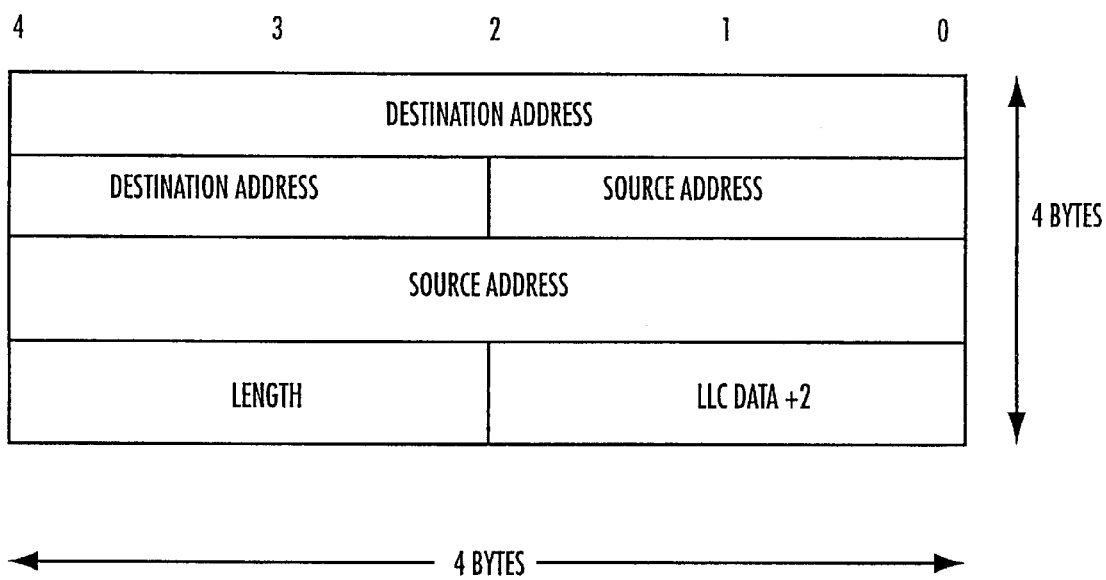
FIG. 10 is a block diagram showing an 802.3 data link layer header.
Figure 13:
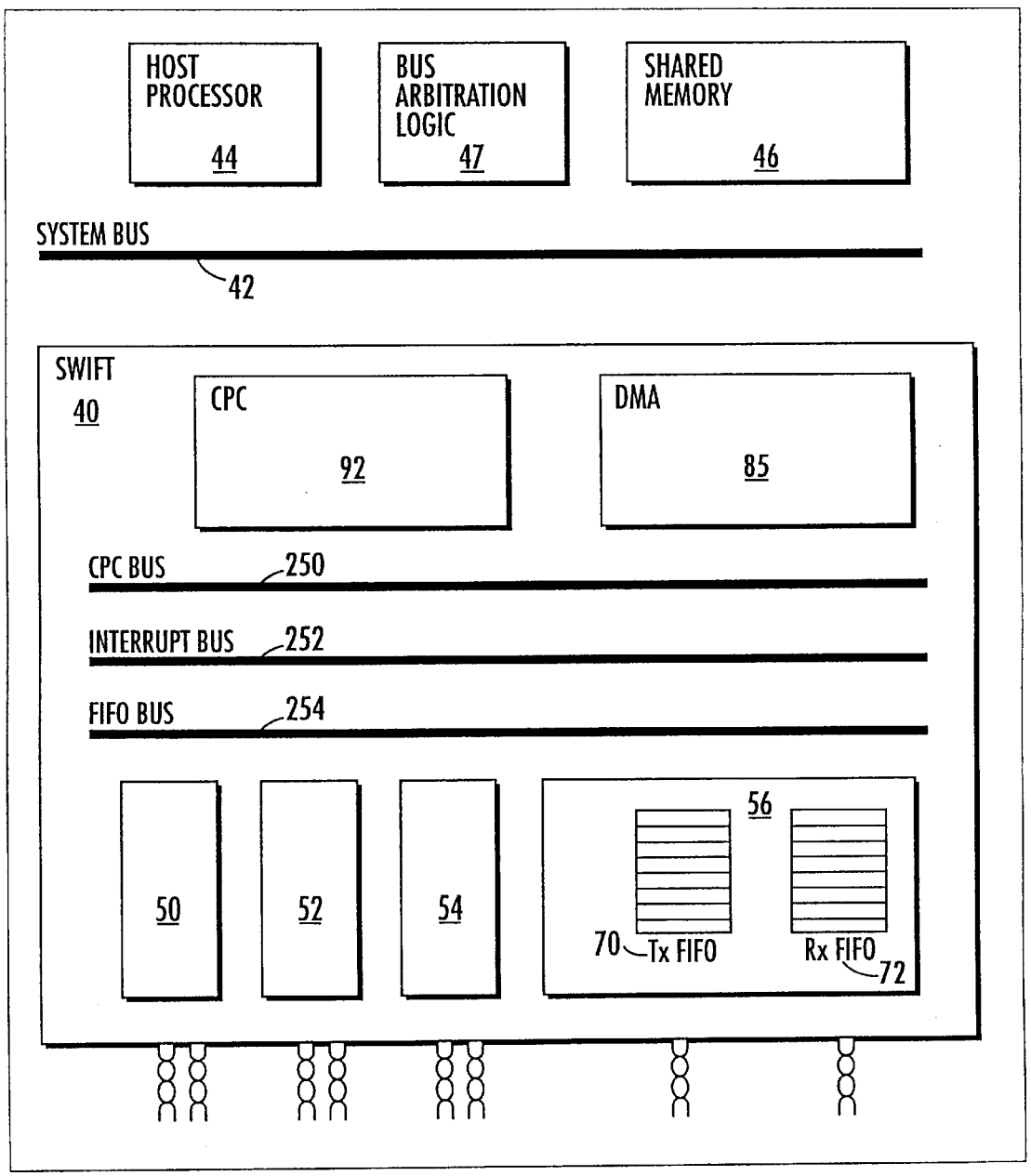
FIGS. 13–20 each show a high level block diagram of the basic components of the network controller and the external host processor, bus arbitration logic unit and shared system memory, and showing in detail the sequence of steps for the frame address notification of the present invention.

FIG. 10 shows an 802.3 (MAC) data link layer header of 18 bytes, while a 20 byte Internet IP header is illustrated in FIG. 11. FIG. 12 illustrates a 20 byte TPC header. The appropriate address fields are listed.

FIGS. 13–20 illustrate the basic process of the method and system of routing a data frame in accordance with the present invention. As illustrated, the network controller 40, labeled as SWIFT, includes the four HDLC ports 50, 52, 54 and 56, each port including a transmit FIFO 70 and receive FIFO 72. The network controller also includes the RISC processor, also known as a control processor (CPC) 92, and the direct memory access unit (DMA) 85. A CPC bus 250 interconnects between the CPC 92 and the DMA 85 unit. The interrupt bus 252 connects between the various HDLC ports and the CPC 92. A FIFO bus 254 interconnects between the DMA and the various HDLC ports.

Figure 14:
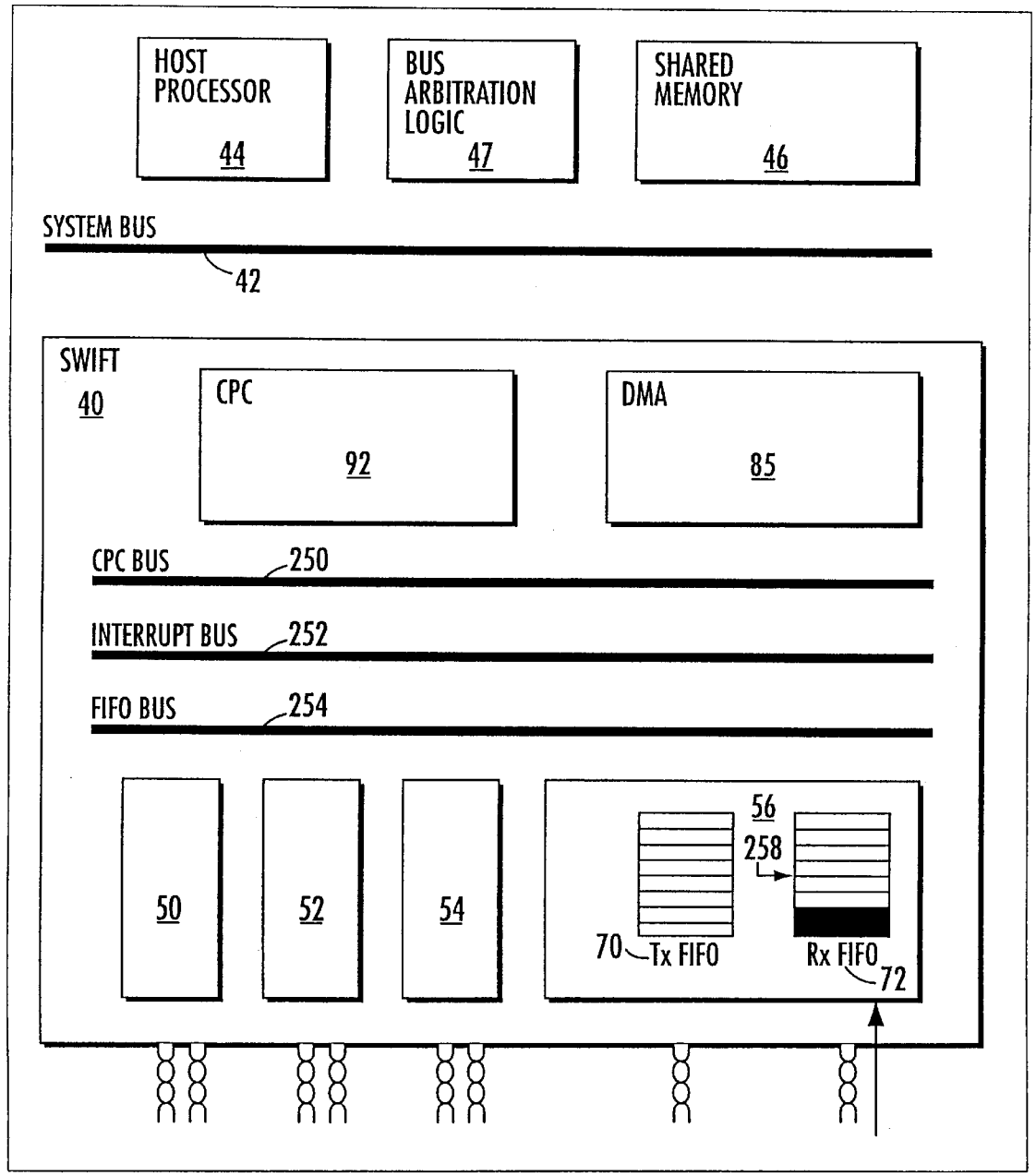
Figure 15:
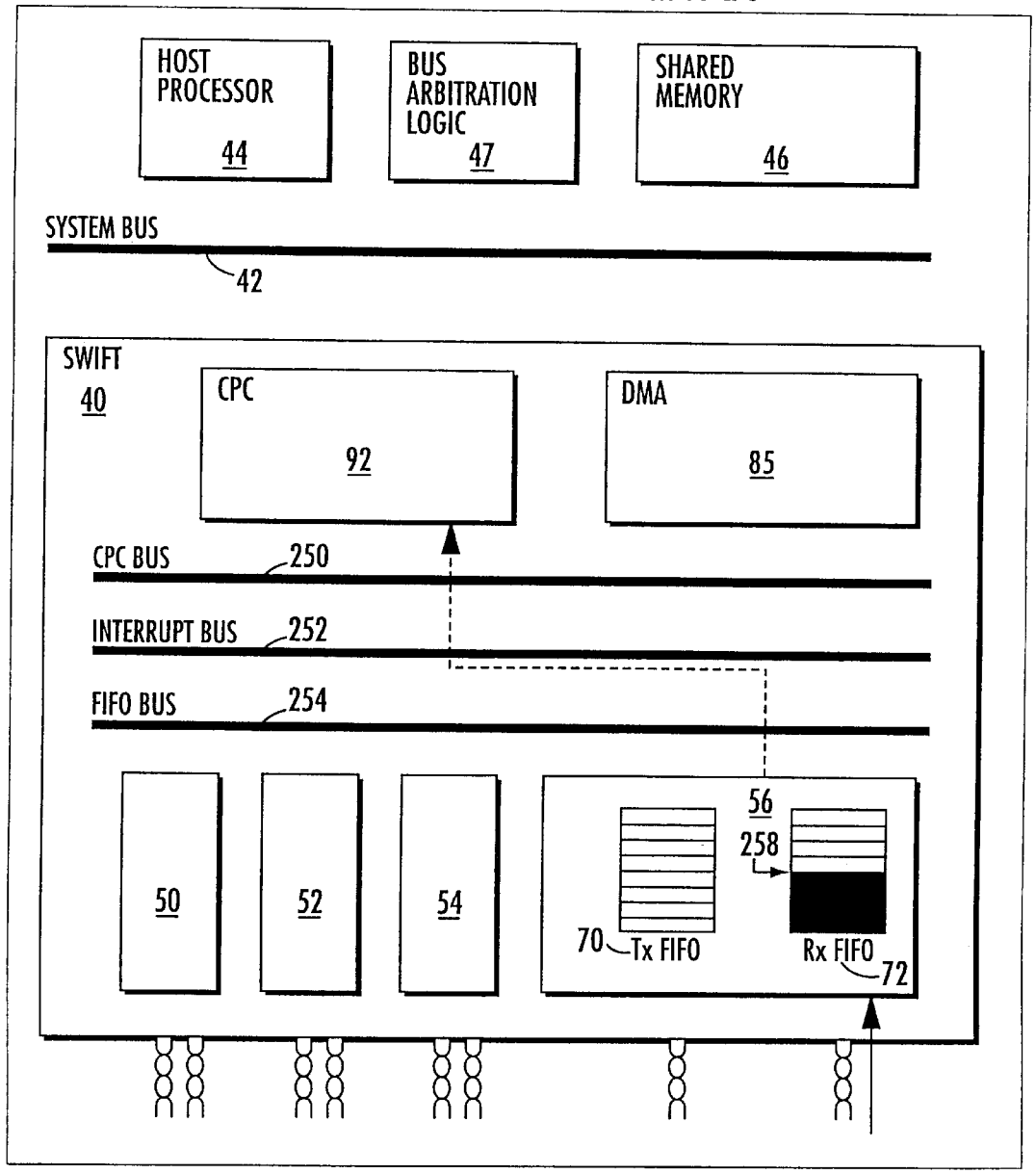
Figure 16:
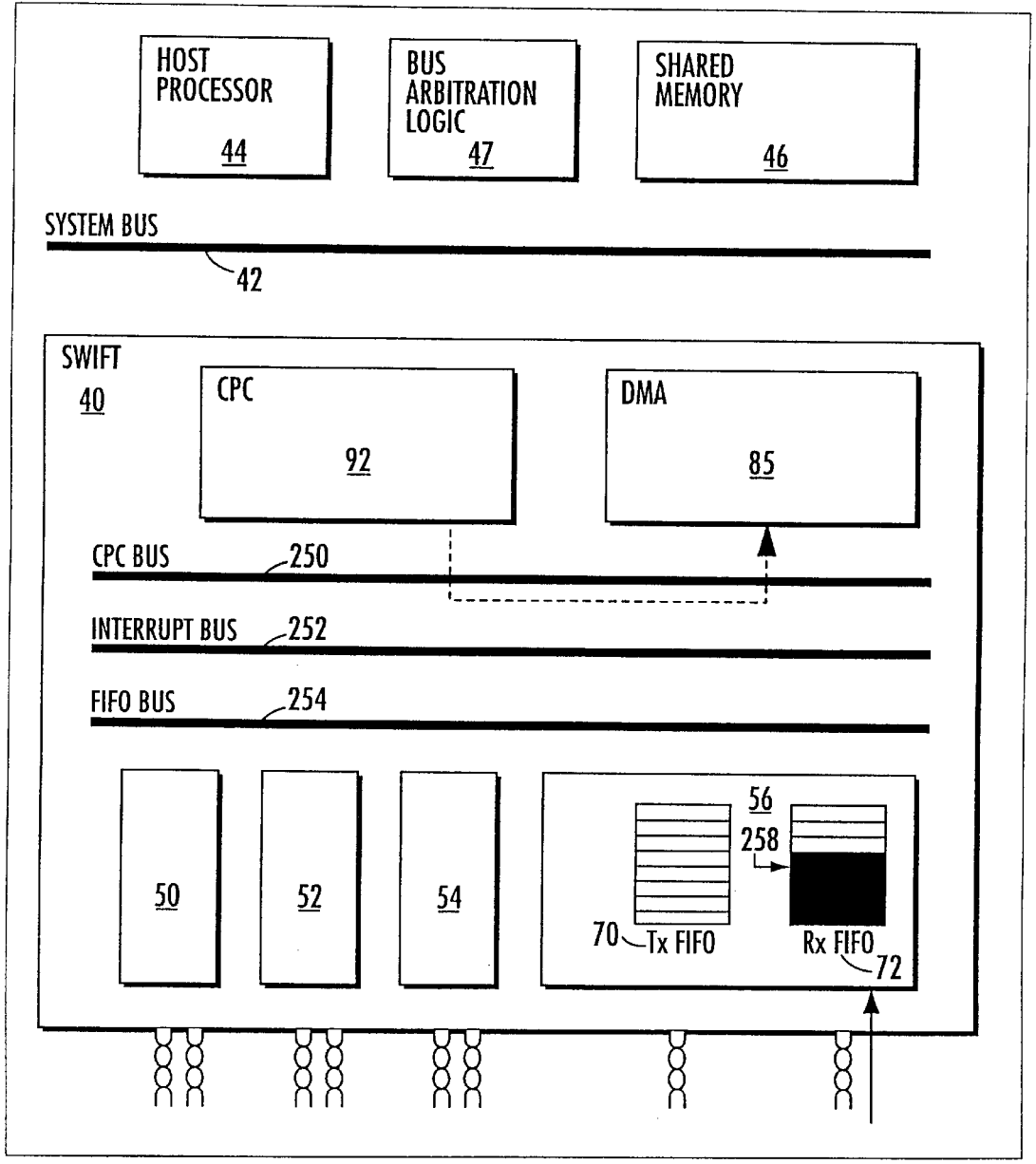
Figure 17:
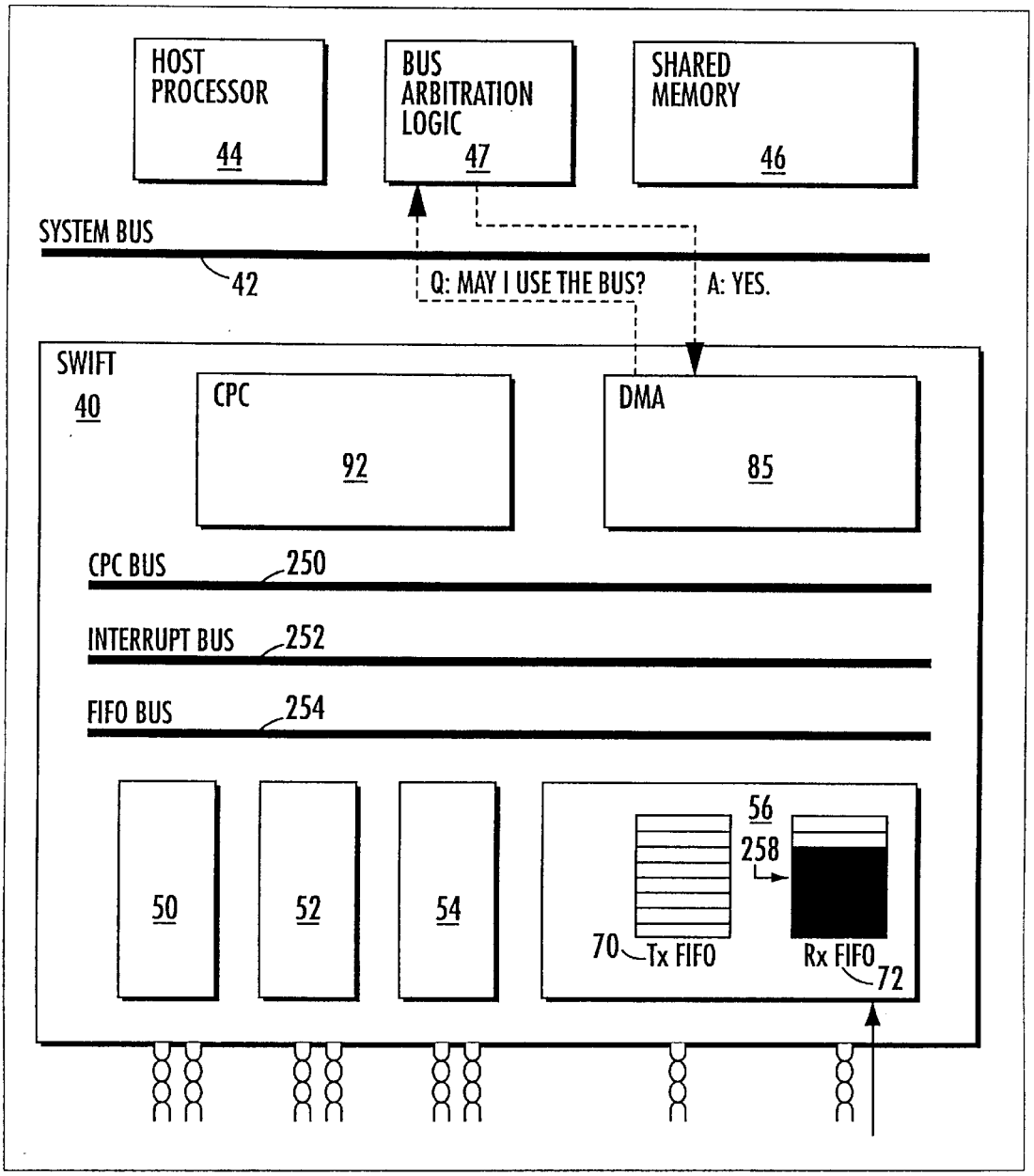
Figure 18:
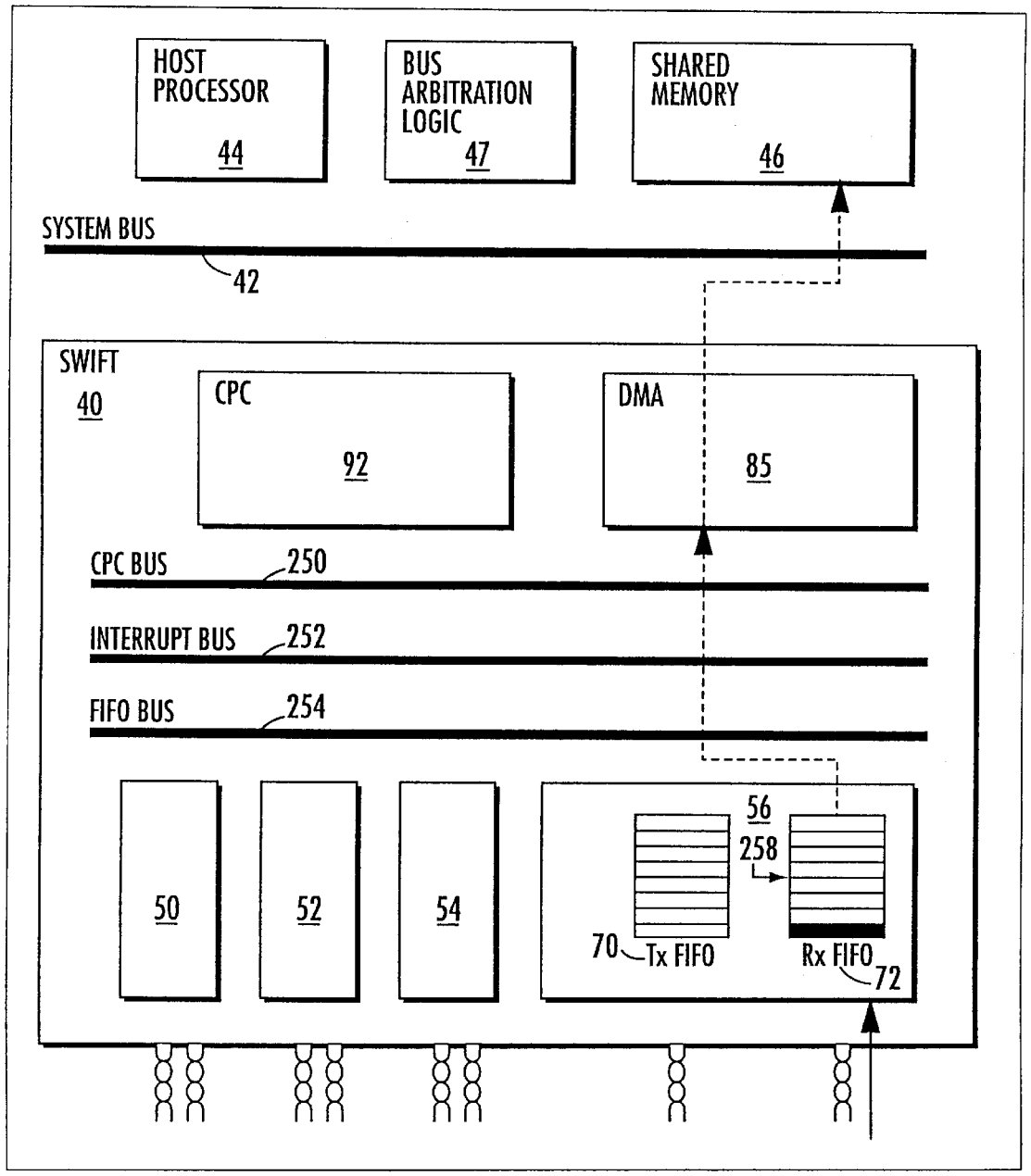
Figure 19:
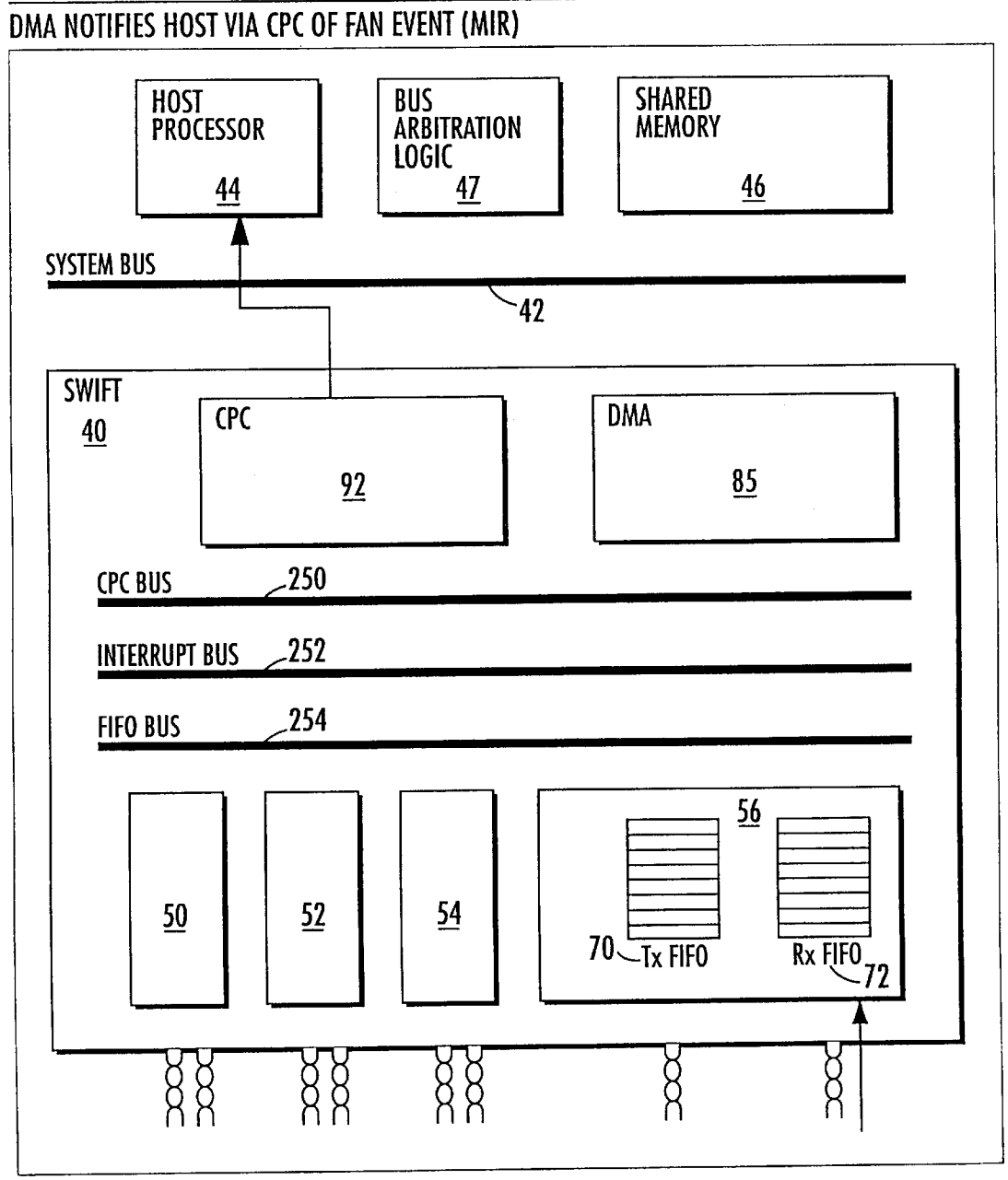

As shown in FIG. 14, a frame initially enters HDLC port 3 and is received in the receive FIFO 72 of the network controller 40. In FIG. 14, the frame has reached the watermark, indicated by arrow 258, and the port initiates a start-of-packet (SOP) interrupt (FIG. 15) to the CPC 92 via the interrupt bus 252. At this time, the CPC 92 issues a command to the DMA 85 (FIG. 16) to transfer data, while data from the frame is still being transferred into the FIFO 72. The DMA 85 issues a query to the bus arbitration logic unit 47 through the system bus 42, inquiring whether it can use the system bus (FIG. 17). If the system bus 42 is available, the bus arbitration logic unit 47 then enters in the affirmative with a yes. At the same time, the frame is still being received within the FIFO 72. At this time, the DMA 85 transfers data from the FIFO 72 to the shared system memory 46 as shown in FIG. 18. The first burst of this DMA 85, as illustrated in FIG. 18, will then cause the CPC 92 to issue an interrupt signal known as the FAN or frame address notification event to the host processor 44 via the system bus 42, indicative that the preselected address fields of the frame are present in the shared memory 46 (FIG. 19). The amount of the DMA burst size has been adjusted for the particular headers and addresses that will be looked at and for what layers.

Figure 20:
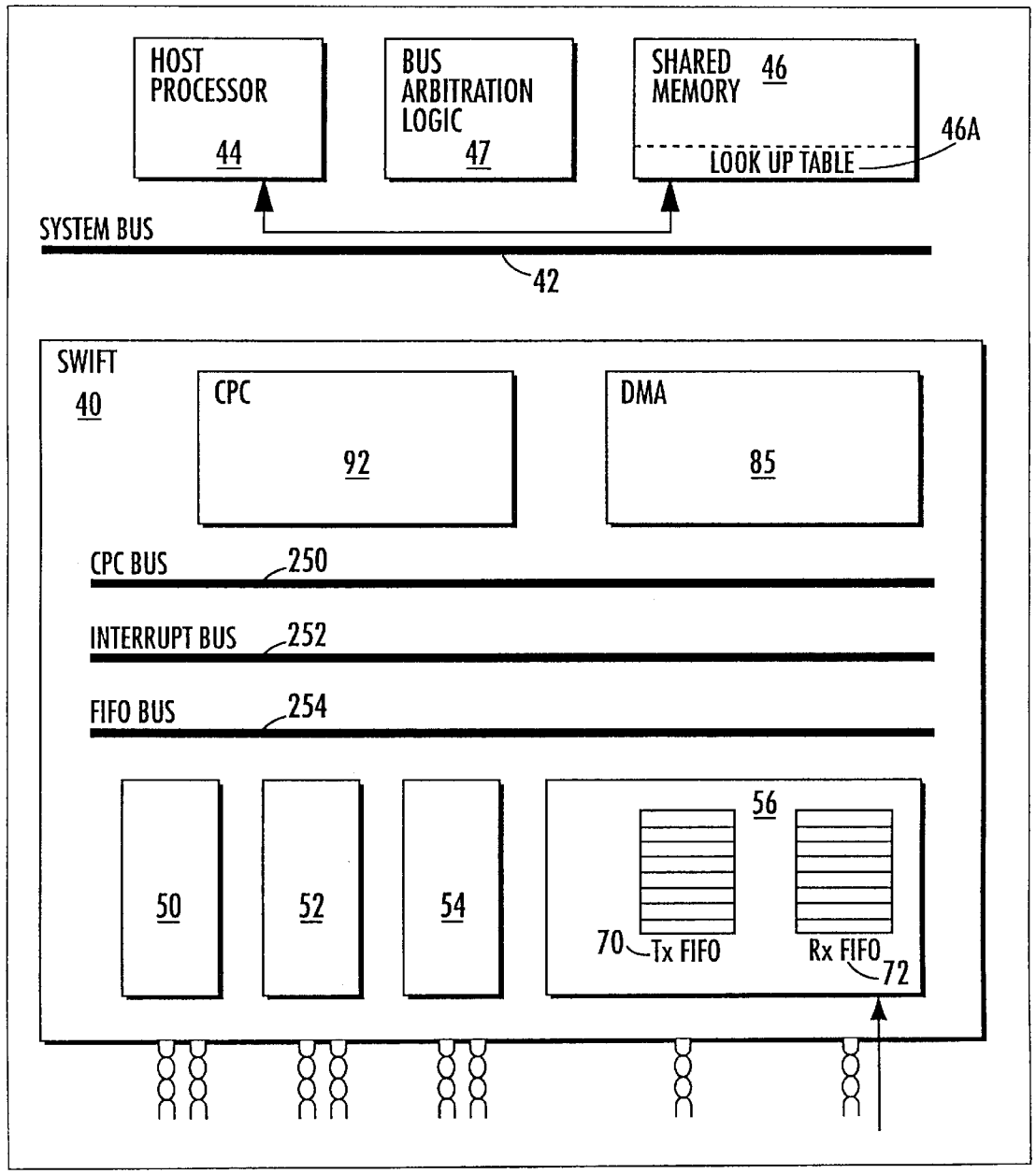

As shown in FIG. 20, the host processor 44 then initiates the look up algorithm and determines how the packet and frame is to be addressed and transferred. This look up and FAN event can occur even when a frame is still being received within the frame receive buffer.

An end-of-frame (EOF) interrupt is issued when a frame has been completely received within the shared memory 46. Thus, this signifies when the host can transfer or finish the transfer process.

Figure 21:
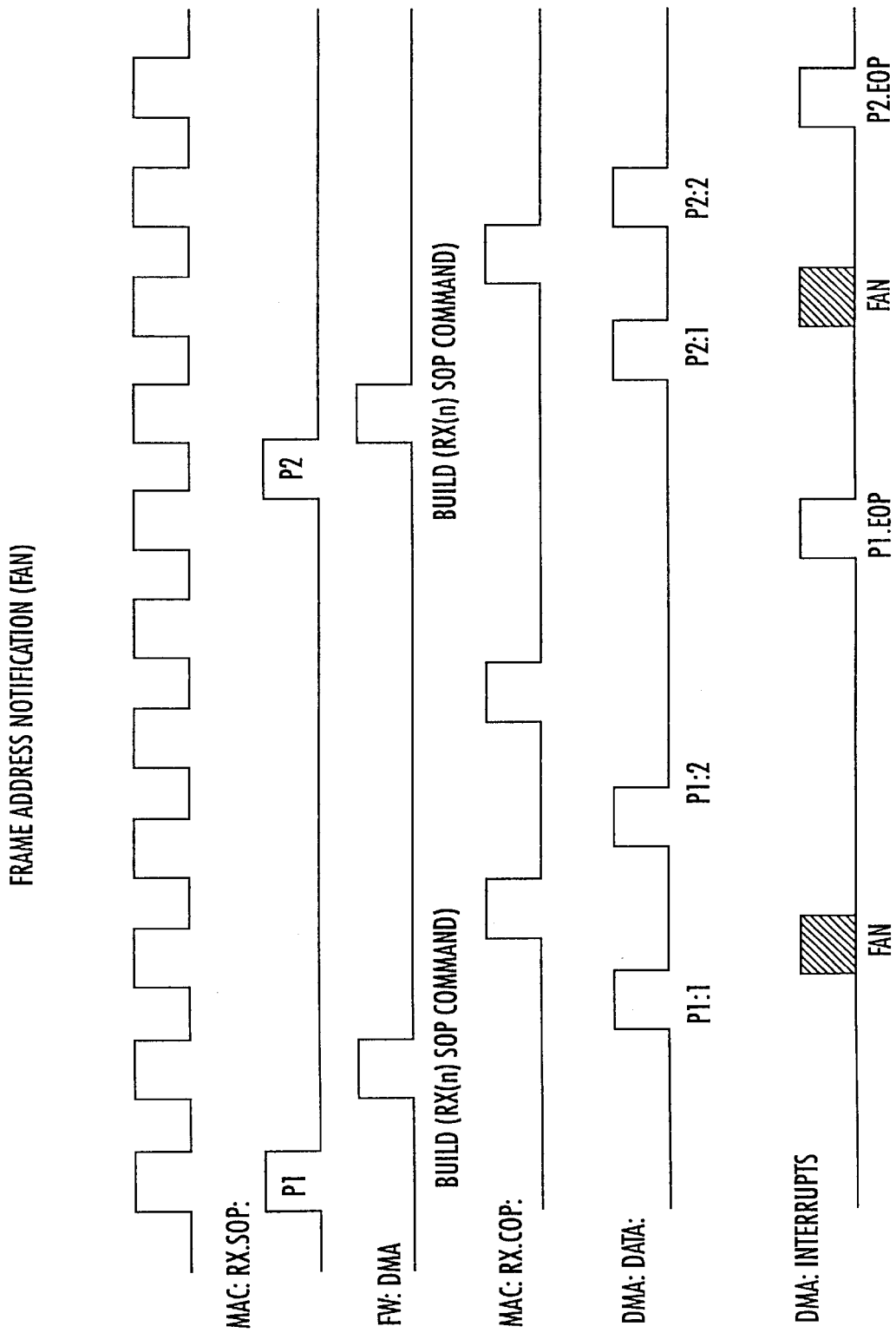
FIG. 21 is a general timing diagram showing generally the transmit interrupt event timeline of the frame address notification of the present invention.

FIG. 21 illustrates a timing chart showing the frame address notification (FAN) event. As shown at the top with the MAC layer, a start-of-packet shown as P1 is first issued followed by the firmware (FW) instruction to the DMA to build the start-of-packet command with the receiver. A continuation of packet (COP) command is issued and then, as illustrated, the DMA transfers data. DMA also issues the frame address notification and then issues the end-of-packet (EOP). A similar circumstance occurs with the second packet known as P2 as shown at the top at the MAC layer.

II. Look-Ahead Watermark

Referring now to FIGS. 22–25, greater details of the look-ahead watermark used in the present invention is disclosed. The look-ahead watermark (LAWM) functions as a synchronizing signal where the FIFO (first-in/first-out memory) memory, which includes the transmit and receive FIFO 70,72 provides a look-ahead watermark (LAWM) to indicate sufficient storage exists to receive one or more additional write bursts. The transmission of frames can be expedited by this technique because it increases the bus and memory resource utilization while reducing the load on the communications processor 92.

The look-ahead watermark signal implies that the FIFO can accommodate an additional DMA burst of the indicated quantity. The DMA burst size is not required to be the same size as the look-ahead watermark-mediated burst. The look-ahead watermark functions more as a "capacity-indicator" than as a conventional transmit "level-sensitive" watermark mechanism. In another respect, the look-ahead watermark is a "top-down" capacity indicator versus a standard "bottom-up" watermark.

The look-ahead watermark has advantages and aids the processing of data. It allows a reduction or elimination of FIFO underflow errors. It improves the utilization of the direct memory access unit. It also expedites frame transfer. It allows the earlier detection of a next frame for transmission. It improves the utilization of expensive FIFO memories and reduce network inter-frame gap timing "delays". It also allows a reduction in the cycles per frame, i.e., microprocessor workload, and allows efficiency enhancement for both small and large frames. It is transparent to the host system and reduces the CPU context switching.

The look-ahead watermark allows the device (firmware/hardware state machine) to "look" into the FIFO memory to determine if it can support additional bursts of data (of a known quantity) and hence eliminate/reduce one or more CPU context switches per frame. A second DMA command can be enqueued with little additional overhead to move the next frame burst to the destination FIFO.

Figure 22:
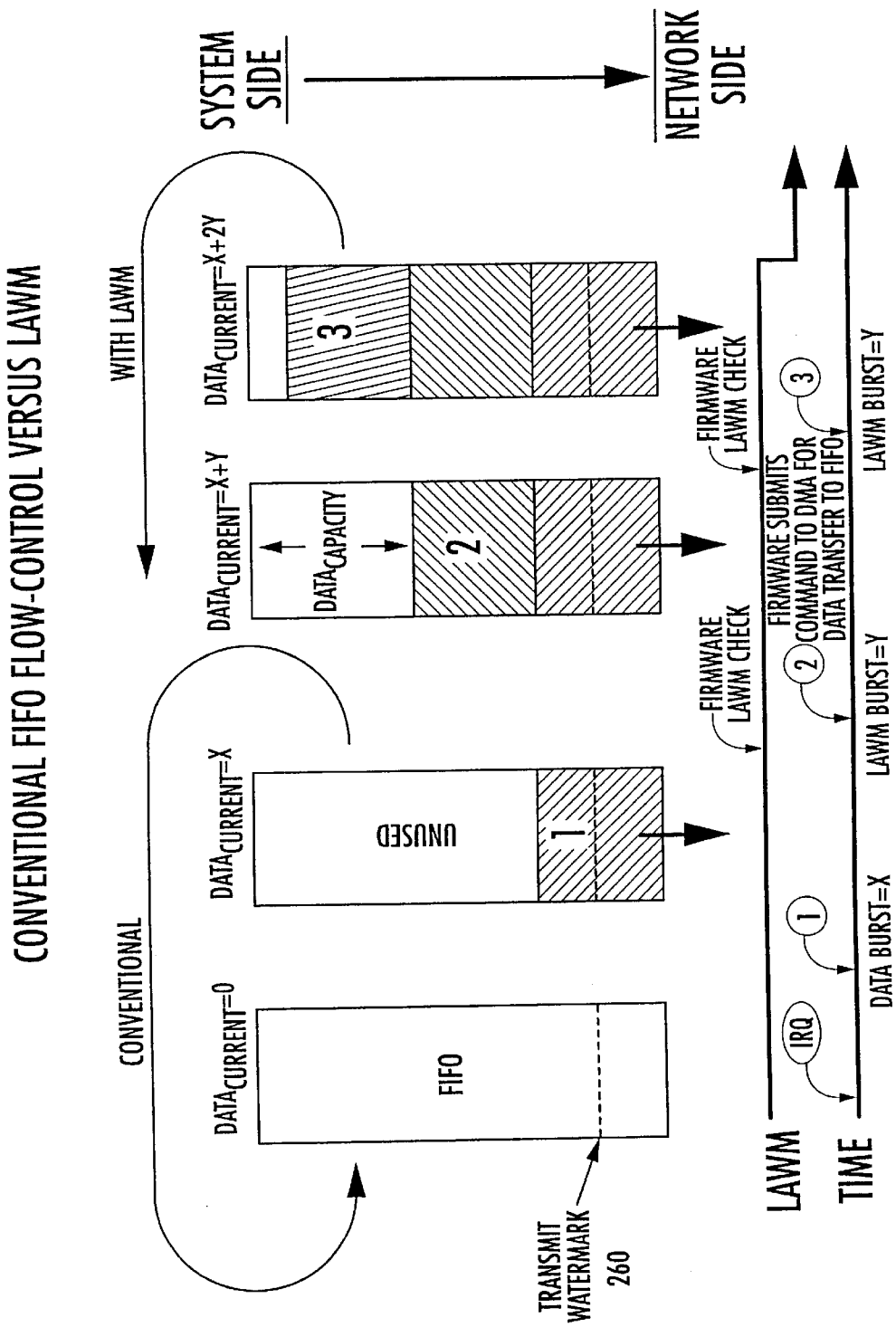
FIG. 22 is a basic block diagram showing a comparison of a classic first-in/first-out flow-control versus a flow control using a look-ahead watermark of the present invention.

FIG. 22 illustrates a conventional FIFO flow-control versus look-ahead watermark. The drawing is an abstract portrayal of the basic concept of a FIFO memory structure showing the system side and the network side. The transmit watermark is indicated at 260. The timing mechanism is shown on the bottom horizontal line and shows time with the data burst indicated at point 1 for a data burst X, and look-ahead watermark data burst Y at points 2 and 3. A look-ahead watermark timeline illustrates the firmware look-ahead watermark check. In the conventional example, the FIFO is empty (data=0) and then the interrupt is generated and one data burst then fills the FIFO such that the current data is X. With the firmware look-ahead watermark check, the firmware submits a command to the DMA for data transfer to the FIFO and the second data burst occurs as shown by the numeral 2 and the current data becomes X+Y. The firmware then checks the look-ahead watermark and a third data burst occurs as indicated by the numeral 3 such that the current data becomes X+2Y.

Figure 23:
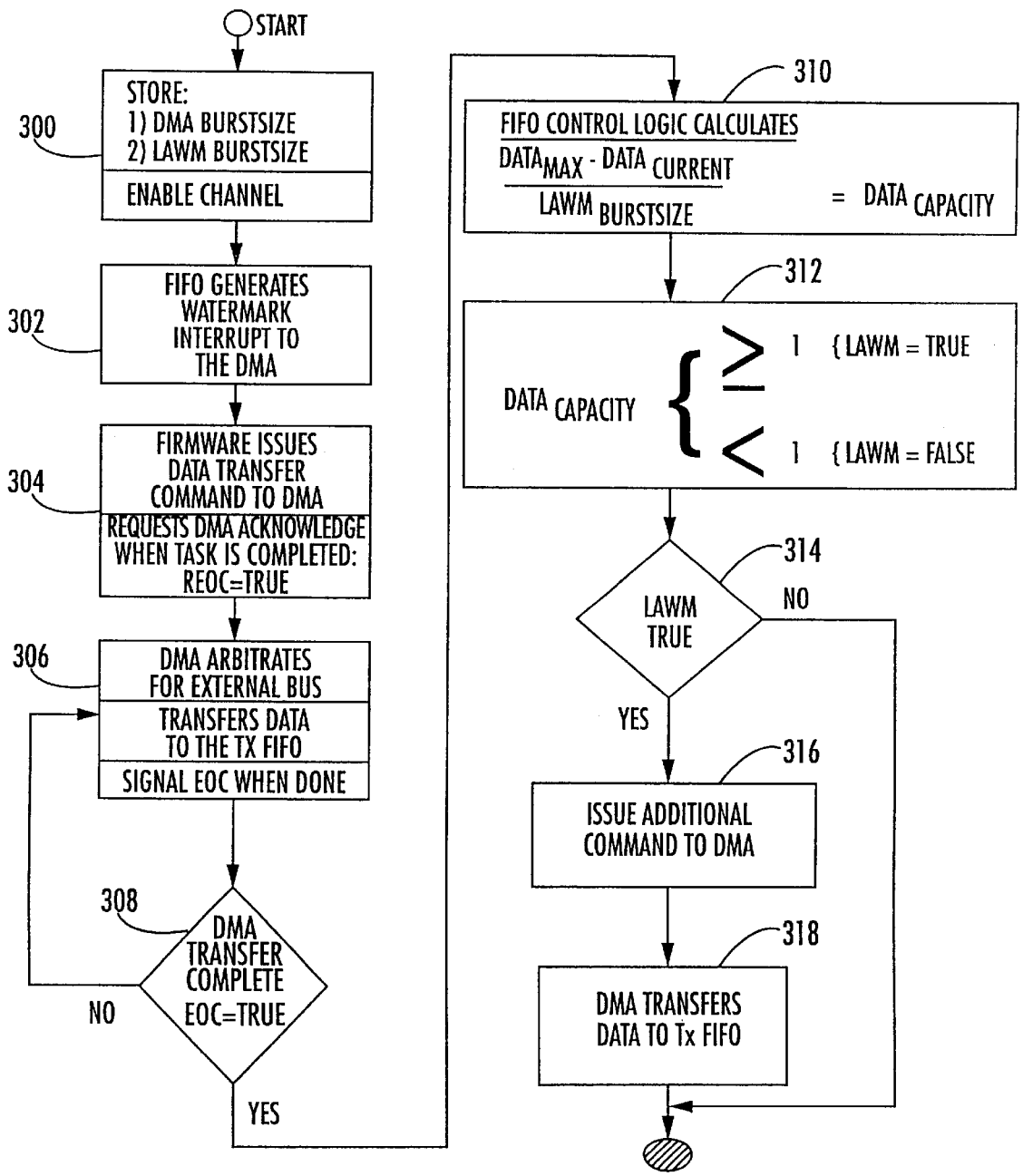
FIG. 23 is a flow chart illustrating the process of using a look-ahead watermark of the present invention.

As shown in the flow chart at FIG. 23, starting at block 300, the method of the present invention for controlling data flow in a data-based network using the network controller of the present invention with a look-ahead watermark is illustrated. At block 300, the DMA burst size is stored, as well as a look-ahead watermark burst size. The two burst sizes can be substantially the same or different. The channel is then enabled. The watermark interrupt is then generated to the DMA at block 302. At block 304, the firmware issues a data transfer command to the DMA. As part of this command, the firmware then requests the DMA to acknowledge via a request for end of command (REOC) when the task is completed: REOC=TRUE. At block 306, the DMA then arbitrates for the extension bus and then transfers data to the transmit FIFO. It signals via an EOC flag when it is finished.

A decision occurs at block 308 to determine if the DMA transfer is complete, which corresponds to EOC=TRUE. If the DMA transfer is not complete, then block 306 is repeated. If the DMA transfer is complete, the FIFO control logic determines the data capacity at block 310. As illustrated, the FIFO control logic calculates the data capacity by subtracting the current data value held within the FIFO from the maximum value that can be held within the FIFO. That result is then divided by the look-ahead watermark burst size to obtain the data capacity. As shown in block 312, if the data capacity is greater than or equal to 1, the look-ahead watermark value (such as a flag) is true. If the look-ahead watermark value is less than 1, then it is false. If the look-ahead watermark flag is true at block 314, then an additional command is issued to the DMA at block 316, and the DMA transfers data to the transmit FIFO at block 318. If the look-ahead watermark is false, then the routine terminates.

Figure 24A:
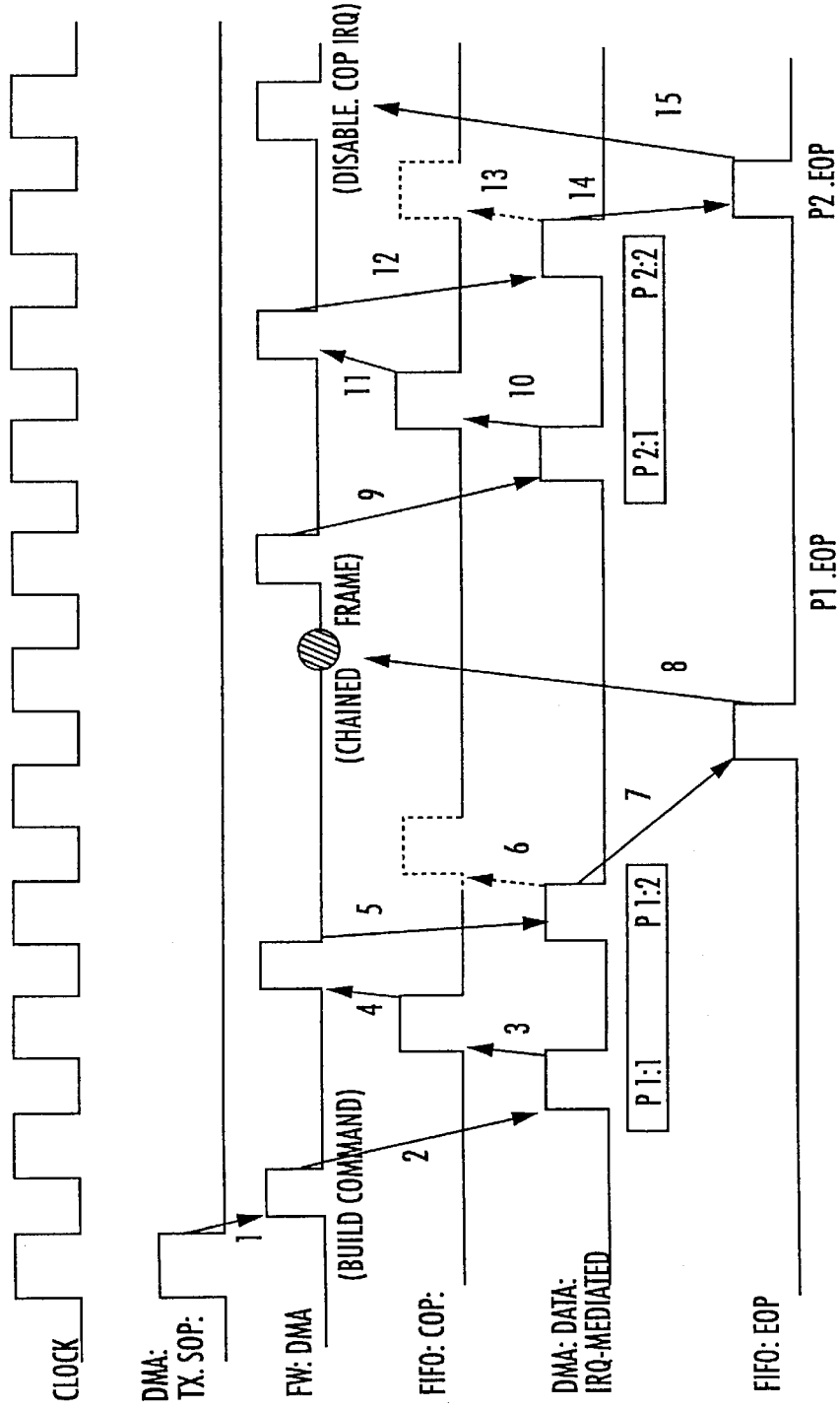
FIG. 24a is a timing diagram showing an interrupt-mediated frame transmission.
Figure 24B:
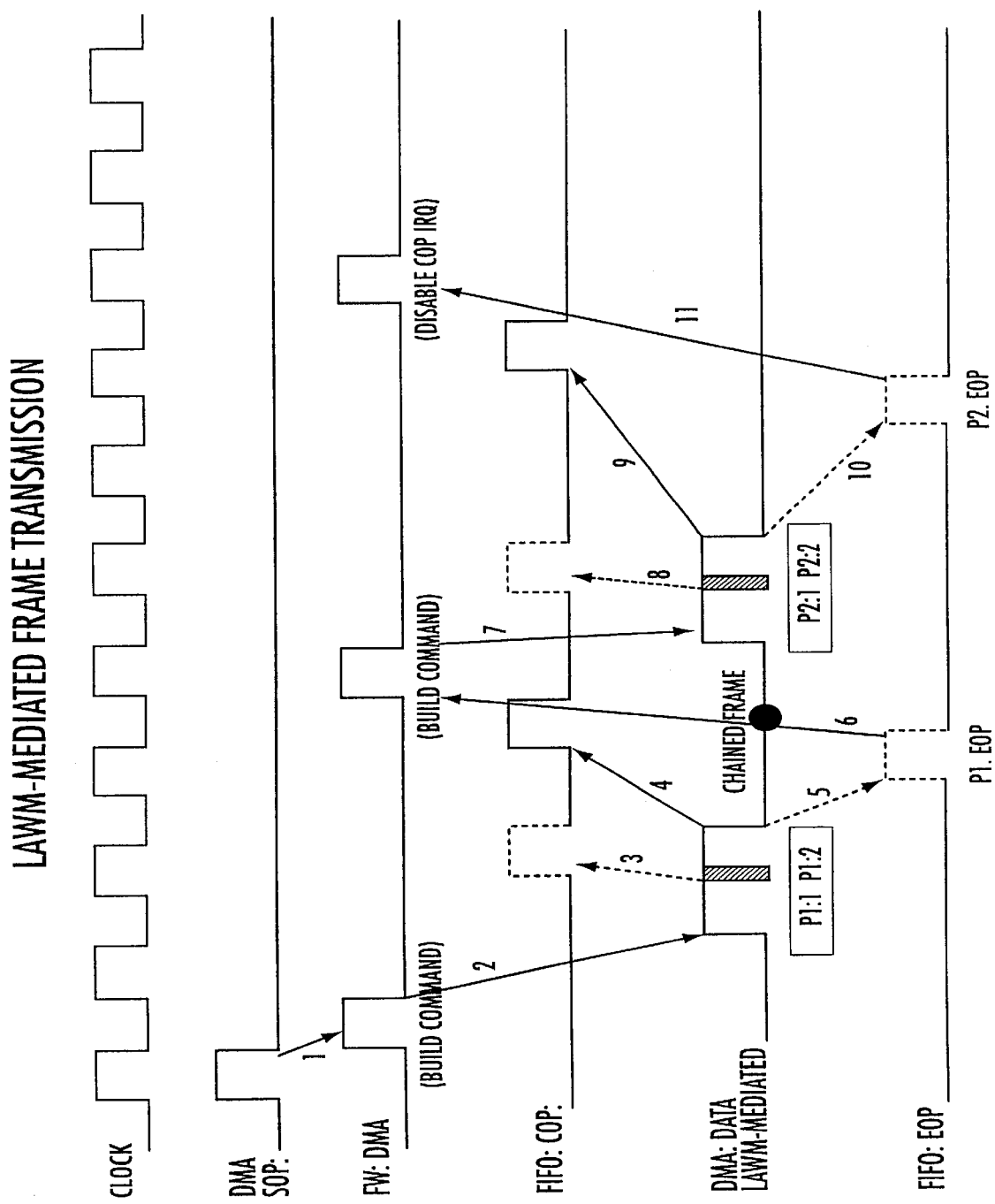
FIG. 24b is a timing diagram showing a look-ahead watermark-mediated frame transmission.

FIGS. 24a and 24b illustrate first an interrupt-mediated frame transmission (FIG. 24a) and a look-ahead watermark-mediated frame transmission (FIG. 24b). These timing mechanisms show the advantages of the look-ahead watermark and aids in quantifying the efficiency of the look-ahead watermark in terms of the clock cycles. The charts show the staggered delay of the interrupts, such as when they are issued and serviced and when data is written into the FIFO. This is important in a busy, multi-channel device to ensure that it is fully employed. This can compare the latency of a standard interrupt with the look-ahead watermark efficiency.

Interrupt-Mediated Frame Transmission (FIG. 24a)

1. DMA initiates frame transmission via a start of packet interrupt signal (SOP).

2. Firmware (FW) enables the transmit channel, builds a command (two 32-bit words) and submits this command to the DMA for execution.
3. DMA decodes the command, arbitrates for the external bus, reads appropriate data from external shared memory and writes this into the appropriate transmit FIFO memory.
4. After the DMA transfer completes and if the transmit watermark is not exceeded, then a continuation of packet (COP) interrupt will be generated.
5. Once again the firmware constructs a command and issues it to the DMA for execution.
6. If the firmware has not disabled the COP interrupt and data in the FIFO has not exceeded the standard watermark, then another COP may be generated.
7. An "end of packet" (EOP) interrupt is generated once the terminal byte of the frame is clocked out of the FIFO onto the network.
8. Firmware checks whether another frame is ready for transmission (i.e., chained).
9. In the event that a chained frame exists, a DMA command is then constructed and issued.
10. The first burst of the second frame is fetched from external RAM and written into the transmit FIFO memory.
11. Another COP is issued once the write burst terminates and if the FIFO WM is not exceeded.
12. Firmware builds a fourth command to initiate the second burst for this second frame.
13. If the firmware has not disabled the COP interrupt and data in the FIFO has not exceeded the standard watermark, then another COP may be generated.
14. An "end of packet" (EOP) interrupt is generated once the terminal byte of the frame is clocked out of the FIFO onto the network.
15. Firmware checks whether another frame is ready for transmission (i.e., chained), and if this is not the case, disables the transmit channel.

LAWM-Mediated Frame Transmission (FIG. 24b)

1. DMA initiates frame transmission via a start of packet interrupt signal (SOP).
2. Firmware (FW) enables the transmit channels, builds a command (two 32-bit words) and submits this command to the DMA for execution.
3. DMA decodes the command, arbitrates for the external bus, reads appropriate data from external shared memory and writes this into the appropriate transmit FIFO memory. If the LAWM signal indicates sufficient capacity exists within the FIFO for an additional burst, then the firmware will submit a second command to the DMA for execution.
4. After each DMA transfer completes and if the transmit watermark is not exceeded, then a continuation of packet (COP) interrupt may be generated.
5. An "end of packet" (EOP) interrupt may be generated once the terminal byte of the frame is clocked out of the FIFO onto the network.
6. Firmware checks whether another frame is ready for transmission (i.e., chained).
7. In the event that a chained frame exists, a DMA command is then constructed and issued.
8. DMA decodes the third command, arbitrates for the external bus, reads appropriate data from external shared memory and writes this into the appropriate transmit FIFO memory. If the LAWM signal indicates sufficient capacity exists within the FIFO for an additional burst, then the firmware will submit a fourth command to the DMA for execution.
9. If the transmit watermark is not exceeded after each DMA transfer, then a continuation of packet (COP) interrupt may be generated.
10. An "end of packet" (EOP) interrupt may be generated once the terminal byte of the frame is clocked out of the FIFO onto the network.
11. Firmware checks whether another frame is ready for transmission (i.e., chained), and if this is not the case, disables the transmit channel.

It is evident that the look-ahead watermark-mediated frame transmission is advantageous and efficient and overcomes latency involved with prior art methods.

Figure 25:
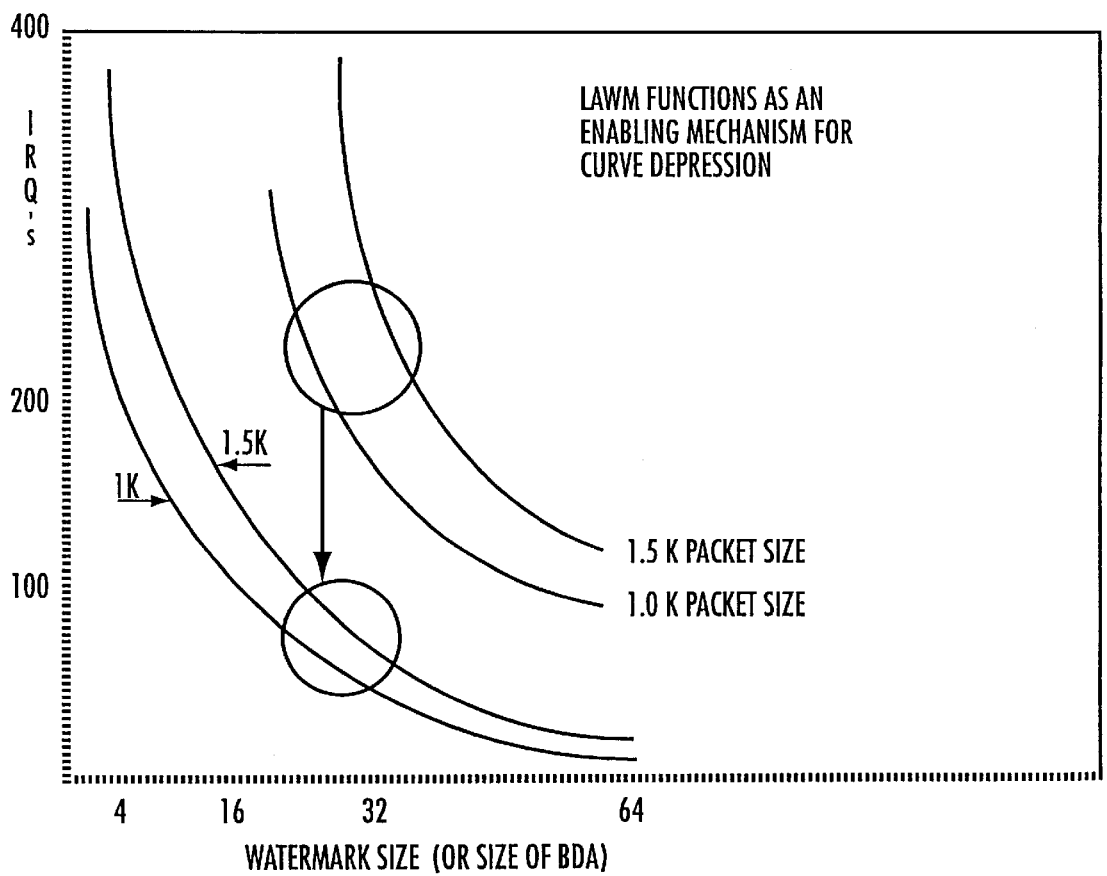
FIG. 25 illustrates a graph explaining how a watermark value has an inverse effect on the total number of generated interrupts.

FIG. 25 shows a graph, illustrating watermark effects on interrupt generation with regard to packet size. The graph plots the number of generated interrupts as a function of FIFO watermark size. It can be observed from the graph that with an increase in packet size, the number of required interrupts also tends to increase. Watermark values have an inverse effect on the total number of generated interrupts. More often than not, manipulation of the watermark alone is insufficient in tuning the performance of a device. With high variability of network packet sizes and contention for shared system resources, an additional mechanism is desired. The look-ahead watermark of the present invention is such a mechanism and as such can be readily observed to depress the curves in FIG. 25.

III. Early Congestion Notification

The present invention also uses an early congestion notification signal or interrupt (ECN) for advanced host notification of congestion in a corresponding port receiver, such as one of the receive FIFOs 70. The term "advanced" can be used because earlier received frames may still be stored in the FIFO ahead of the errored frame. There could be anywhere from zero to a score of frames waiting to be dispatched, depending on the relative sizes of the FIFO and the sizes of the frames. Hence, there is potentially a significant delay between when an early congestion notification (ECN) is first signaled and the errored frame is processed. Previously, the host 44 was not aware of this type of error until its processing circuitry worked its way through the preceding frames and examined the status word of each and every frame until it came to the ill-fated frame. Because the host processor 44 was not aware of the overflow problem, its processing behavior continued to proceed unmodified and, therefore, numerous exceeding frames continued to overflow the FIFO and were therefore lost. This, of course, created a much greater demand on the upper level software to retransmit frames and, thus, create bandwidth problems in the network. Instead of a single downstream node with a lost frame problem, the situation rapidly developed into one where many downstream nodes were forced to reclock their transmit windows, easily exacerbating the problem.

Figure 26:
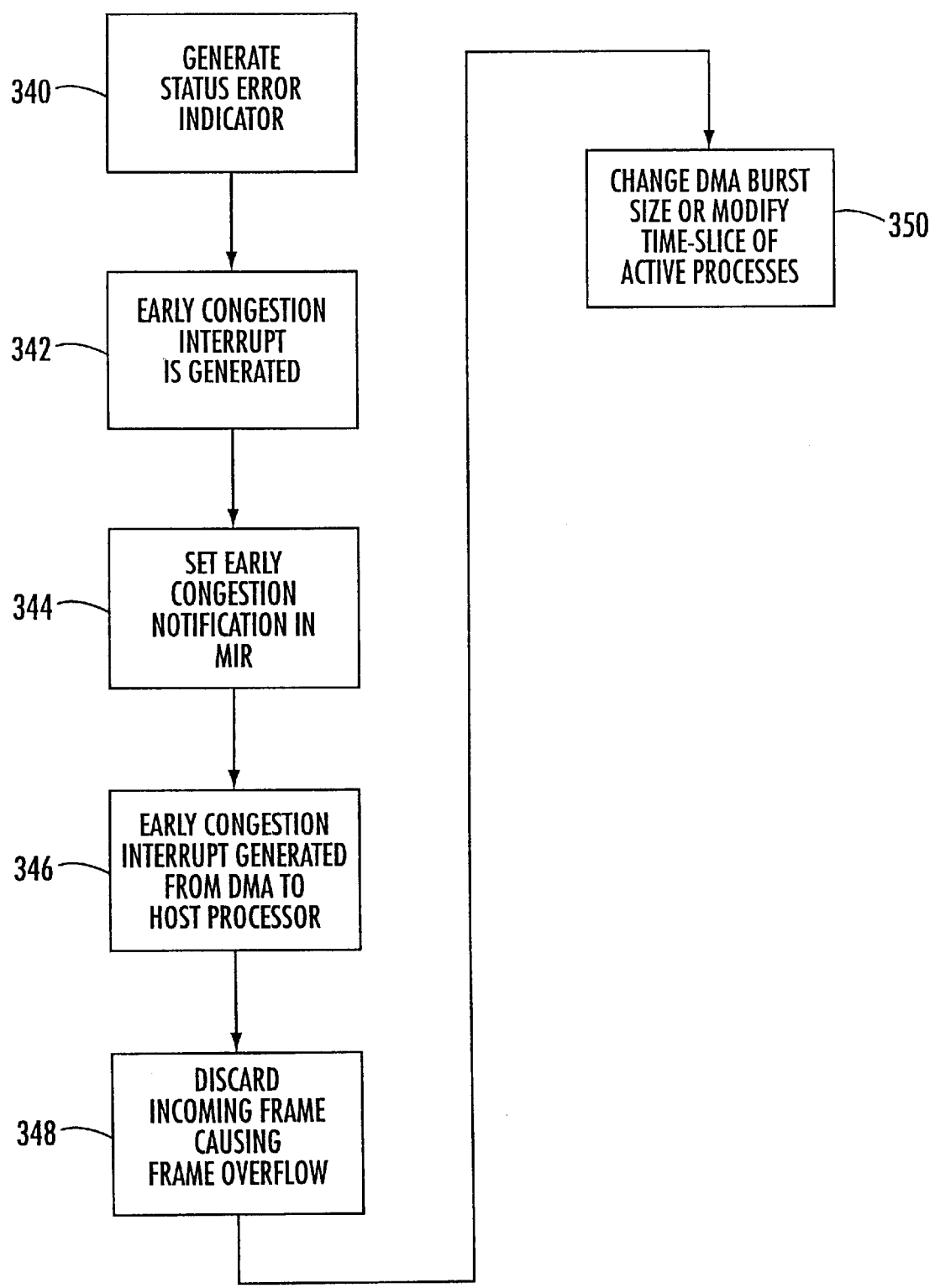
FIG. 26 is a flow chart illustrating the basic process of using an early congestion notification signal of the present invention.

In accordance with the present invention, as shown in FIG. 26 flow chart, a method for controlling network data congestion in the receive FIFO memory includes the step of generating a status error indicator within a receive FIFO memory indicative of a frame overflow within the FIFO memory (block 340). An early congestion interrupt is then generated from the FIFO memory to a communications processor in response to the status error indicator (block 342). The interrupt is processed and at least one early congestion notification bit is set within a master interrupt register (MIR) of the direct memory access unit (block 344).

An early congestion interrupt is then generated from the direct memory access unit to the host processor indicative that a frame overflow has occurred within the FIFO memory (block 346). Instructions are generated from the host processor to the FIFO memory to discard the incoming frame that has caused the frame overflow (block 348). The services of received frames can be enhanced by one of either increasing the number of words of a direct memory access (DMA) unit burst size, or modifying the time-slice of other active processes (block 350).

FIGS. 27A–G show a high level block overview of the early congestion notification method of the present invention. FIG. 27A indicates that the receive FIFO is empty and the read (RD) and write (WR) pointers are the same at 0,0. Data then begins to come in and the read pointer is at zero and the write pointer is advancing, as indicated in FIG. 27B. As the packet is received, the status is written in as indicated by the Stat 1. A second frame or packet arrives (Data 2) and begins to overflow (FIGS. 27C and 27D). When the overflow condition occurs, a flip-flop is set for an error, thus an overflow bit is set (FIG. 27G). At this point, the early congestion notification (ECN) is sent out. The write pointer is reset to the beginning of packet to and frozen until the end of packet occurs, at which the time error status field of low packet is entered. The read of the status 1 by the DMA copies it into the receive status register at the host address. No request of the DMA for another data transfer will occur until the communications processor reads the status. This prevents overriding of status register by the overflow status (FIGS. 27E and 27F).

Figure 28:
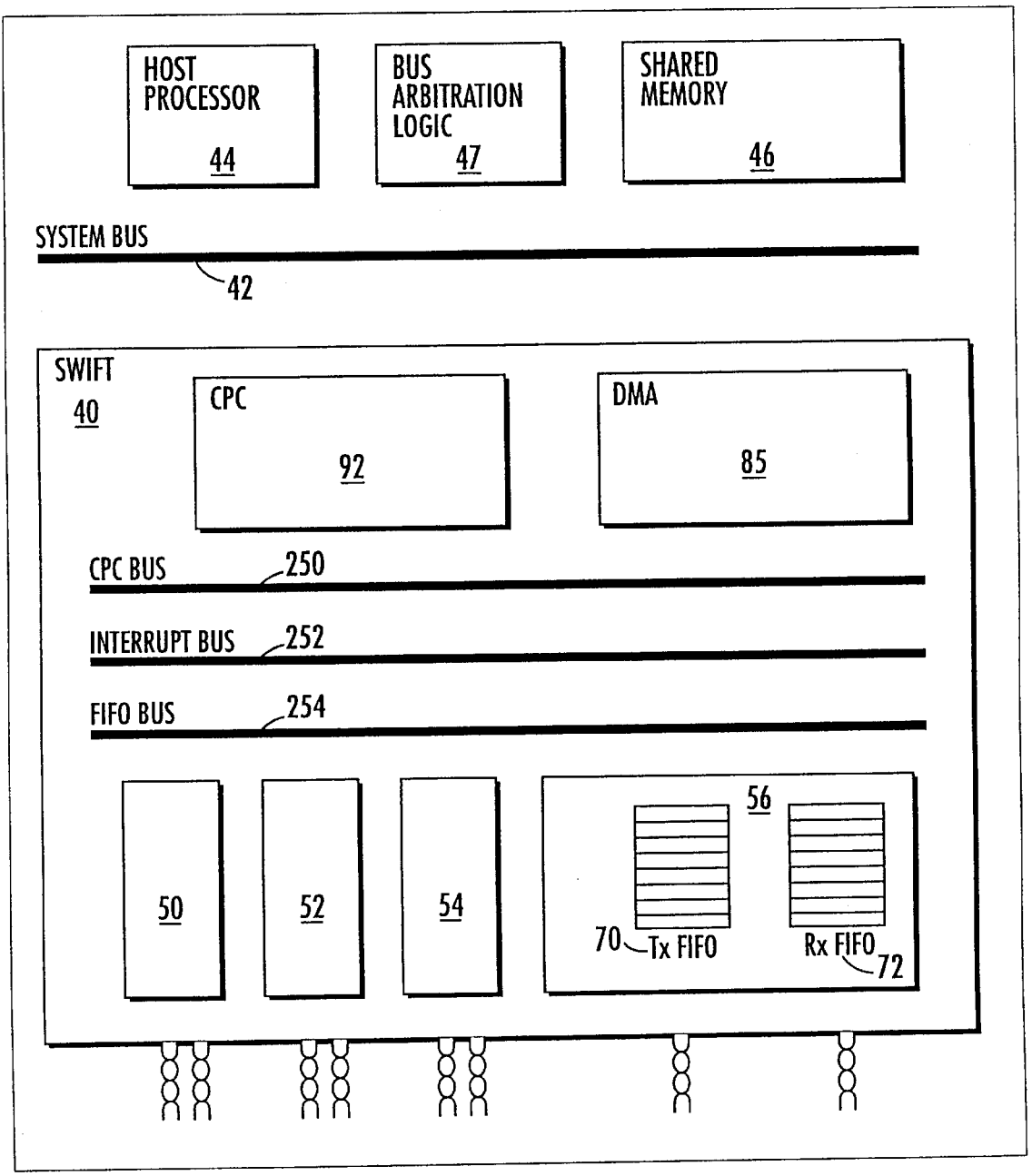
FIGS. 28–43 are high level block diagrams of the external host processor, bus arbitration logic unit and shared memory, and basic components of the network controller of the present invention, and showing the process when an early congestion notification signal is used for three different incoming packets with an overflow on the third packet.
Figure 29:
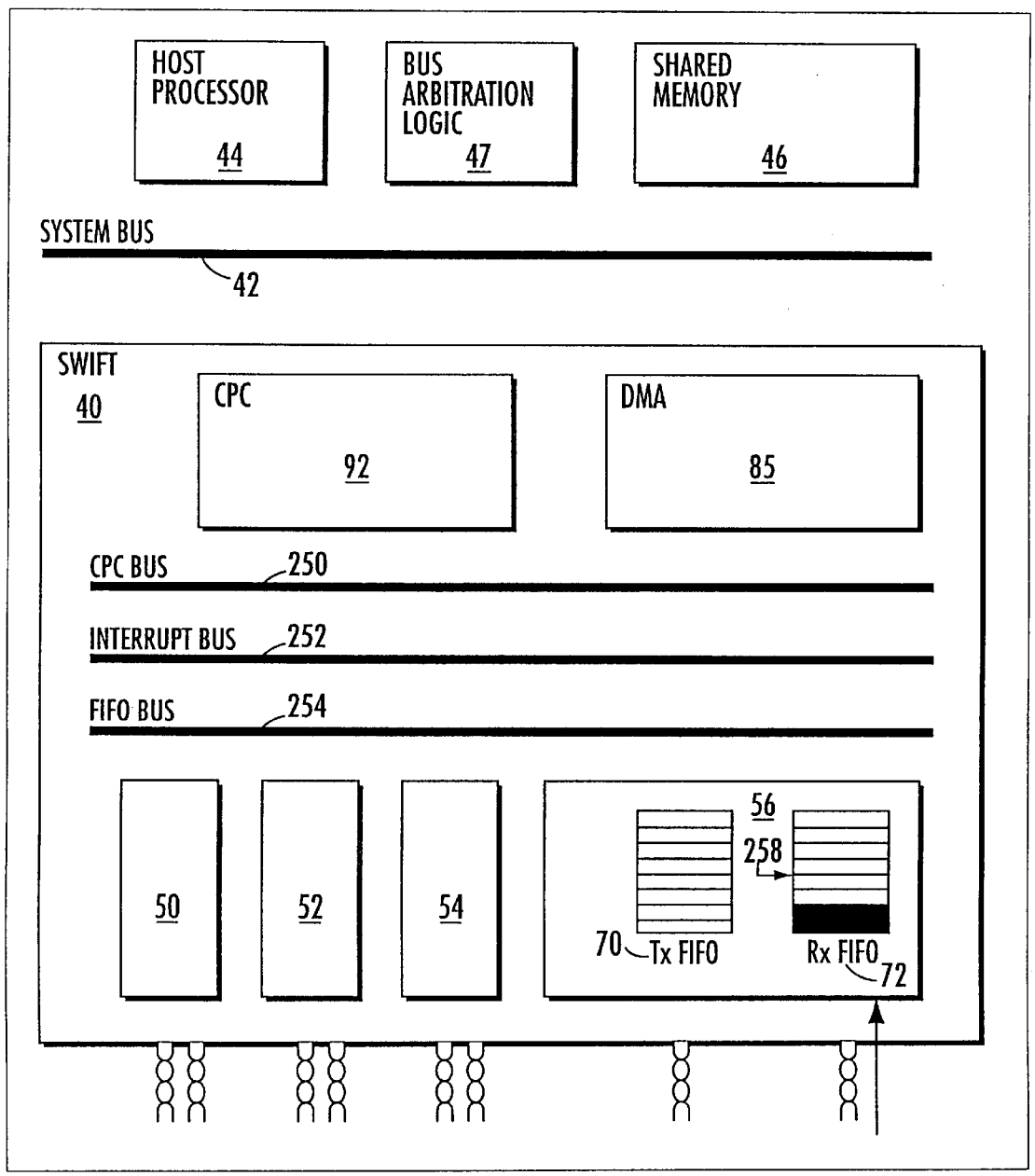
Figure 30:
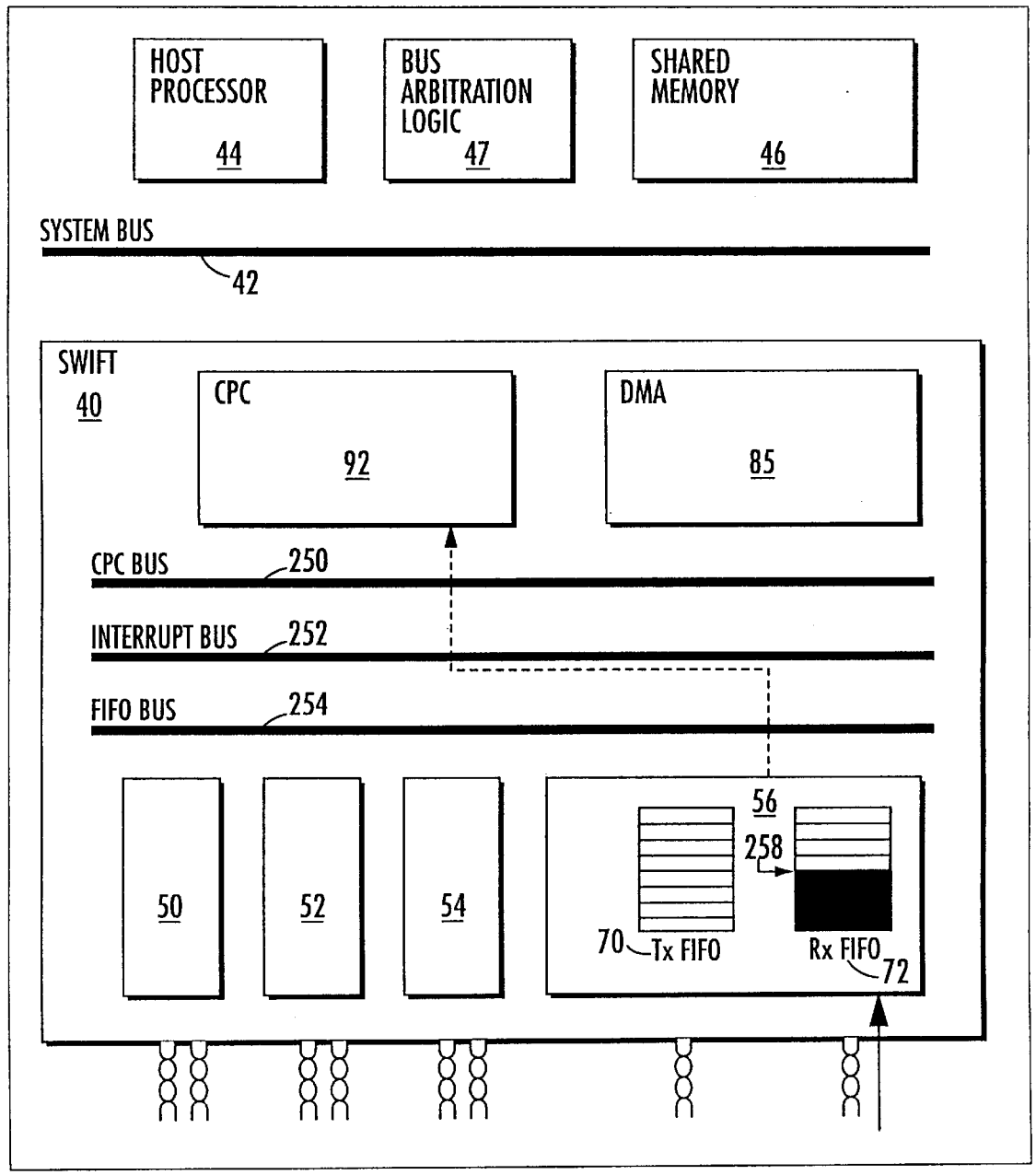
Figure 31:
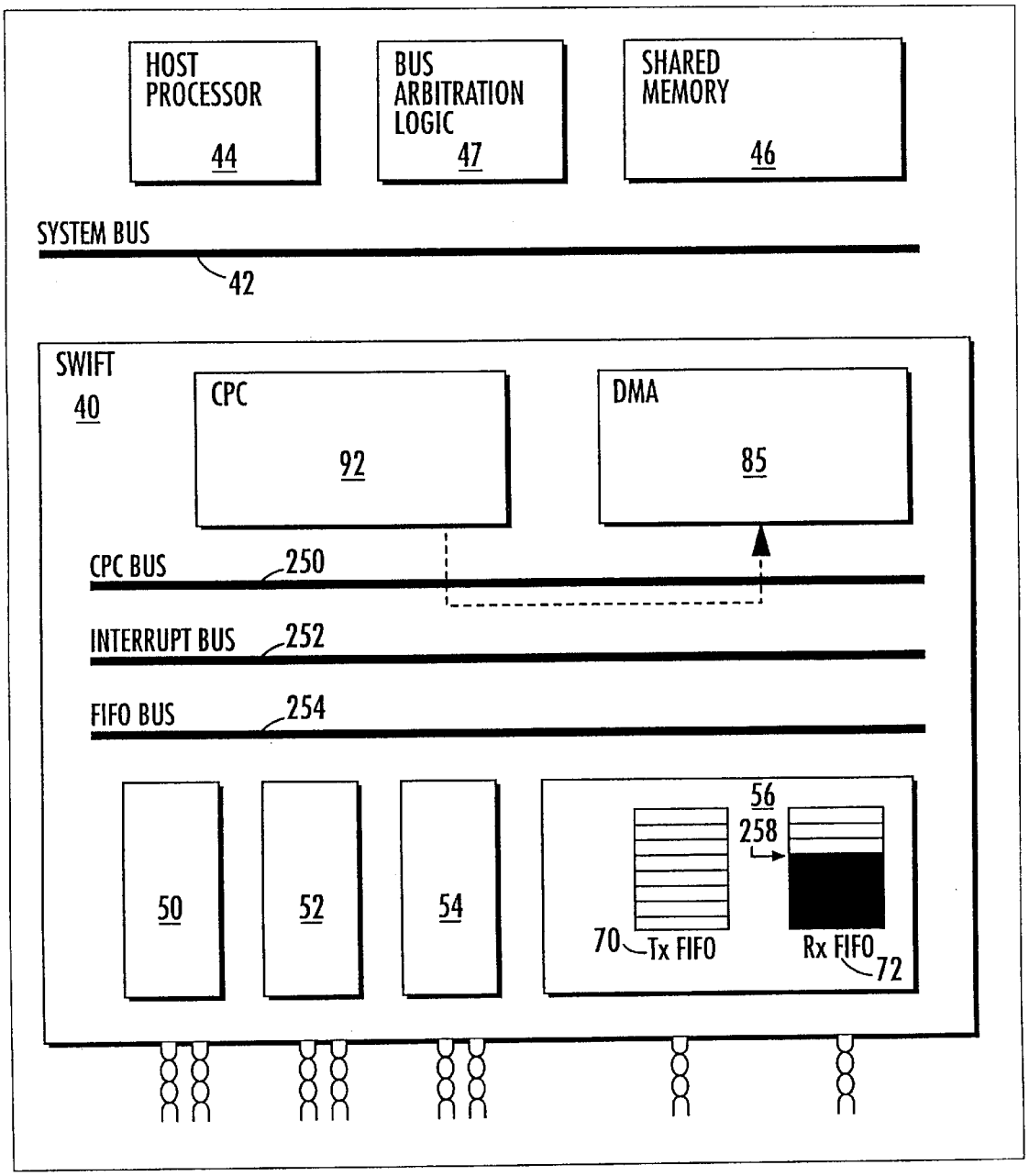

Referring now more particularly to FIGS. 28–43, a more detailed description occurs with three incoming different packets where the method and apparatus of the present invention are illustrated. FIG. 28 shows the network controller and host system where no data has been received within the receive FIFO 72. In FIG. 29, data is first entering the receive FIFO 72, and in FIG. 30, the watermark 258 is reached and a start-of-packet interrupt is sent to the communications processor 92 via the interrupt bus 252. The communications processor 92 issues a command to the DMA 85 to transfer data (FIG. 31). At the same time, data is continuing to enter the receive FIFO 72 as indicated by the arrow.

Figure 32:
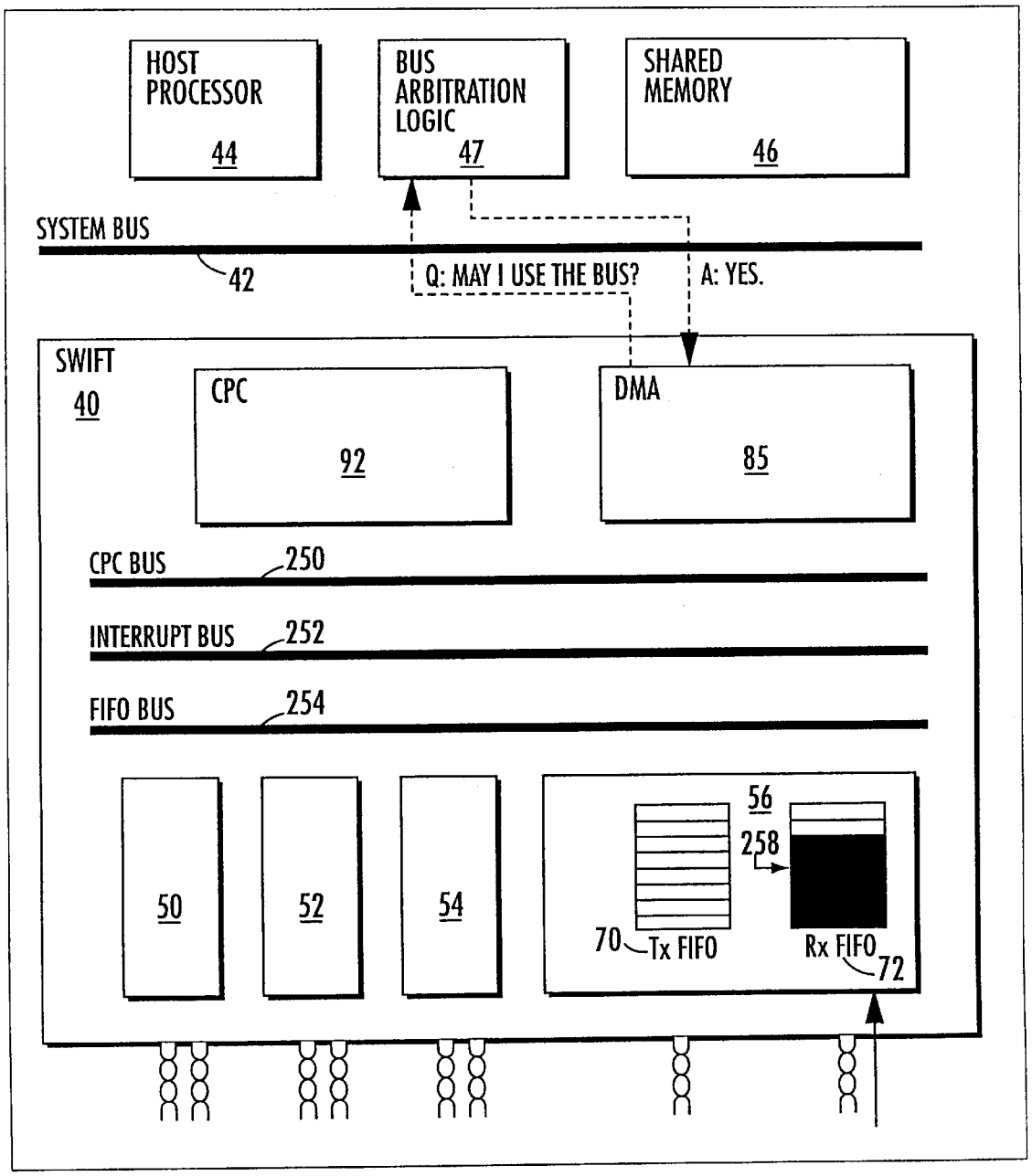
Figure 33:
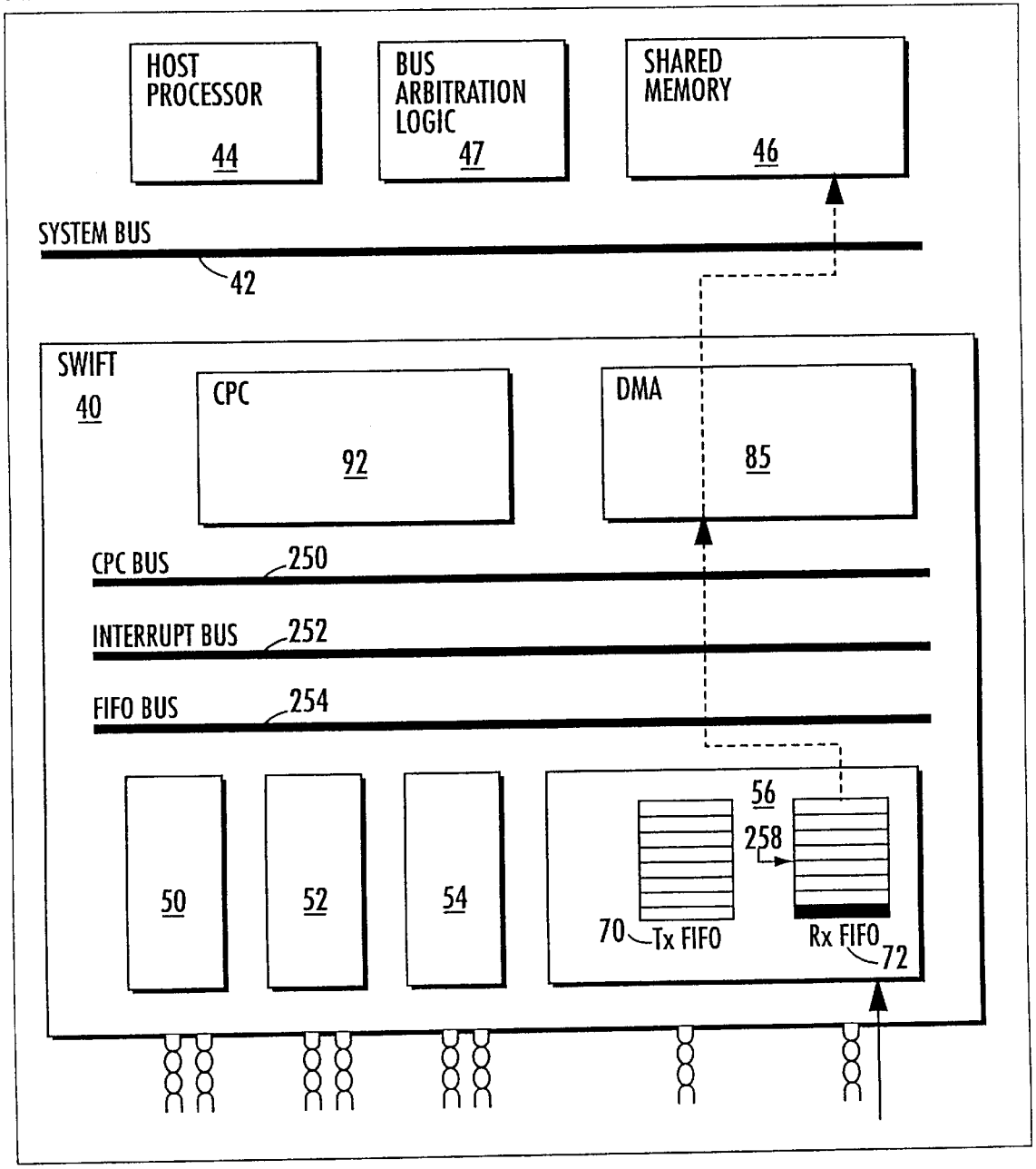
Figure 34:
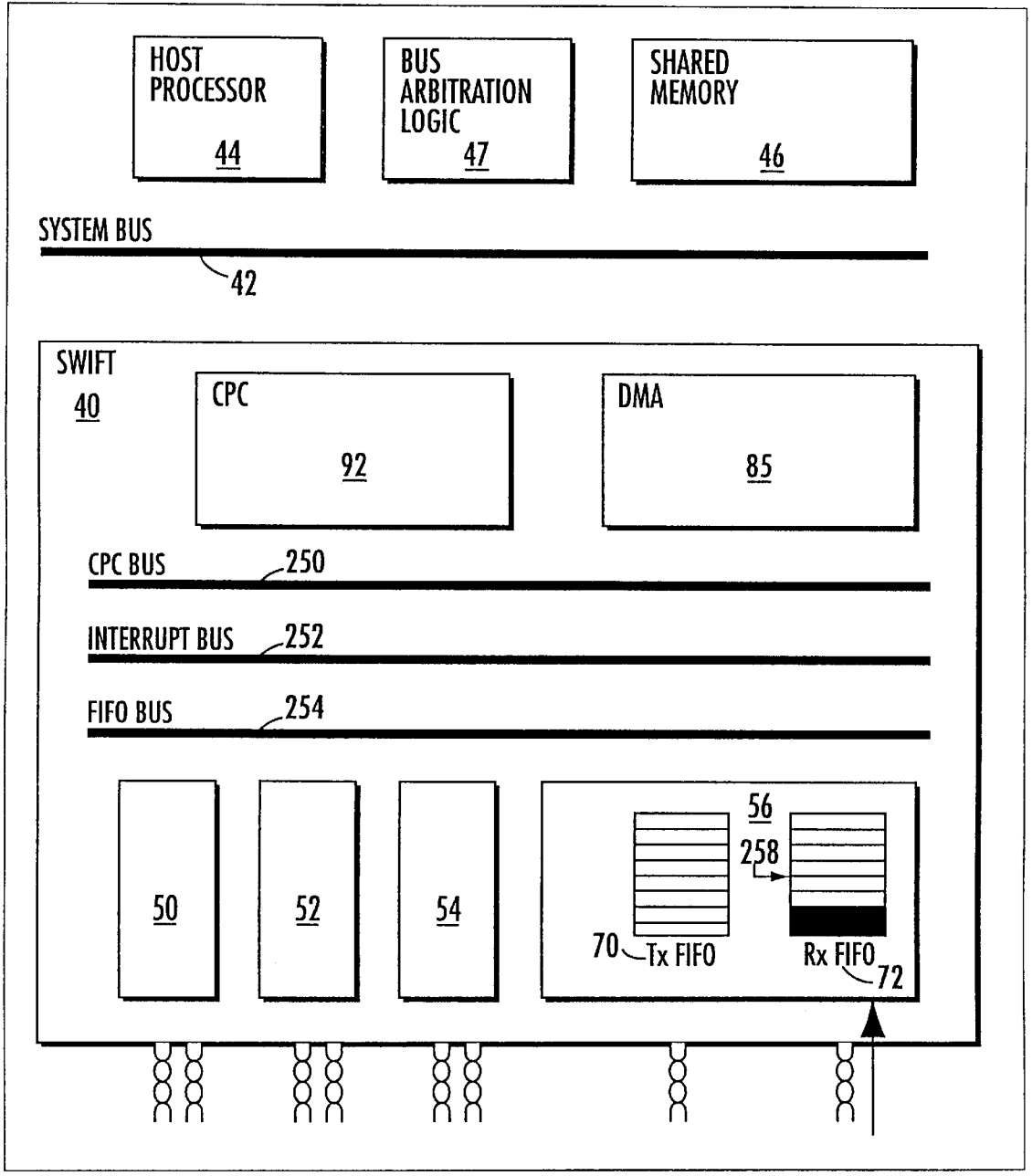
Figure 35:
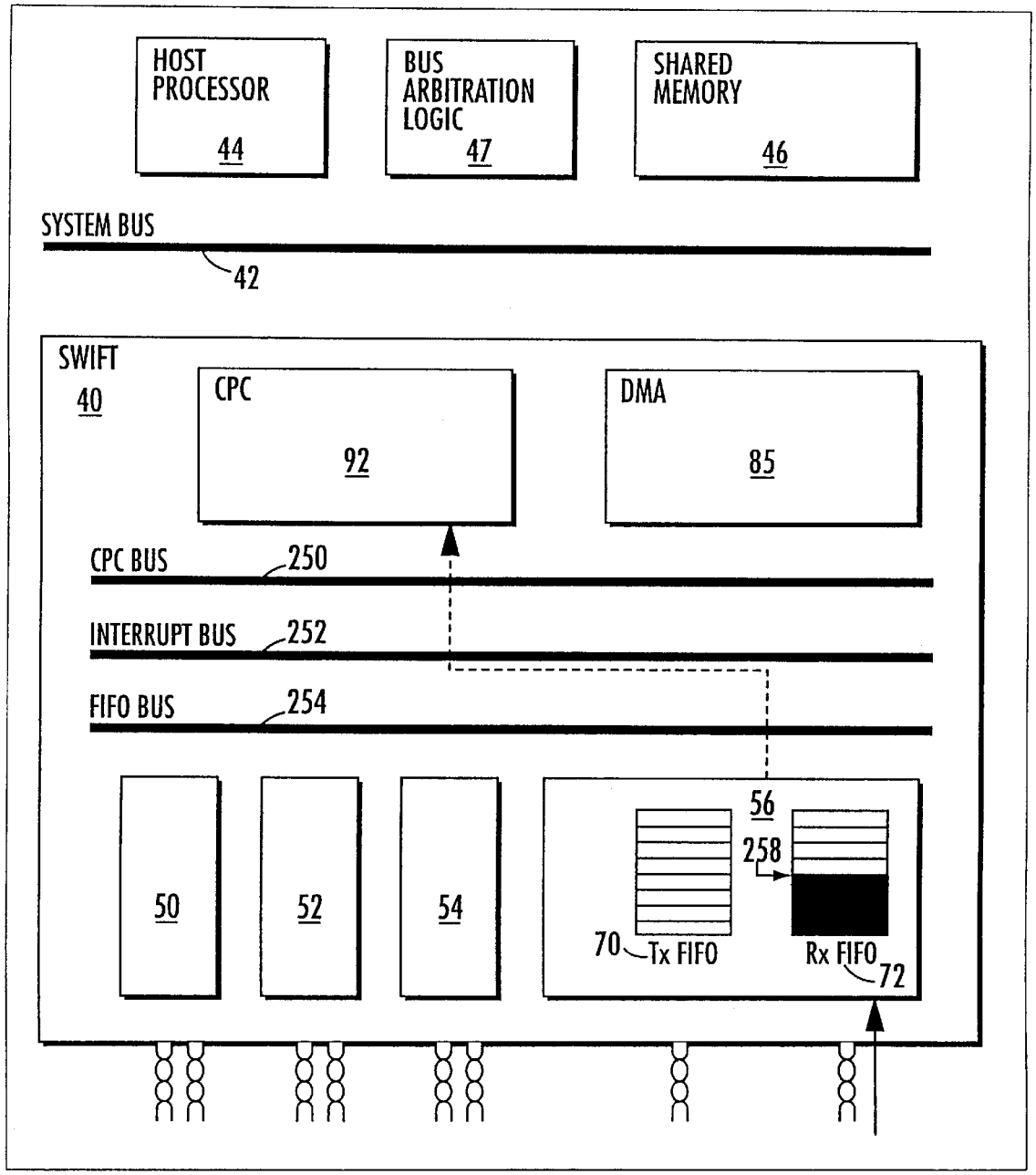
Figure 36:
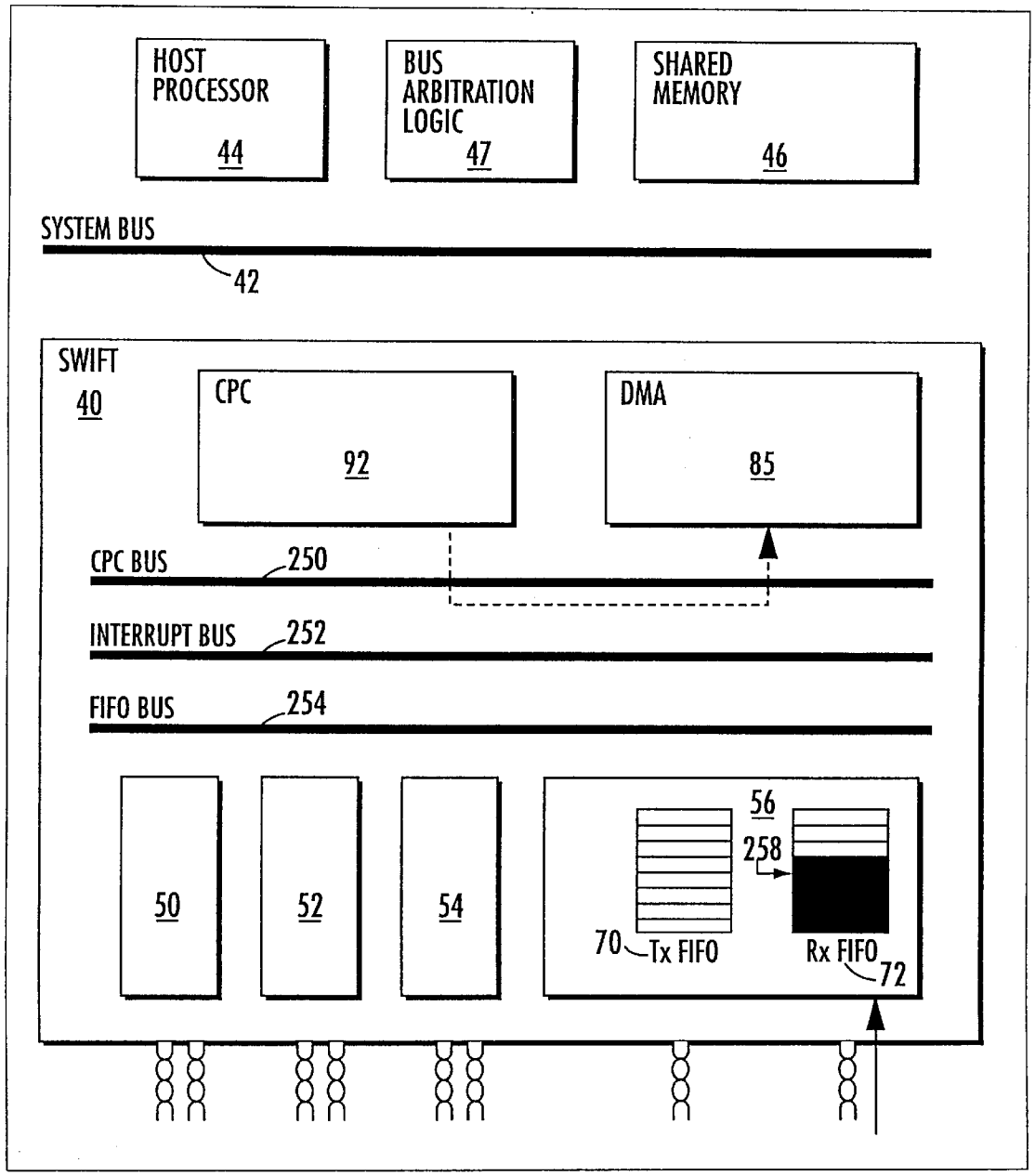
Figure 37:
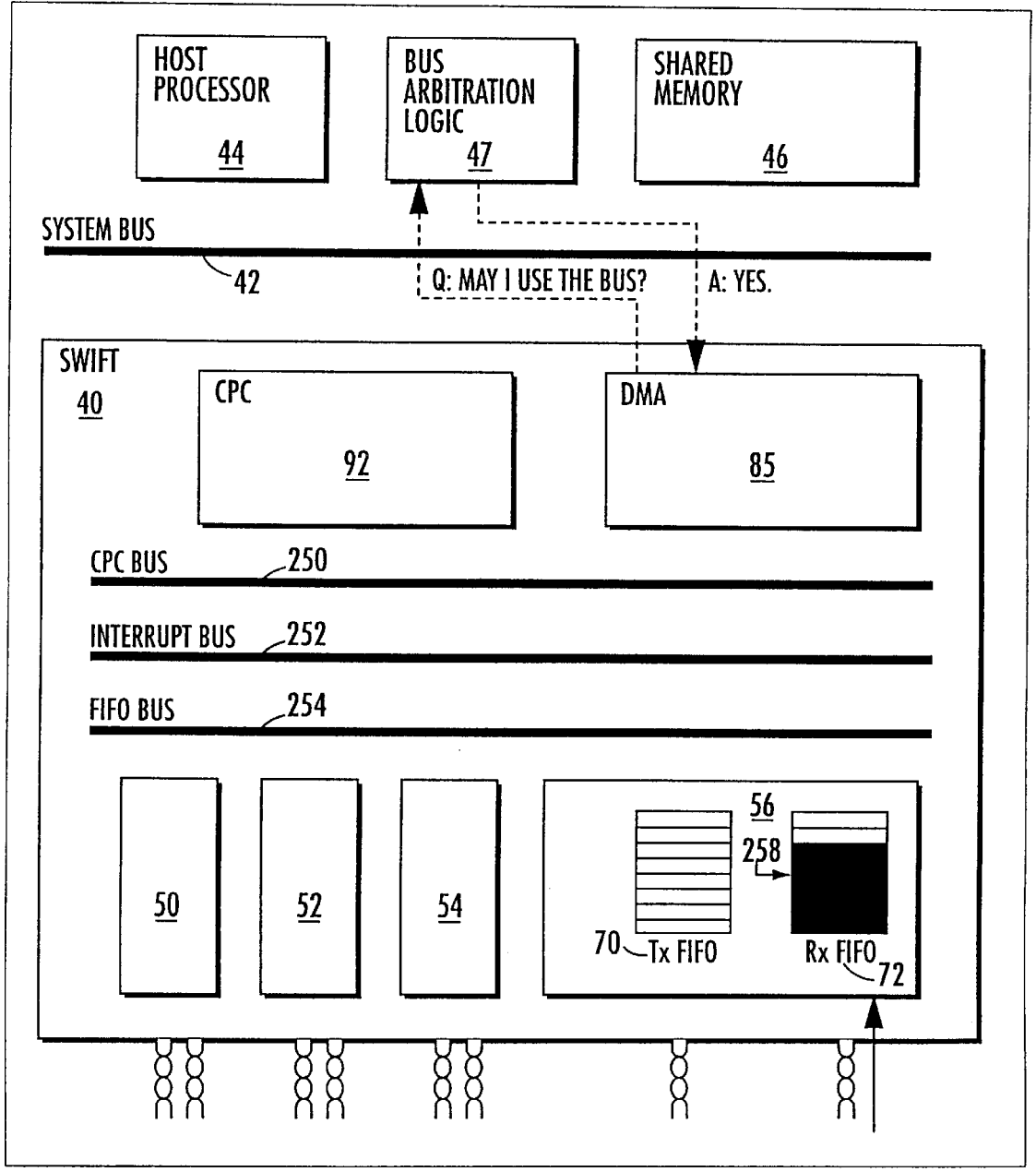
Figure 38:
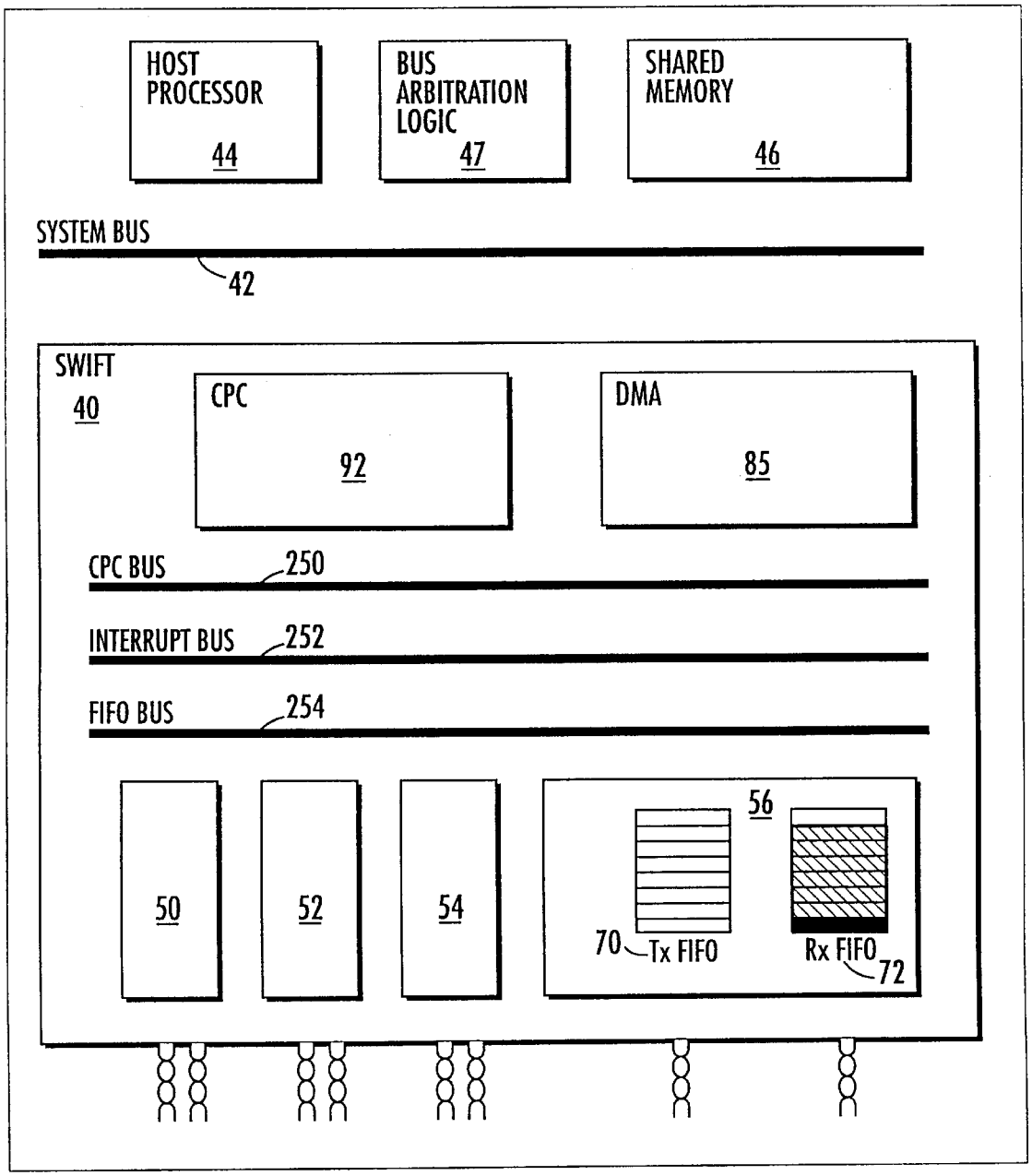
Figure 39:
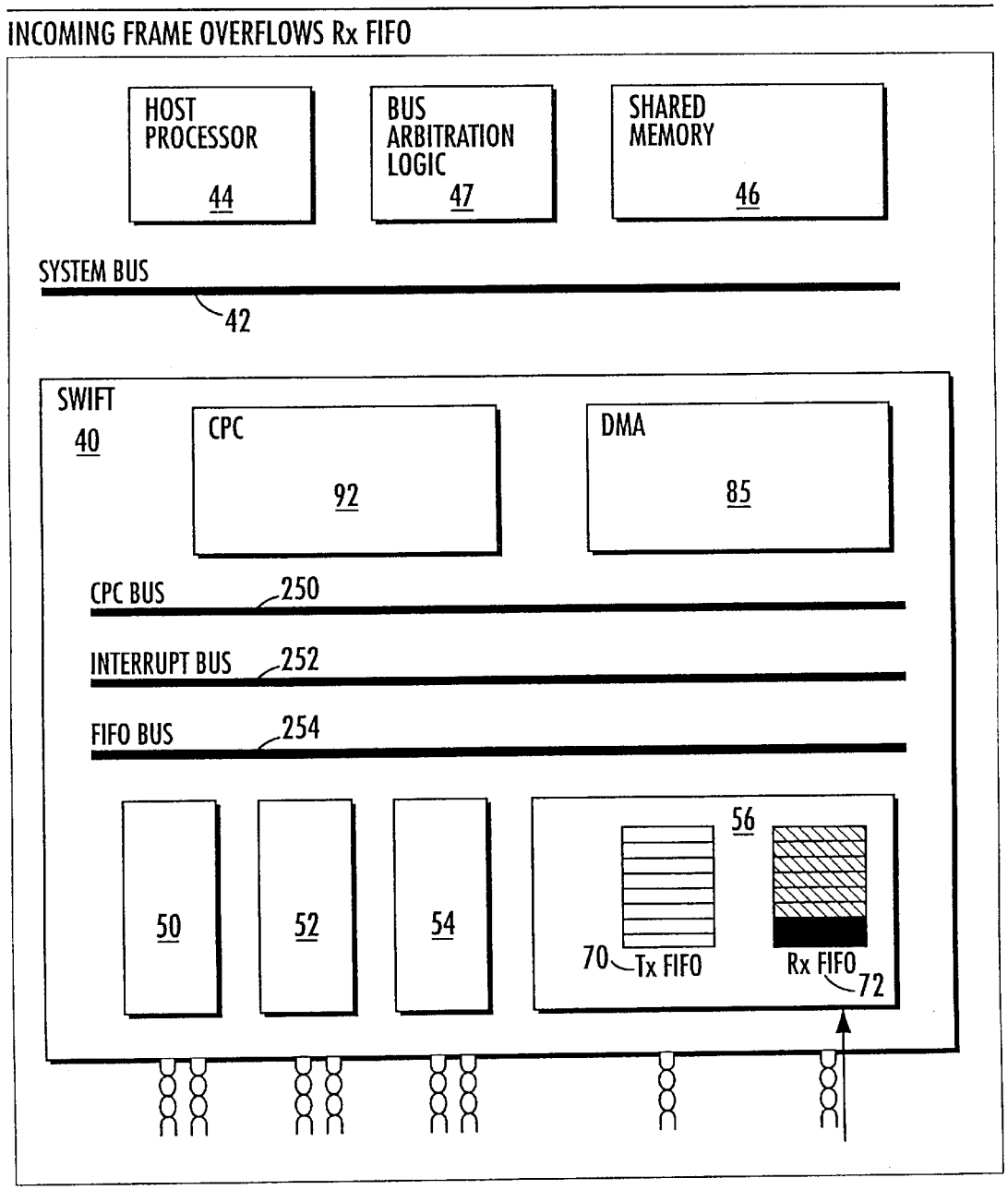
Figure 40:
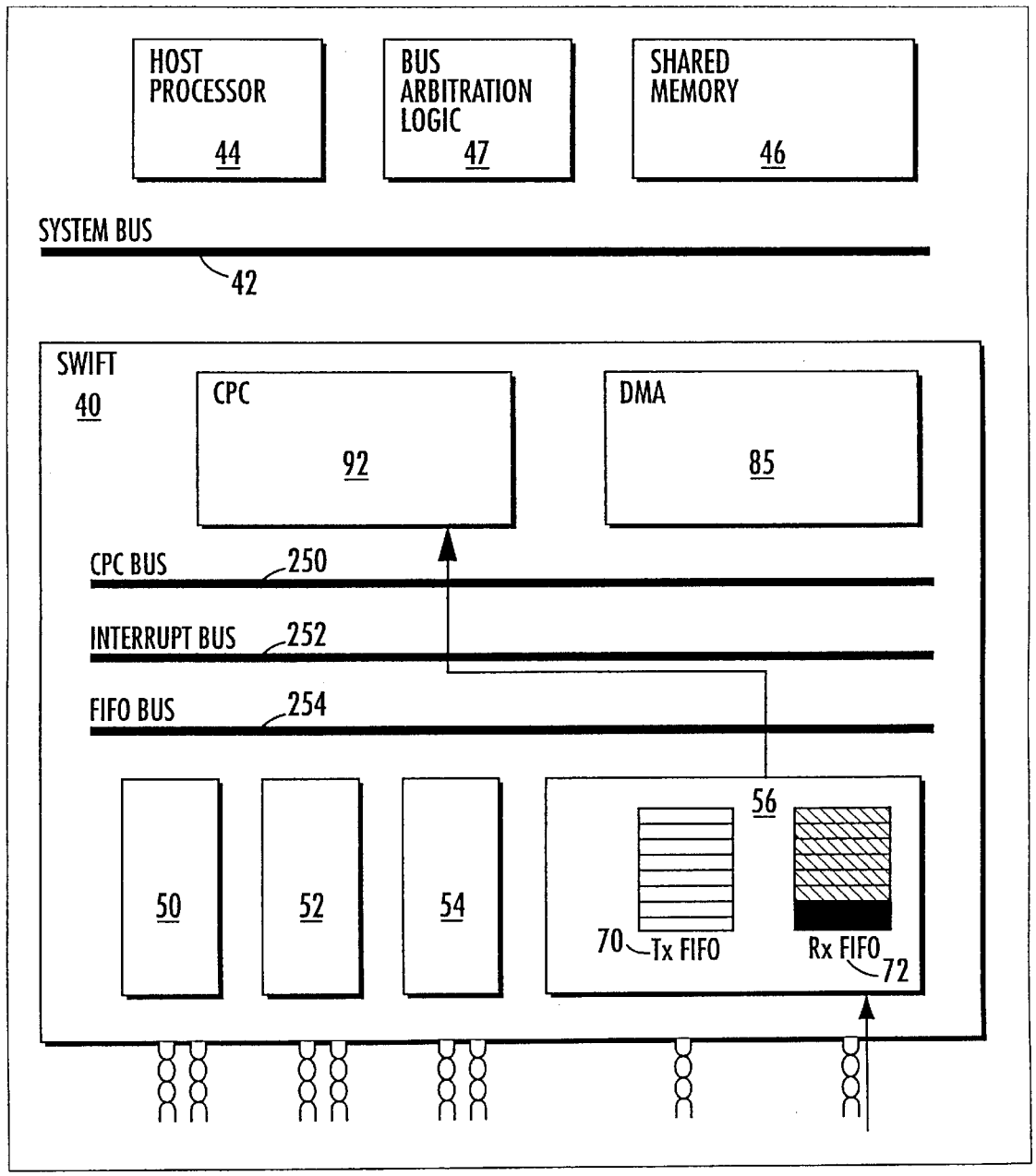
Figure 41:
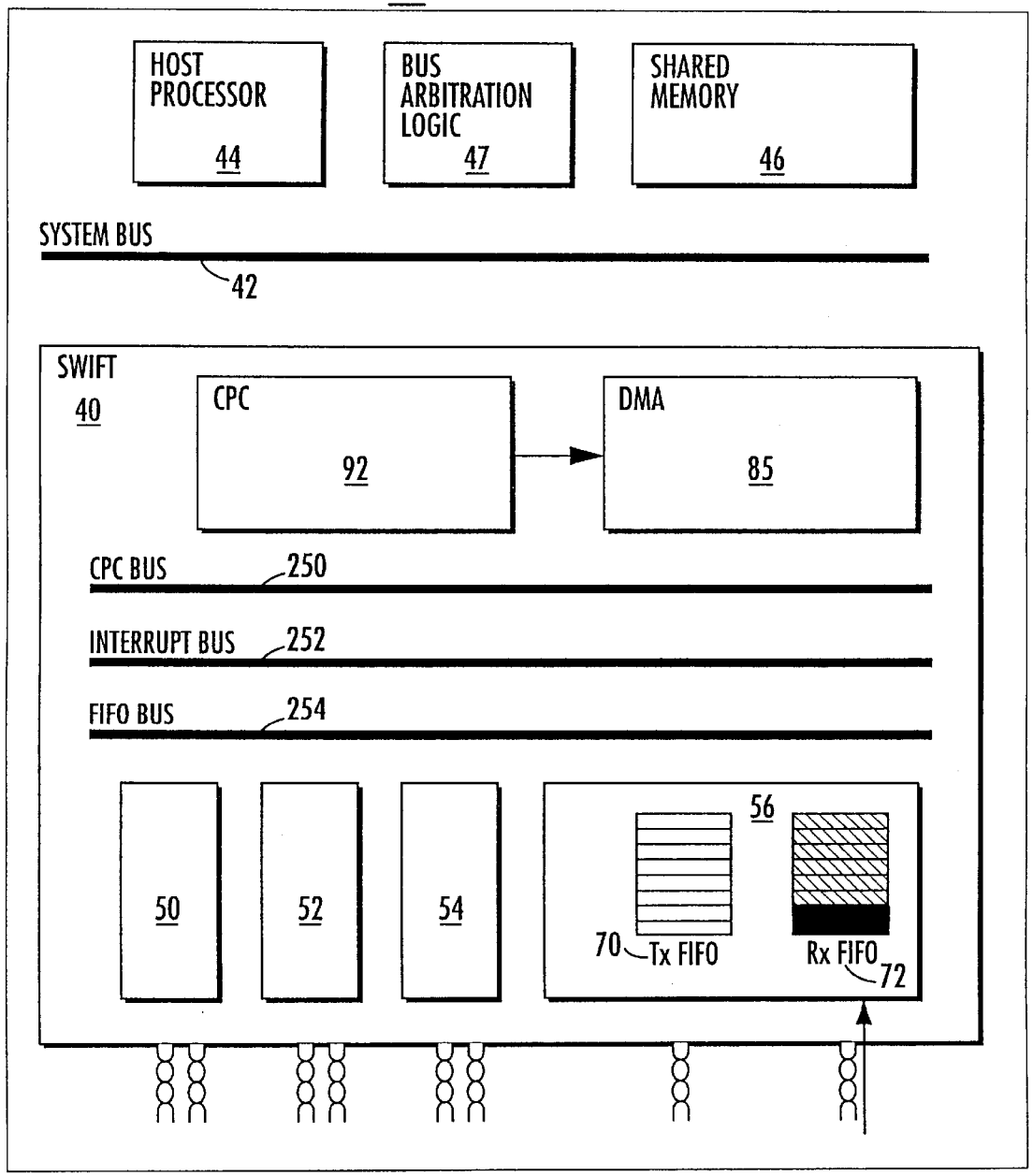
Figure 42:
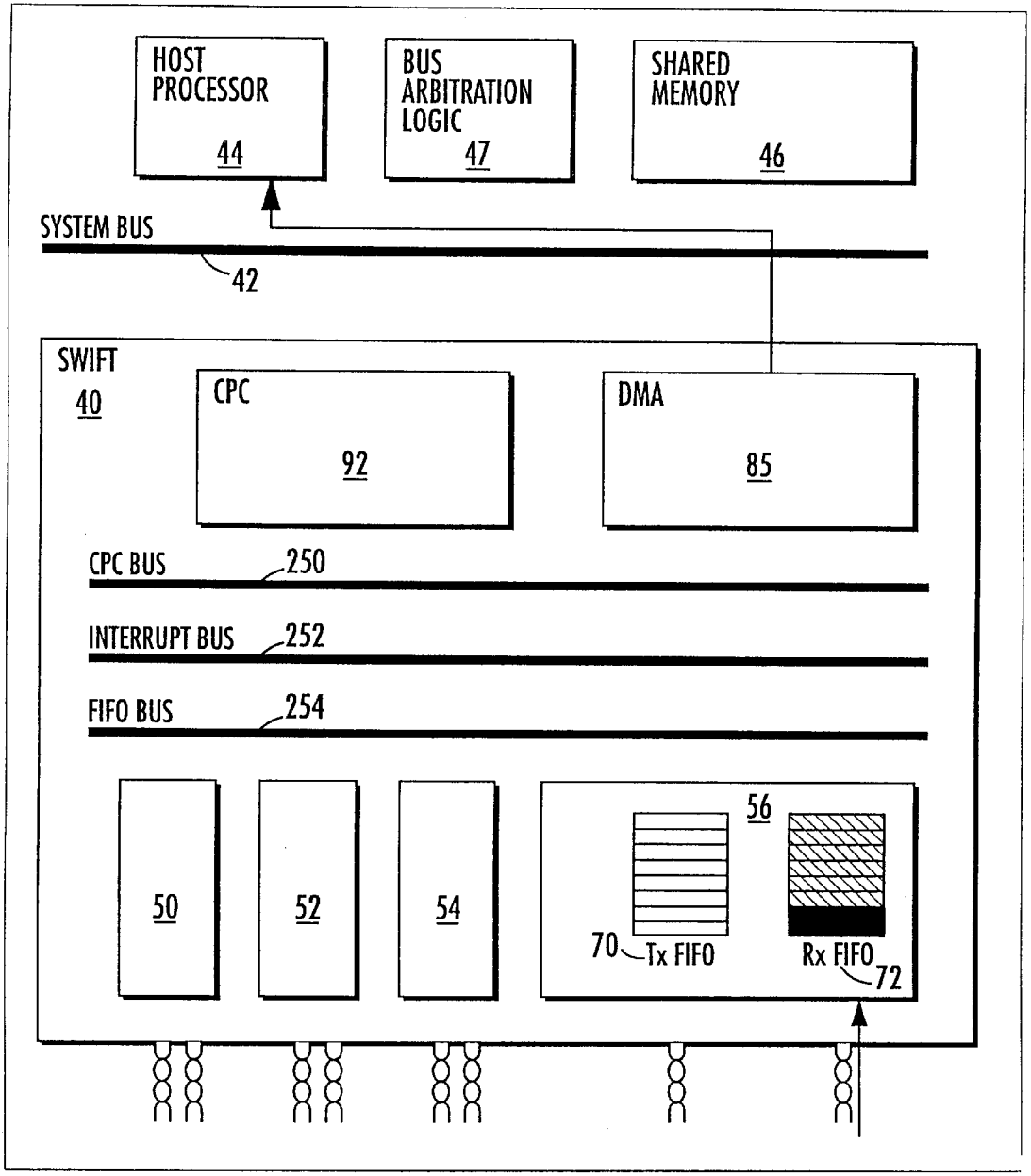
Figure 43:
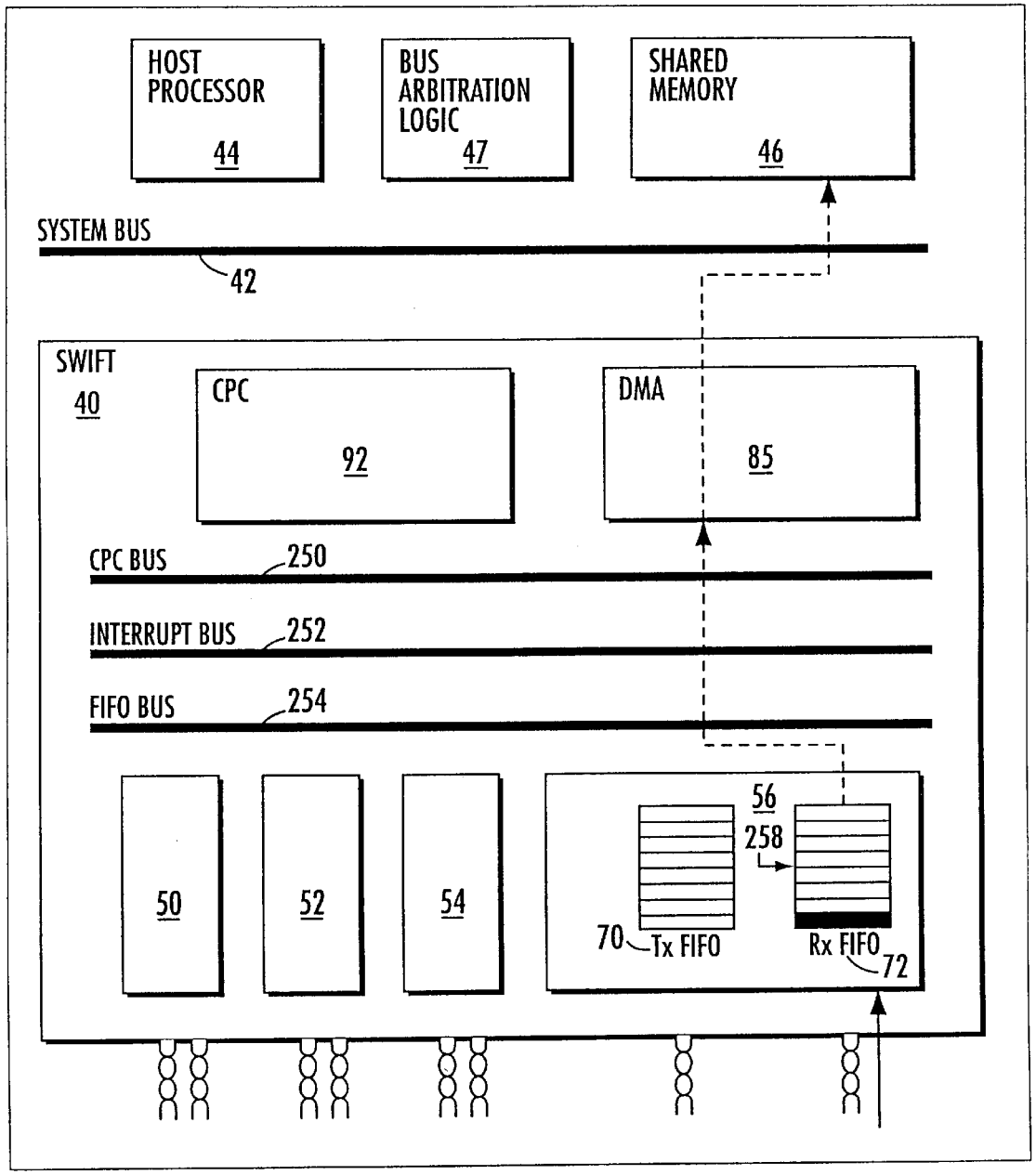

As shown in FIG. 32, the DMA negotiates for ownership of the system bus 42 with the bus arbitration logic unit 47, while data continues to transfer into the receive FIFO memory 72. In FIG. 33, the DMA 85 transfers data from the receive FIFO 72 to the shared system memory 46. As shown in FIG. 34, a second packet or frame then enters the receive FIFO memory 72. FIGS. 35, 36 and 37 are similar to FIGS. 30, 31 and 32, except that access to the system bus 42 has been denied. At this time, a third packet (dark shading) is entering (FIG. 38) in with the second packet (diagonal line shading). In FIG. 39, the incoming frame overflows the receive FIFO memory 72 and the internal interrupt is sent to the communications processor 92 after an early congestion notification (ECN) bit has been set (FIG. 27G). In FIG. 41, the communications processor 92 then sets the ECN bits for the port in the appropriate register block of the DMA 85. In FIG. 42, the DMA 85 signals the early congestion interrupt along the system bus 42 to the host processor 44 and the DMA 85 then transfers data from the receive FIFO 72 to the shared system memory 46, as shown in FIG. 43. The third frame is lost. However, the upper level software can then transmit the frame.

IV. Fence Posting

Reference should once again be placed in greater detail above concerning the discussion of descriptor rings 202 and descriptors 206, referring once again to FIGS. 3, 4, 5 and 7. In addition to the graph of FIG. 44, it is evident that the present method and apparatus controls the transfer of data arranged in frames between the host 44 and network controller 40. Both share the system memory 46. In accordance with the present invention, only the first and last descriptors 206 are updated within a descriptor "chain" to enhances bus utilization and grant ownership of first and last descriptors and any intermediate descriptors to the desired host or controller.

As noted before, the host 44 can elect to use frame data buffers 204 which are smaller in size than the frames that have been received or transmitted and, thus, a single frame data buffer could span multiple frame data buffers 204. This would allow frames to be dissected or assembled by the network controller 40. Naturally, as noted above, multiple frame data buffers 204 could hold the constituent pieces of the frame by "chaining" the associated descriptors 206 together and consecutive entries in the descriptor ring 202 with the end-of-frame flag set in the last descriptor of the chain. The respective frame data buffer of a descriptor entry 206, which is owned but whose end-of-frame flag is not set, is considered to be part of a frame and not an entire frame. The controller 40 can chain descriptors 206 together one-by-one as it fills each successive frame data buffer 204. When the end of a frame is finally received and transferred to the external shared memory 46, the end-of-frame flag is set in the last descriptor of the descriptor chain (FIG. 4).

During transmission, the controller 40 is able to sequentially construct a single frame and the contents of "chained" frame data buffers 204, which are naturally pointed to by the "chained" descriptors 206. Transmission of the frame terminates only when it encounters a frame data buffer 204 whose descriptor 206 has set the end-of-frame flag. This great improvement in bus utilization is brought about by the present invention where instead of the prior art of successively updating each spanned descriptor 206, only the first and last descriptors are altered, such as by updating the ownership bit within the descriptor for network received frames. These first and last updated descriptors form the "fence-posts" of the chain.

All the flags and fields of the first and last descriptor in a "fence-posted" chain are updated in order to provide accurate information about a frame once it has been fully transmitted or received. For example, for received frames, the message size field 218 of the first descriptor in the chain is updated with the byte count of the entire frame, not simply the byte count of the associated buffer because this is equal to the buffer size.

As noted above, FIG. 4 illustrates the administration block 200 with the chip initialization section 200a, and the four ports with the statistics image 200b–e. The descriptor ring 202 is shown with the various descriptors 206, that point to frame data buffers using addresses. A frame data buffer is shown at the right. FIG. 5 shows a frame data buffer 204 with a descriptor 26 as a two-word entry, with an ownership bit (OB) 212 and end-of-packet (EOP) 214. The buffer size 216 and message size 218 is contained in the one word 208, and the buffer address 219 in the other word 210. The graph in FIG. 44 illustrates in detail that the use of only the first and last descriptors as explained above creates a flat line to reduce traffic along the bus.

FIG. 3 also illustrates in detail how the administration block 200 has pointers 200d (FIG. 7) which directly points to the different transmit rings 202, having the descriptors 206 with the buffer information 206a, such as geometry, and buffer addresses 206b.

V. Creation of the Descriptor Rings

The present invention is advantageous because the network device now assumes responsibility for the creation of the data and buffer structures, such as the descriptor rings. The network device 40 constructs transmit and/or receive descriptor rings 202 (FIG. 3) in externally shared memory 46. In the present invention, support is provided for full-duplex channels. The parameters dictating the number of descriptors in either the transmit or receive descriptor rings 202 and their respective frame data buffer dimensions are communicated via a parameter block (or administration block).

This administration block 200 is exchanged between a host system 43 and network device 40 at initialization (FIG. 45) via a communication primitive under host control. This administration block 200 is stored (or mapped) into numerous variable fields of the memory 46. As noted above, if the field values for the transmit descriptor ring size or receive descriptor ring size are non-zero, then construction can be initiated. Otherwise, in the event the fields are zero, the network device 40 will not build the associated descriptor rings 202. The network device 40 expects the host 43 to have already built the data and memory structures in the shared memory 46. The geometry or length of the descriptor ring 202 and the sizes of the associated frame data buffers 204 varies and the descriptor rings 202 often vary from 50 to 500 descriptors in length, while the frame data buffers 204 vary from about 256 bytes up to about 2,000 or 5,000 bytes. Frame data buffer size is selected based upon the maximum supported frame size of interfacing networks. The overall memory allocated per port 50–56 is in the two megabyte range.

The frame data buffer size has relatively little effect on the time required to actually build the descriptor rings 202. However, the descriptor ring size is the limiting factor for the construction time. A block-mode construction optimization technique is used to reduce the build time. Descriptors 206 can be built on-chip in blocks of two and transferred to external memory 46 via the direct memory access unit 85.

This block size is alterable and could be easily included within the parameter of blocks in the future. The method and network device of the present invention offers advantages to the market, including a reduced time required for host software development, and a size reduction of a host code. There can be expedited testing and faster network device initialization. Also, the present invention expedites system implementation for application design engineers.

In accordance with the present invention, a block of memory within the shared memory 46 is allocated by the host system 43, which maps the administration block 200 having the descriptor ring parameters 200b as noted before (FIG. 7). These parameters include the geometry of the descriptor ring 202 and descriptors 204 to be formed within the shared memory. FIG. 7 shows the administration block and indicates that at four addresses PAD+60 to PAD+72, the buffer size, the transmit ring size, and receive ring size.

As shown in FIG. 45, the administration block 200 has the base pointer set up at point 0 on the chart. The host system 43 issues a primitive for initialization (INIT at point 1) to the network device. At the same time, the host 44 writes into the network device 40 the base address of the administration block 200. The network device 40 then "fetches" or reads the administration block from the shared memory (point 2) and then sends an acknowledgment (ACK) back to the host that the administration block is received. This administration block is processed, while the host system may conduct additional housekeeping (point 3) after receiving the acknowledgment.

As the administration block 200 is processed, the network device 40 constructs corresponding descriptors as blocks of data that point to the frame data buffers to be formed within shared memory.

FIG. 46 shows in greater detail a flow chart that illustrates how the descriptors can be formed by the network device. The host provides the pointers to the base descriptor rings and associated buffers in block 400. As noted before, if the field values for the transmit ring size or receive ring size fields are non-zero, then construction is immediately initiated. Otherwise, in event these fields are zero, the network device will not build the associated descriptor rings, but expects the host to have already built the structures in shared memory.

The administration block is read by the network device (block 402) and a descriptor header word is built (block 404). The descriptor address words are built (block 406) and the descriptor address updated block 408). The buffer point address is also updated (block 410) and then the descriptor block is read out by the network device to the host RAM which is part of the shared system memory (block 412).

Then the process is tested to see if it is completed (block 414) and if not, then the descriptor addresses are updated again. If the process is completed, then the EOR bit is set for the terminal descriptor (block 416) and the terminal descriptor written out to the host of RAM (block 418). The process then ends (block 420).

There are a number of assumptions, such as the use of contiguous descriptors, and an even count. Typically, the buffers are contiguous and of uniform size. If the buffer pointers are not provided, then the firmware 102 will start buffers at a two-word offset from the calculated termination of a descriptor ring. If the administration block descriptor parameter hexadecimal word is "0x00000000," then no associated descriptor rings 202 will be built. The administration block transfer is required prior to other configuration primitives because the block will overwrite the settings. All descriptor ring dimensions must be even values and the frame data buffer size can be a 0 or 1 or no descriptor ring 202 will be built. All buffer pointers are forced to award alignment regardless of the ring dimensions. The smallest descriptor ring that can be built is three descriptors in size and two descriptors per block with one block per DMA transfer.

FIGS. 47–50 illustrate a table showing further details of the transmit and receive message descriptors, as well as the various fields and bit values that can be used.

Other disclosures that are related to the present invention are set forth in patent applications entitled, "METHOD AND SYSTEM OF CONTROLLING TRANSFER OF DATA BY UPDATING DESCRIPTORS IN DESCRIPTOR RINGS," "METHOD AND SYSTEM OF ROUTING NETWORK-BASED DATA USING FRAME ADDRESS NOTIFICATION," "METHOD AND APPARATUS FOR CONTROLLING NETWORK DATA CONGESTION," and "METHOD AND NETWORK DEVICE FOR CREATING BUFFER STRUCTURES IN SHARED MEMORY," which are filed on the same date and by the same assignee, the disclosures which are hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of controlling flow of data arranged in frames in a data-based network comprising the steps of:
   generating an interrupt from a packet memory of a network device when the data in the packet memory has crossed a watermark threshold, the packet memory including at least one of a transmit or receive packet memory;
   transferring a data burst from a host system through a direct memory access unit to the packet memory;
   verifying that the data burst is complete by checking a direct memory access flag indicative that the data burst is complete;
   checking a flag at the packet memory as computed by a packet memory control logic unit to determine if sufficient memory space exists inside the packet memory for an additional data burst; and
   transferring an additional data burst of a known quantity based on a continuation-of-packet (COP) event through the direct memory access unit to the packet memory.

2. A method according to claim 1, and further comprising the step of transferring data in response to instructions from firmware contained within a communications processor for verifying that the data burst is complete.

3. A method according to claim 1, and further comprising the step of generating a start-of-packet interrupt by the direct memory access unit to a communications processor before transferring the data.

4. A method according to claim 1, and further comprising the step of reporting the data burst size to a packet memory control logic unit to allow response to different changes in data throughput and burst rate.

5. A method according to claim 4, and further comprising the step of storing the data burst size within a storage unit of the packet memory control logic unit.

6. A method according to claim 1, and further comprising the step of issuing to the direct access memory unit a request for end of command flag when the direct memory access unit transfer of data is complete.

7. A method of controlling flow of data arranged in frames in a data-based network comprising the steps of:
   generating an interrupt from a packet memory when the data in the packet memory has crossed a watermark threshold, the packet memory including at least one of a transmit or receive packet memory;
   transferring a data burst through the direct memory access unit to the packet memory; and
   transferring an additional data burst of a known quantity based on a continuation-of-packet (COP) event through the direct memory access unit to the packet memory when a flag at the packet memory is indicative that sufficient memory space exists inside the packet memory for an additional data burst, and further comprising the step of time slicing between channels.

8. A method according to claim 7, and further comprising the step of transferring data in response to instructions from firmware contained within a communications processor for verifying that the data burst is complete.

9. A method according to claim 7, and further comprising the step of generating a start-of-packet interrupt by the direct memory access unit to a communications processor before transferring the data.

10. A method according to claim 7, and further comprising the step if issuing to the direct memory access unit a request for end of command flag when the direct memory access unit transfer of data is complete.

11. A method of controlling flow of data arranged in frames in a data-based network comprising the steps of:
    generating an interrupt from a packet memory of a network device when the data in the packet memory has crossed a watermark threshold, the packet memory including one of a transmit or receive packet memory;
    transferring a data burst from a host system through a direct memory access unit to the packet memory;
    transferring an additional data burst of a known quantity based on a continuation-of-packet (COP) event through the direct memory access unit to the packet memory when a flag at the packet memory as computed by a packet memory control logic unit is indicative that sufficient memory space exists inside the transmit or receive packet memory for an additional data burst.

12. A method according to claim 11, and further comprising the step of storing the data burst size within a storage unit of the packet memory control logic unit.

13. A method according to claim 11, and further comprising the step of transferring data via instructions from firmware contained within a communications processor of the network device for verifying that the data burst is correct.

14. A method according to claim 11, and further comprising the step of generating a start-of-packet interrupt by the direct memory access unit to a communications processor before transferring the data.

15. A method according to claim 11, and further comprising the step of issuing to the direct memory access unit a request for end of command flag when the direct memory access unit transfer of data is complete.

16. A network device comprising:
    a packet memory unit having an interrupt circuit for generating an interrupt indicative that data in the packet memory unit has crossed a threshold, said packet memory including one of a transmit or receive packet memory;
    a direct memory access unit for receiving the interrupt from the packet memory unit and transferring data to one of the transmit or receive packet memory after receiving the interrupt, wherein the packet memory unit includes means for generating a flag indicative that sufficient memory space exists inside the transmit or receive packet memory for an additional data burst of a known quantity based on a continuation-of-packet (COP) event from the direct memory access unit; and
    a packet memory control logic unit for computing the flag indicative that sufficient memory space exists inside one of the transmit or receive packet memory.

17. The network device according to claim 16, wherein said direct memory access unit further comprises a circuit for generating a direct memory access flag indicative that a data burst to the packet memory unit is complete.

18. The network device according to claim 16, and further comprising a communications processor for verifying that the data burst from the direct memory access unit to the packet memory unit is correct.

19. The network device according to claim 18, and wherein said direct memory access unit further comprises a circuit for generating a start-of-packet interrupt to the communications processor before transferring data.

20. The network device according to claim 16, wherein said packet memory control logic unit changes the flag indicative that sufficient memory exists for an additional data burst to allow response to different changes in data throughput and burst rate.

21. The network device according to claim 20, and further comprising a storage unit for storing the data burst size for access by the packet memory control logic unit.

22. The network device according to claim 20, and further comprising means for generating a request for end of command to the direct memory access unit.

23. The network device according to claim 22, and further comprising means for generating an end of command flag when the direct memory access unit transfer of data is complete.

24. A network device comprising:

a packet memory unit having an interrupt circuit for generating an interrupt indicative that data in the packet memory unit has crossed a threshold, said packet memory including one of either a transmit or receive packet memory; and a direct memory access unit for receiving the interrupt from the packet memory unit and transferring data to one of the transmit or receive packet memory after receiving the interrupt, wherein the packet memory unit includes a circuit for generating a flag indicative that sufficient memory space exists inside one of the transmit or receive packet memory for an additional data burst of a known quantity based on a continuation-of-packet (COP) event from the direct memory access unit, while also allowing time slicing between multiple communications channels.

25. The network device according to claim 24, wherein said direct memory access unit further comprises a circuit for generating a direct memory access flag indicative that a data burst to the packet memory unit is complete.

26. The network device according to claim 24, and further comprising a communications processor for verifying that the data burst from the direct memory access unit to the packet memory unit is correct.

27. The network device according to claim 26, and wherein said direct memory access unit further comprises a circuit for generating a start-of-packet interrupt to the communications processor before transferring data.

28. The network device according to claim 24, and further comprising a packet memory control logic unit for changing the flag indicative that sufficient memory exists for an additional data burst to allow response to different changes in data throughput and burst rate.

29. The network device according to claim 24, and further comprising a storage unit for storing the data burst size for access by the packet memory control logic unit.

30. The network device according to claim 24, and further comprising means for generating a request for end of command to the direct memory access unit.

31. The network device according to claim 30, and further comprising means for generating an end of command flag when the direct memory access unit transfer of data is complete.

* * * * *

UNITED STATES PATENT AND TRADEMARK OFFICE
CERTIFICATE OF CORRECTION

PATENT NO.         : 6,715,002 B2
APPLICATION NO. : 10/005509
DATED                 : March 30, 2004
INVENTOR(S)       : Kasper Page 1 of 1

It is certified that error appears in the above-identified patent and that said Letters Patent is hereby corrected as shown below:

| | |
|---|---|
| Column 2, Line 65 | Delete: "generated"<br>Insert: --generate-- |
| Column 6, Line 32 | Delete: "sent"<br>Insert: --send-- |
| Column 12, Lines 53-54 | Delete: "end of frame"<br>Insert: --end-of-frame-- |
| Column 13, Line 52 | Delete: "through"<br>Insert: --though-- |
| Column 16, Line 21 | Delete: "provides that the"<br>Insert: -- provides the-- |
| Column 16, Line 40 | Delete: "TPC"<br>Insert: --TCP-- |
| Column 22, Line 56 | Delete: "26"<br>Insert: --206-- |
| Column 23, Line 52 | Delete: "204"<br>Insert: --206-- |
| Column 24, Line 18 | Delete: "updated block 408)"<br>Insert: --updated (block 408)-- |

Signed and Sealed this

Twenty-first Day of August, 2007

JON W. DUDAS
*Director of the United States Patent and Trademark Office*